United States Patent [19]

Dysart et al.

[11] Patent Number: 5,079,695
[45] Date of Patent: Jan. 7, 1992

[54] OBJECT MANAGEMENT FACILITY WHICH INCLUDES A SNAPSHOT FACILITY FOR PROVIDING DATA TRANSFER BETWEEN TWO OBJECTS

[75] Inventors: John A. Dysart, Santa Clara; William M. Crow, San Jose; Peter S. Showman, Cupertino, all of Calif.

[73] Assignee: Hewlett-Packard Company, Palo Alto, Calif.

[21] Appl. No.: 186,312

[22] Filed: Apr. 25, 1988

[51] Int. Cl.$^5$ .......................... G06F 9/30; G06F 13/00
[52] U.S. Cl. ...................... 395/700; 364/275.6; 364/277.81; 364/286; 364/943; 364/962; 364/DIG. 1; 364/DIG. 2; 395/100
[58] Field of Search ... 364/200 MS File, 900 MS File, 364/518, 521; 340/721

[56] References Cited

U.S. PATENT DOCUMENTS

| | | | |
|---|---|---|---|
| 4,530,051 | 7/1985 | Johnson et al. | 364/200 |
| 4,635,189 | 1/1987 | Kendall | 364/200 |
| 4,649,479 | 3/1987 | Advani et al. | 364/300 |
| 4,674,040 | 6/1987 | Barker et al. | 364/300 |
| 4,698,766 | 10/1987 | Entwistle et al. | 364/468 |
| 4,701,848 | 10/1987 | Clyde | 364/900 |
| 4,713,754 | 12/1987 | Agarwal et al. | 364/200 |
| 4,723,210 | 2/1988 | Barker et al. | 364/300 |
| 4,800,521 | 1/1989 | Carter et al. | 364/900 |
| 4,815,030 | 3/1989 | Cross et al. | 364/900 |
| 4,825,354 | 4/1989 | Agrawal et al. | 364/200 |
| 4,849,877 | 7/1989 | Bishop et al. | 364/200 |
| 4,868,745 | 9/1989 | Patton et al. | 364/200 |

Primary Examiner—Thomas C. Lee
Assistant Examiner—Ayni Mohamed

[57] ABSTRACT

A computer having a file management system and a plurality of objects is presented. The file management allows for the coordination of the transfer of data between objects. A link with a view may be created between a child objects and a parent object as follows. A link data structure includes a reference name which identifies the link data structure, a reference to the child object, a reference to the parent object and a data identifier which identifies the data to be transferred. Upon request from the parent object, the child object displays the data in the location specified by the parent object. When the file management system receives the request from the parent object it sends a request for the transfer of the data to the child object. The child object then displays the data at the specified location. Alternatively, when the link is set up, the child object may set up a snapshot object. The snapshot takes over responsibility to display the data at the specified location. When the file management system receives the request from the parent object it sends a request for the transfer of the data to the snapshot rather than the child object. The snapshot then displays the data at the specified location.

15 Claims, 59 Drawing Sheets

View Specification Record 740

OBJECT MANAGEMENT FACILITY WHICH INCLUDES A SNAPSHOT FACILITY FOR PROVIDING DATA TRANSFER BETWEEN TWO OBJECTS

BACKGROUND

The present invention relates to the transfer of data within a computing system.

It is a frequently unachieved goal to have compatibility between data files which are originated by different computer applications. Typically, each computer application operates independently from other computer applications. It is extremely rare that data from one computer application may be effectively incorporated into data from another application.

On occasion so-called integrated software is developed whereby there is some data compatibility between certain applications. However, these integrated software packages do not provide for data compatibility with computer applications which are not part of the integrated software packages.

SUMMARY OF THE INVENTION

In accordance with the preferred embodiment of the present invention, a computer having a file management system and a plurality of objects is presented. The file management system allows for coordination of the transfer of data between objects. Generally, an object is considered to be an entity which includes data in one or more files and includes executable code which may be executed by the computer to process the data in the file(s).

In the preferred embodiment of the present invention, the file management system includes a plurality of application programs, a plurality of data files, a plurality of class data structures and a plurality of object data structures. Each class data structure includes a reference to an application program within the plurality of application programs. Each object data structure includes a reference to a class data structure from the plurality of class data structures and a reference to at least one data file from the plurality of data files.

The use of object data structures adds a layer between a user of the computer and data files. This allows for the computer to refer to an object data structure and access files associated therewith using a tag which is inaccessible to the user. The user refers to an object based on the physical location of the object on the scraen. The user may also give the object data structure a name, which is wholly unconnected to the value of the tag. This allows a user to, for instance, give two objects in the same directory, the same name.

Additionally, the file management system includes a plurality of link data structures, each link data structure including a reference to a first object data structure in the plurality of object data structures which serves as a parent object of the link, and including a reference to a second object data structure in the plurality of object data structures which serves as a child object of the link. Child objects and parent objects are not necessarily the same for each link data structure.

A link with a view may be created between a child object and a parent object as follows. A user specifies to the child object the data to be displayed. The user specifies to the parent object a location in which the data is to be displayed. The user causes the file management system to link the child object and the parent object, so that link data structure includes a reference name which identifies the link data structure, a reference to the child object, a reference to the parent object and a data identifier which identifies the data to be transferred.

Upon request from the parent object, the child object displays the data in the location specified by the parent object. The request is made by the parent object by sending to the file management system the reference name, a location where the data is to be displayed and a request for the transfer of data. The parent object does not identify the child object or the data identifier. It is not necessary for the parent object to know these.

When the file management system receives the request from the parent object it sends a request for the transfer of the data to the child object. This request includes the location where the data is to be displayed and the data identifier. It does not include the reference name or the identification of the parent object. The child object then displays the data at the specified location.

Alternatively, when the link is set up, the child object may set up a snapshot object. The snapshot takes over responsibility to display the data at the specified location. When the file management system receives the request from the parent object it sends a request for the transfer of the data to the snapshot rather than the child object. The snapshot then displays the data at the specified location.

One advantage of the present invention is that it allows a user using a first application to access data from a second application. For example, a single spreadsheet can be linked into several different folders, used as a table in a word processing document and as a data source for a bar chart. From any of these linked locations, for instance, the user can very easily display the spreadsheet to more fully examine or modify it.

The advantage of the use of snapshots is that typically when a parent object requests data from a child object, the application associated with the child object must be activated. This can require a high overhead for complex applications. If a snapshot it used, the application associated with the child object need not be activated, and the requested data may be displayed with much less overhead.

DESCRIPTION OF THE PREFERED EMBODIMENT

Figure 1:
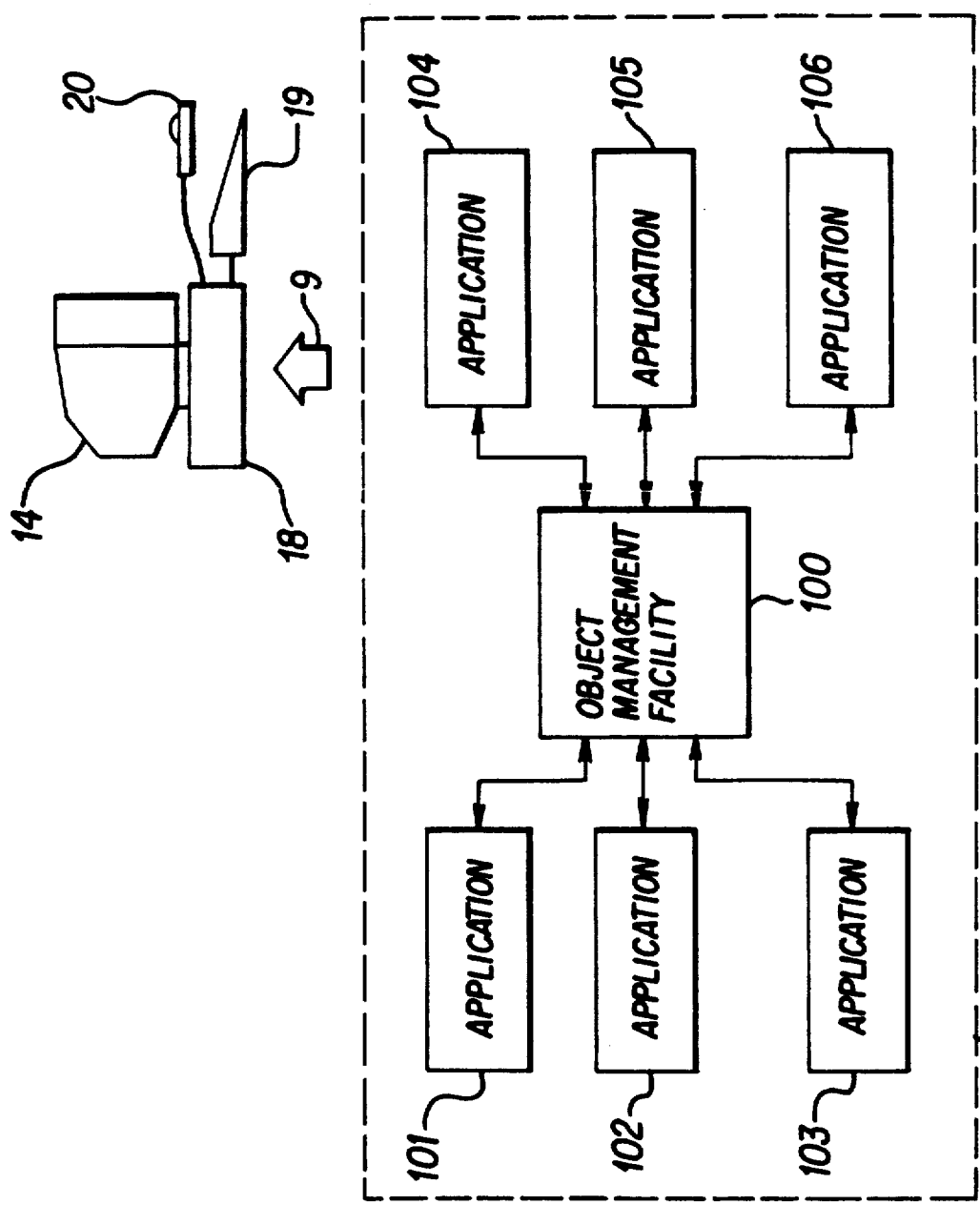
FIG. 1 is a block diagram of a computer in accordance with the preferred embodiment of the present invention.

FIG. 1 shows a computer 18 having a monitor 14, a keyboard 19 and a mouse 20. A portion of computer main memory 17 is shown by an arrow 9 to be within computer 18. Within computer memory main 17 is shown an object management facility (OMF)100, an application 101, an application 102, an application 103, an application 104, an application 105 and an application 106.

Figure 2:
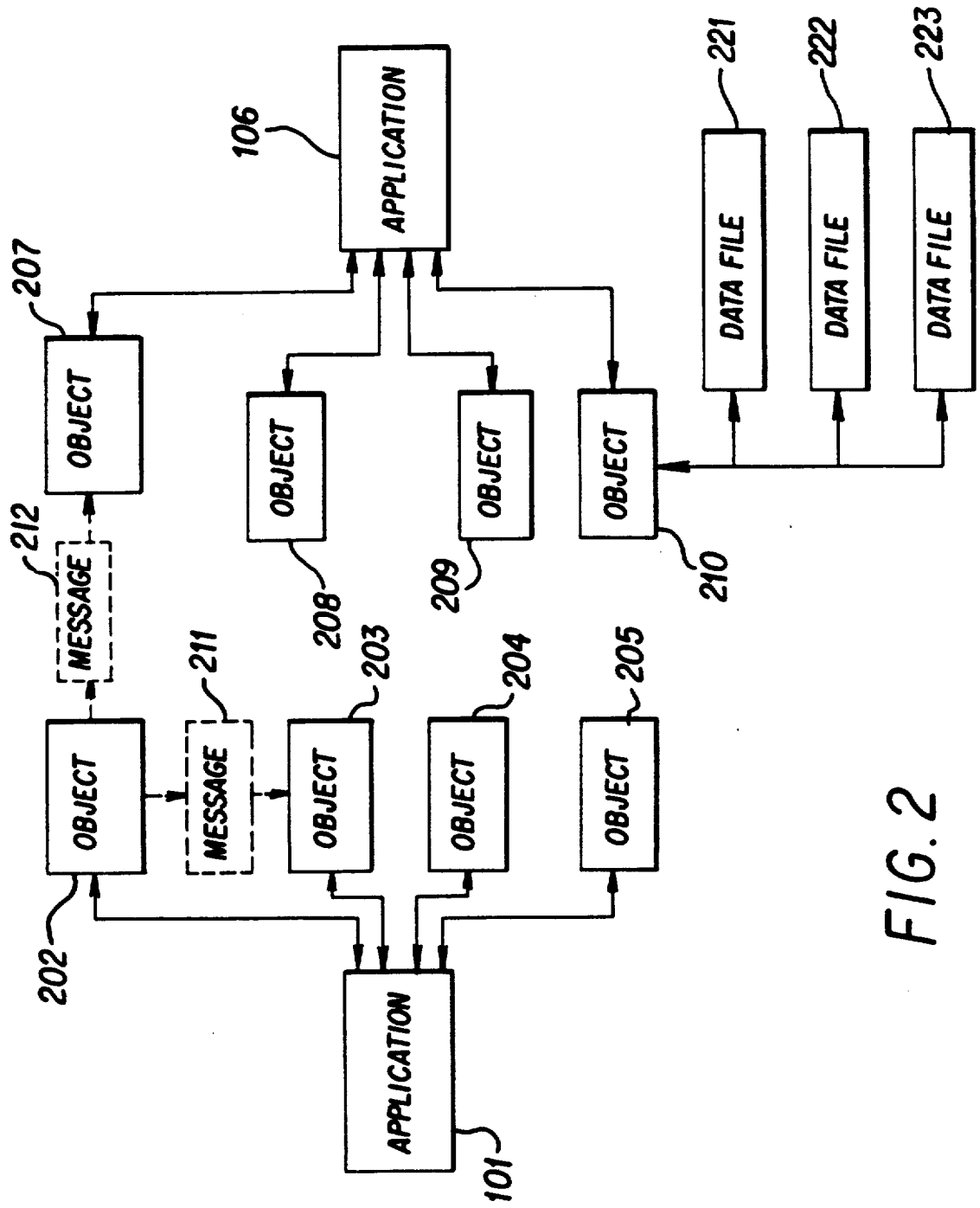
FIGS. 2A and 2B show block diagrams which illustrate the relationship between objects, applications and data files in accordance with the preferred embodiment of the present invention.

Each of applications 101 to 106 store data using objects. For instance, in FIG. 2, application 101 is shown to have stored data using an object 202, an object 203, an object 204 and an object 205. Similarly, application 106 is shown to have stored data in an object 207, an object 208, an object 209 and an object 210. OMF 100 stores information indicating which objects go with which application. Objects which are associated with a single application are considered to be objects of the same type, or the same class. For instance, object 202, 203, 204 and 205 are of the same class because each is associated with application 101. Similarly objects 207, 208, 209 and 210 are of the same class because each is associated with application 106. All objects of the same class use the same application. When an application is being run by computer 18, OMF 100 informs the application which object the application should access for data. That object is then considered to be active. An object is inactive when the application the object is associated with is not being run by computer 18, or when the application the object is associated with is being run, but is not being run with the data of that object.

Active objects can communicate with each other using messages. For example if two instances of application 101 are being run by computer 18, one with the data of object 202 and the other with the data of object 203, object 202 and object 203 are both active. Therefore object 202 may send a message 211 to object 203. Similarly, if computer 18 is running application 101 with the data of object 202, and is running application 106 with the data of object 207, object 202 and object 207 are both active. Therefore, object 202 may send a message 212 to object 207.

Messages, such as message 211 and 212 may be formatted to be sent and received by all types of objects. This allows for free communication between all active objects. This also allows new object types to be defined and added to the system without requiring that the existing object types be updated to use the new type.

Each object has associated with a set of data files. For instance, object 210 is shown to have associated with it a data file 221, a data file 222 and a data file 223. Data in data files 221, 222 and 223 are in a format which can be interpreted by application 106.

Figure 2A:
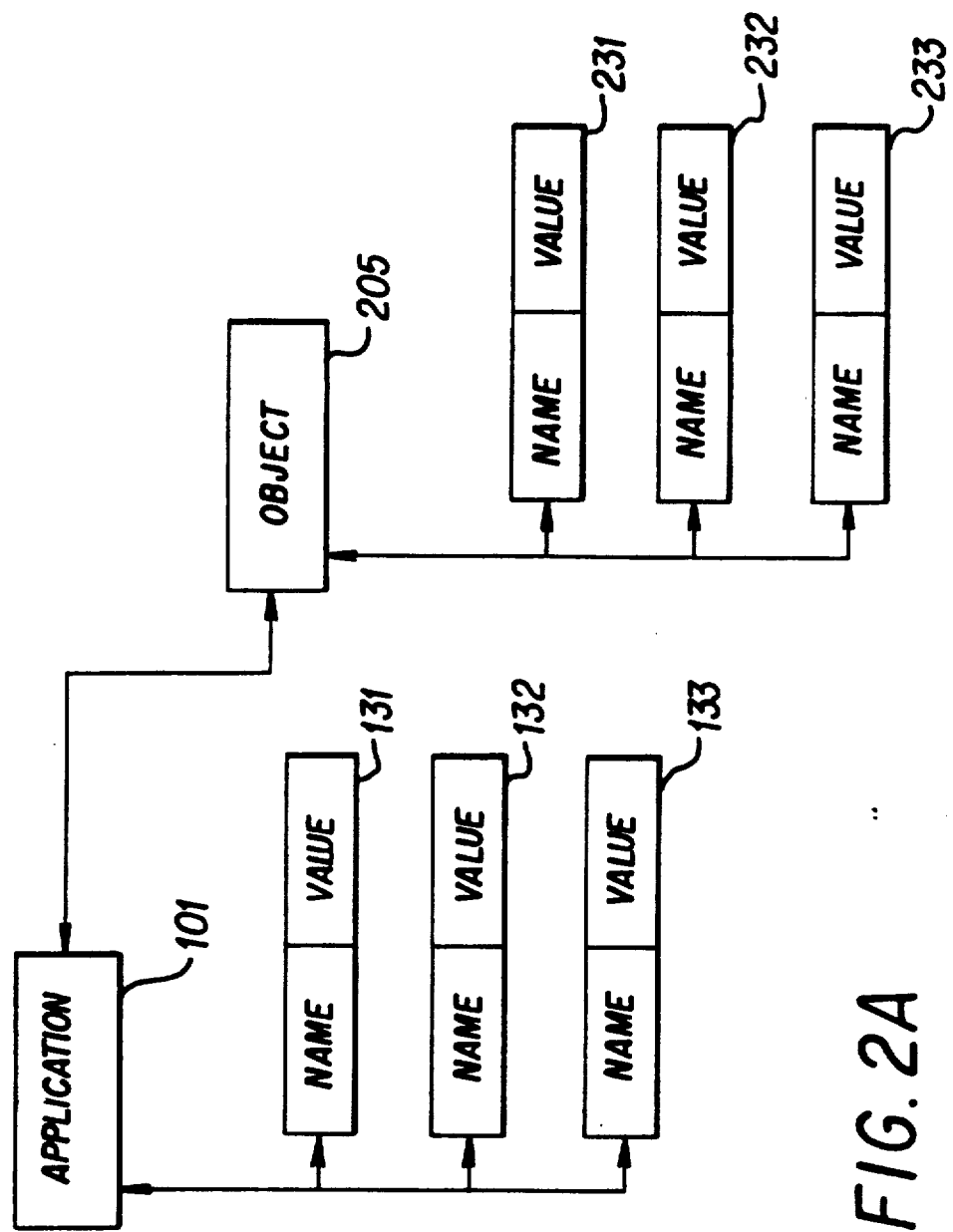

Each object has associated with it a list of properties. Each property has a name and a value which may be accessed by specifying the name. In addition, each class of objects has associated with it a list of properties that are common to all objects of that class. For instance, in FIG. 2A, object 205 and application 101 are shown. Object 205 has associated with it a property 231, a property 232, and a property 233. Application 101 has associated with it a property 131, a property 132 and a property 133.

Property lists can contain any number of properties. Each property value can be from zero to 3,2762 bytes in length. Properties are used to store descriptive information about objects and classes, such as names, comments and so on.

Objects may have references to other objects. These references are called links. Links are directional: one object is called the parent, the other the child. Each link has a reference name which is a number that is assigned by the parent object to identify each of its children. All of an object's children, its children's children, and so on are collectively called that object's descendents. Similarly, an object's parents, its parents' parents, and so on, are collectively called that object's ancestors. In the preferred embodiment of the present invention, an object which may be manipulated by a user, can have zero or more children and one or more parents. An object is not allowed to become its own descendent.

Figure 3:
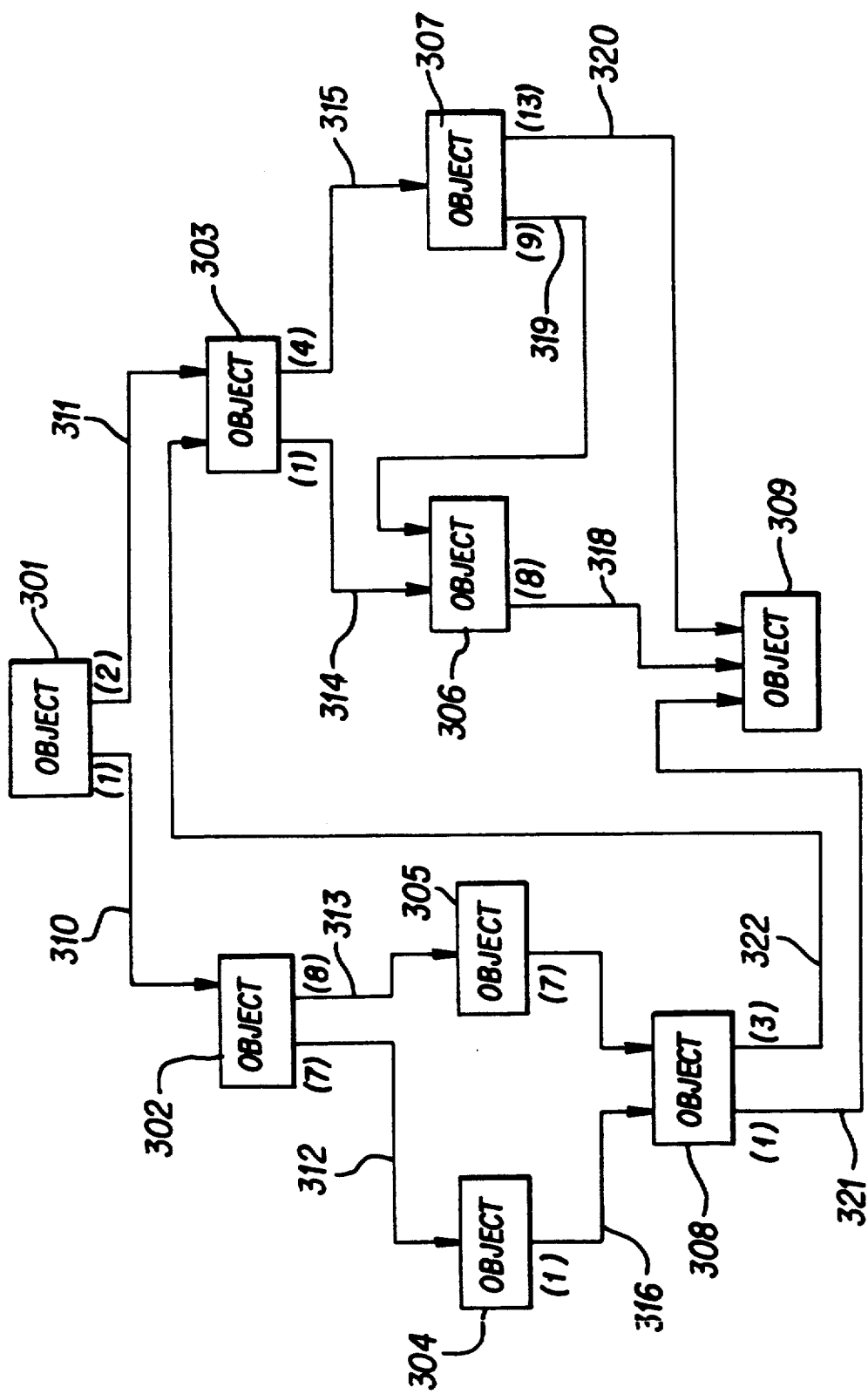
FIG. 3 shows a plurality of objects linked in accordance with a preferred embodiment of the present invention.

In FIG. 3 is shown an object 301, an object 302, an object 303, an object 304, an object 305, an object 306, an object 307, an object 308 and an object 309. Objects 301309 have links with reference names which are numbers shown in parenthesis by each link. Object 301 has a link 310, with reference name "1", to object 302. Object 301 has a link 311, with reference name "2", to object 303. Object 302 has a link 312, with reference name "7", to object 304. Object 302 has a link 313, with reference name "8", to object 305. Object 303 has a link 314, with reference name "1", to object 306. Object 303 has a link 315, with reference name "4", to object 307. Object 304 has a link 316, with reference name "1", to object 308. Object 305 has a link 317, with reference name "7", to object 308. Object 306 has a link 318, with reference name "8", to object 309. Object 307 has a link 319, with reference name "9", to object 306. Object 307 has a link 320, with reference name "13", to object 309. Object 308 has a link 321, with reference name "1", to object 309. Object 308 has a link 22, with reference name "3", to object 303.

Object 301 is a parent of 302 and 303. Object 303 is a child of object 301 and of object 308. Each of objects 302-309 are descendents of object 301. Descendents of object 303 are objects 306, 307 and 309. Object 309 has for ancestors all of objects 301-308. Object 303 has for ancestors objects 301, 302, 304, 305 and 308. And so on.

Active objects can dynamically make and delete links to other objects. When a link to an object is deleted, OMF 100 checks if the object has any other parents. If not, OMF 100 destroys the object by deleting the data files of the object and reclaiming other storage space associated with the object.

Figure 4:
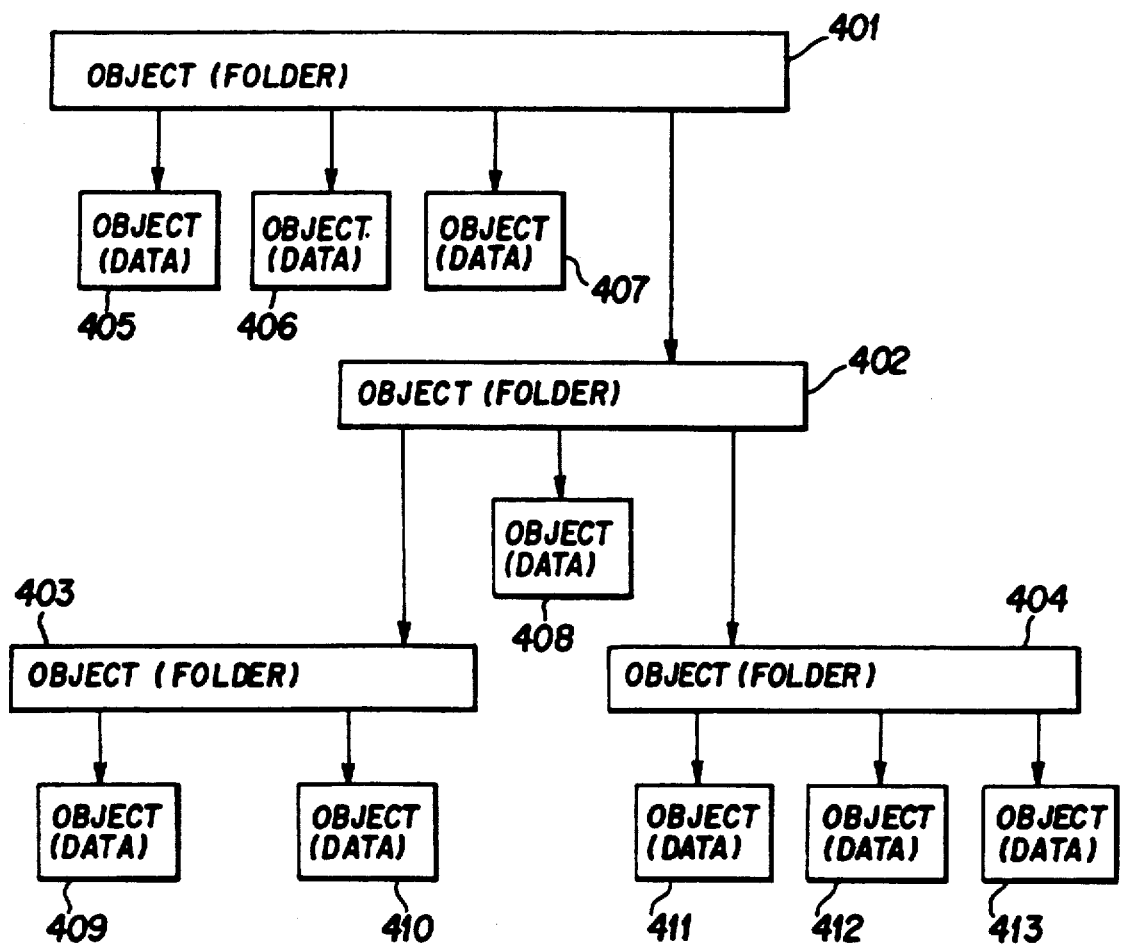
FIG. 4 shows a series of objects serving as folders, as parents of objects containing data, in accordance with a preferred embodiment, of the present invention.

Object links may be used for various purposes. For example, folders may be in the form of objects. The children of objects used as folders may be objects containing data for use with various applications, or the objects may be other folders. FIG. 4 shows an example of the use of objects as folders. An object 401 (also called folder 401), an object 402 (also called folder 402), an object 403 (also called folder 403) and an object 404 (also called folder 404) are used as folders. Folder 401 contains an object 405, used to contain data, an object 406, used to contain data, an object 407, used to contain data, and folder 402. Folder 402 contains an object 408, used to contain data, folder 403 and folder 404. Folder 403 contains an object 409, used to contain data, and an object 10, used to contain data. Folder 404 contains an object 11, used to contain data, an object 412, used to contain data and an object 413, used to contain data.

Figure 5:
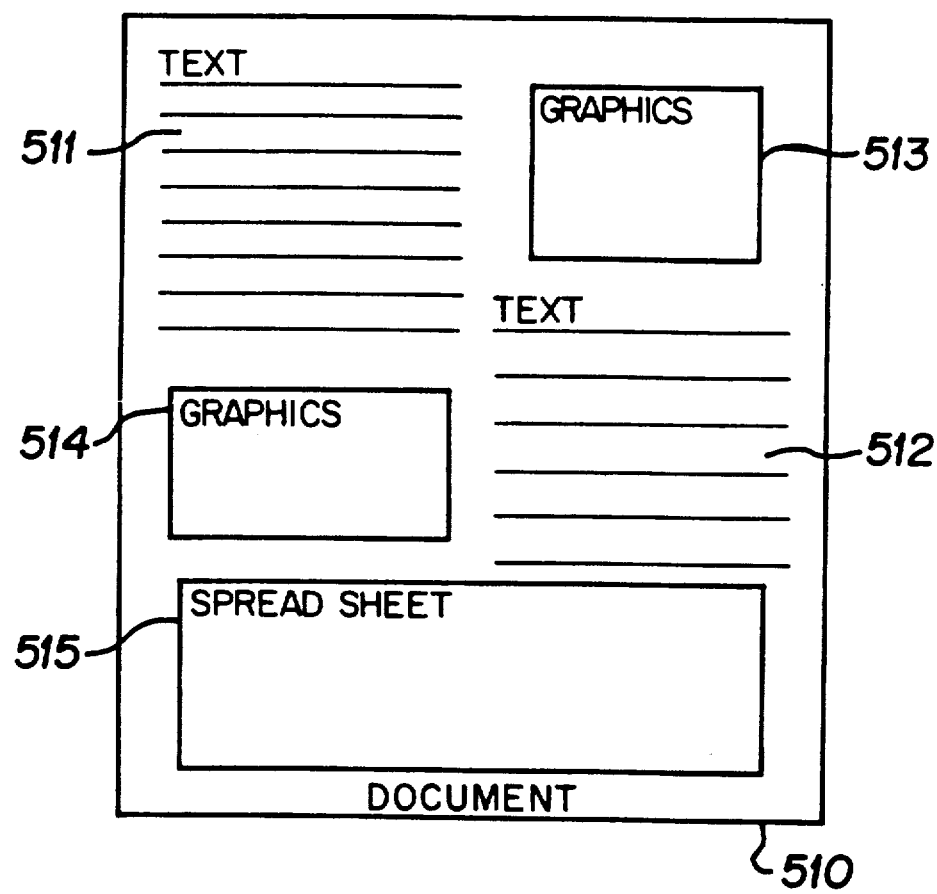
FIG. 5 illustrates the screen display which results from linking of various objects in accordance with a preferred embodiment of the present invention.
Figure 6:
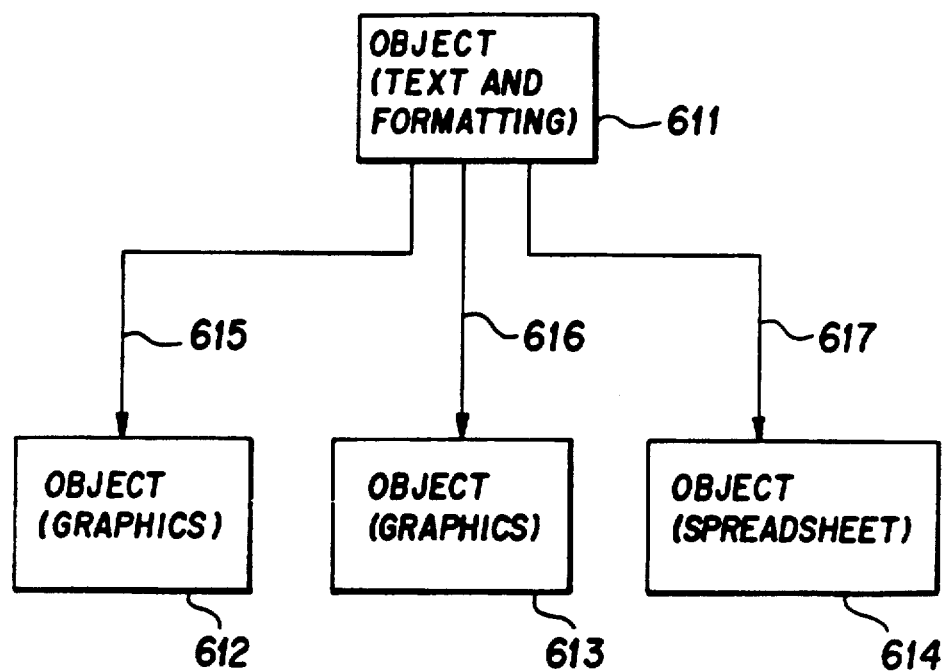
FIG. 6 shows the linking of objects in order to create the screen display shown in FIG. 5.

A more sophisticated use of links is to construct compound objects. For instance in FIG. 5, a document 510 contains lines of text 511, lines of text 512, a graphics FIG. 513, a graphics FIG. 514 and spreadsheet data 515. As shown in FIG. 6, text and formatting data is stored in an object 611, graphics data for graphics FIG. 513 is stored in an object 612, graphics data for graphics figure 514 is stored in an object 613 and spreadsheet data 515 is stored in object 614. Links that are used to build compound objects always have some kind of data transfer associated with the link and hence are called data links. In FIG. 6 is shown a data link 615, a data link 616 and a data link 617. In document 510, data from object 612, object 613 and object 614 are merely displayed, therefore data link 614, data link 615 and data link 616 are visual data links. In a visual data link, the parent will send requests to its child to display data within the parent's window.

Figure 7:
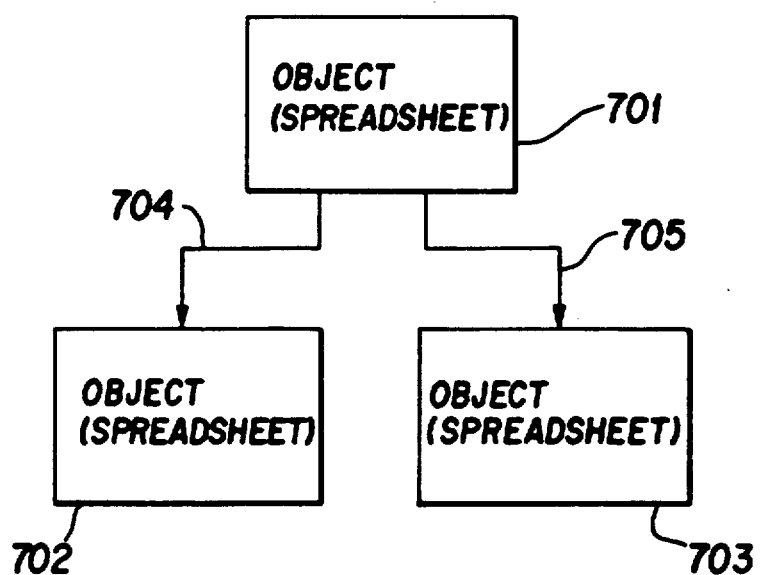
FIG. 7 shows how three objects may be linked together in accordance with a preferred embodiment of the present invention.

In FIG. 7, an object 701, which contains data for a first spreadsheet, is linked through data link 704 to an object 702, which contains data for a second spreadsheet, and is linked through data link 705 to an object 703, which contains data for a third spreadsheet. The first spreadsheet uses data from the second spreadsheet and from the third spreadsheet. Since the first spreadsheet does more than merely display data from the second and the third spreadsheets, data link 704 and data link 705 are called data-passing data links.

OMF 100 does the "bookkeeping" when objects are copied or mailed. When an object is copied, OMF 100 makes copies of data files associated with the object. If the object being copied has children, OMF 100 also makes copies of the object's descendents, and builds links between the new objects to give the new compound object the same structure as the original.

Figure 8:
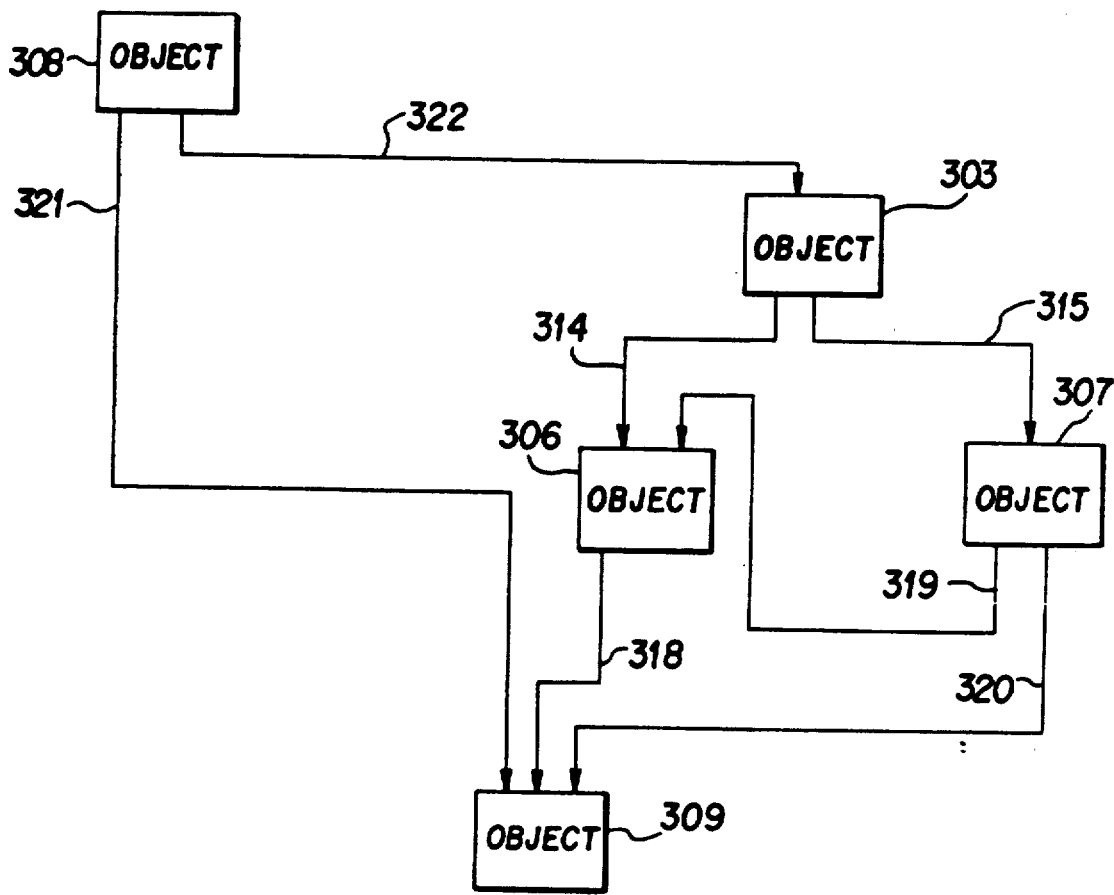
FIG. 8 and FIG. 9 illustrate how an object may be copied in accordance with a preferred embodiment of the present invention.
Figure 9:
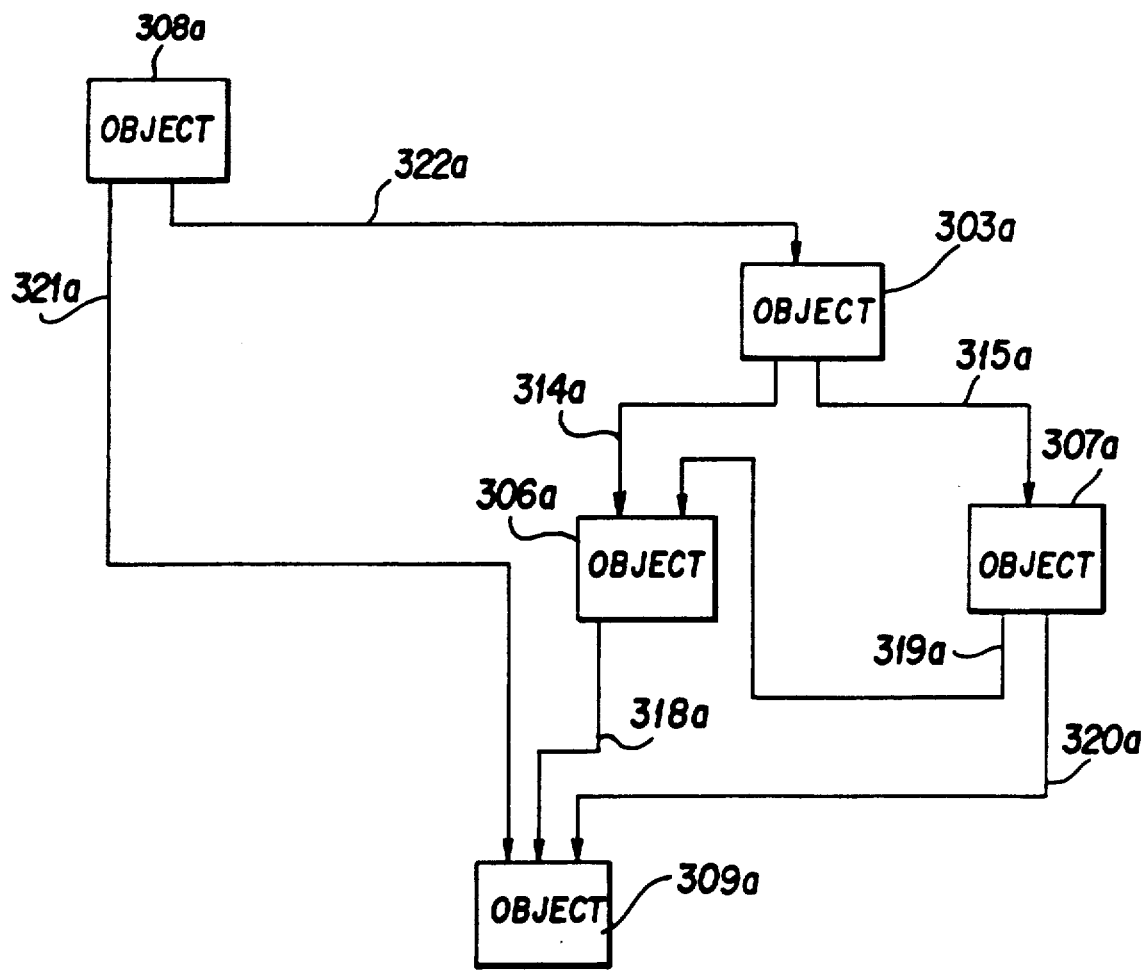

For instance, FIG. 8 shows object 308, from FIG. 3, and the descendents of object 308. When OMF makes a copy of object 308, OMF copies each of object 308's descendents and the links shown in FIG. 8. FIG. 9 shows a copy of object 308. Object 308a is a copy of object 308. Object 303a is a copy of object 303. Object 306a is a copy of object 306. Object 307a is a copy of object 307. Object 309a is a copy of object 309. Link 321a is a copy of link 321. Link 322a is a copy of link 322. Link 314a is a copy of link 314. Link 315a is a copy of link 315. Link 318a is a copy of link 318. Link 319a is a copy of link 319. Link 320a is a copy of link 320.

Figure 11:
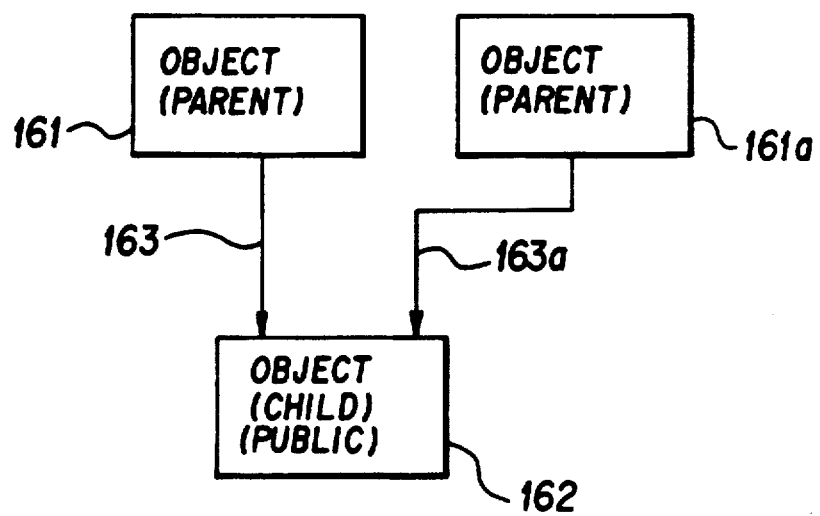
FIG. 10 and FIG. 11 illustrate the copying of a public object in accordance to a preferred embodiment of the present invention.
Figure 10:
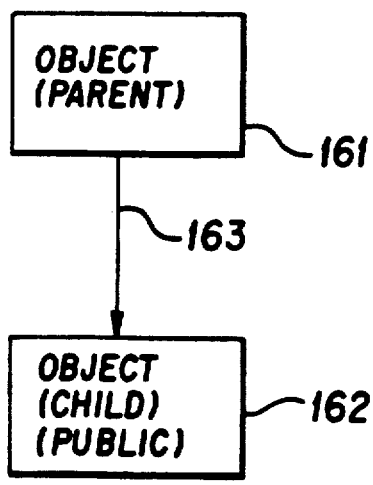

In the preferred embodiment, the default behavior results in the copy of a parent's children when the parent is copied. However, when a child is designated as "public" it is not copied. Rather, a copy of the parent includes a link to the child. For instance, in FIG. 10, a parent object 161 is to be copied. Parent object 161 is linked to a child object 162 through a link 163. Child object 162 is a public object. As shown in FIG. 11, copying of parent object 161 results in new object 161a being linked to object 162 through a new link 163a. Object 161a is a copy of object 161. Link 163a is a copy of link 163.

Figure 12:
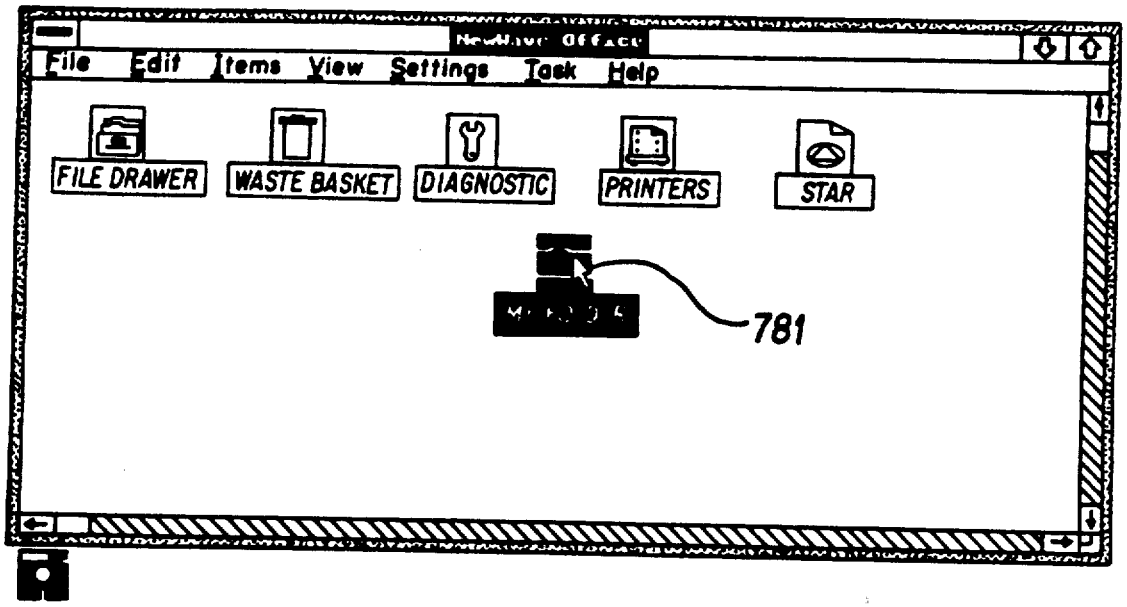
FIGS. 12 through FIG. 71 show the appearance on a screen of a session in which a user manipulates objects in accordance with a preferred embodiment of the present invention. Also shown are block diagrams of how objects appearing to the user are linked in accordance to the preferred embodiment of the present invention.
Figure 71:
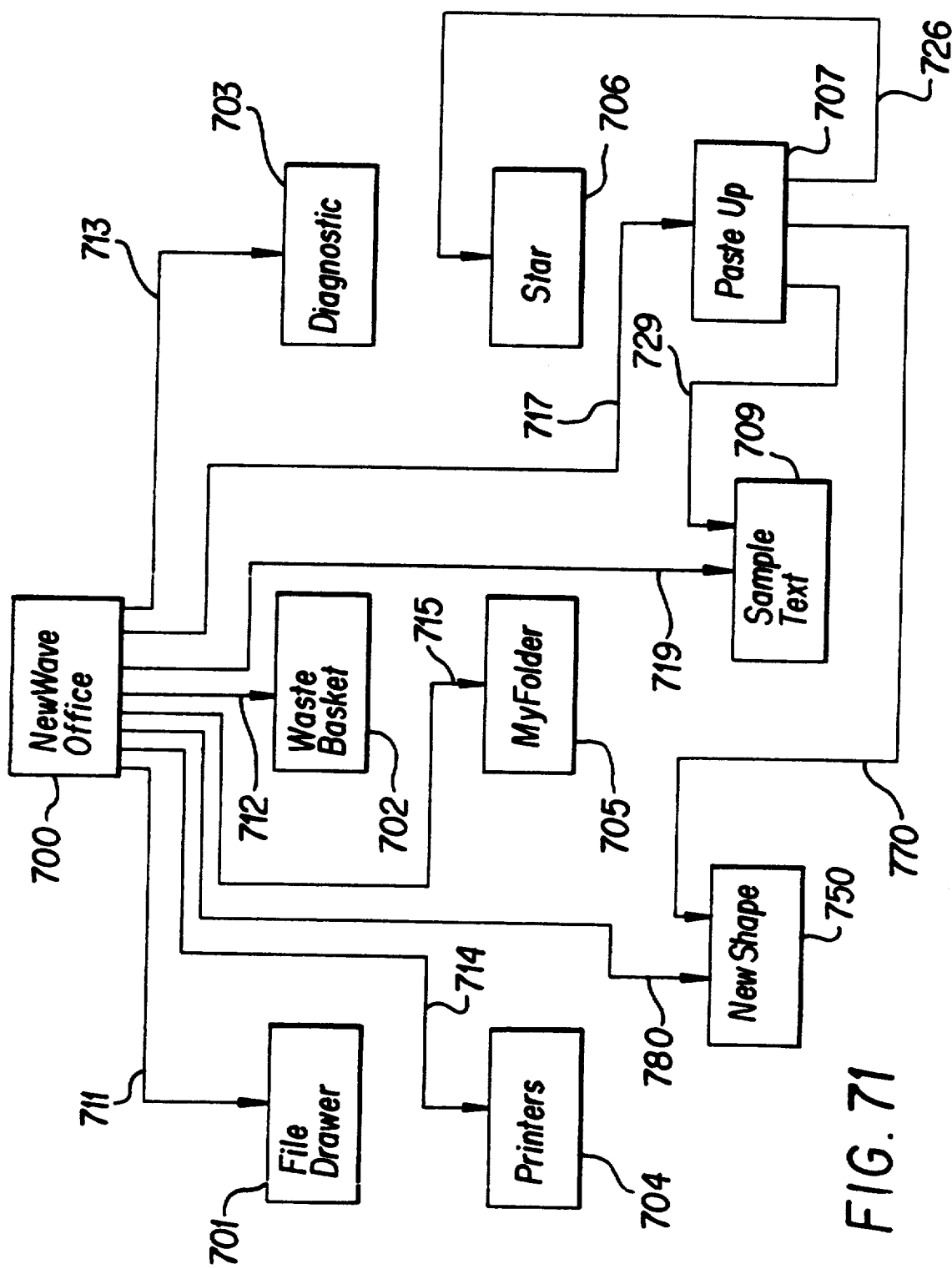

In FIG. 12 through FIG. 71, it is shown how objects are displayed to a user on monitor 14. In FIG. 12 a "NewWave Office" desktop is shown to include icons labelled as "File Drawer", "Waste Basket", "Diagnostic", "Printers", "Star" and "My Folder". A user (not shown) has manipulated a cursor 781, using keyboard 19 or mouse 20, to select "My Folder".

Figure 13:
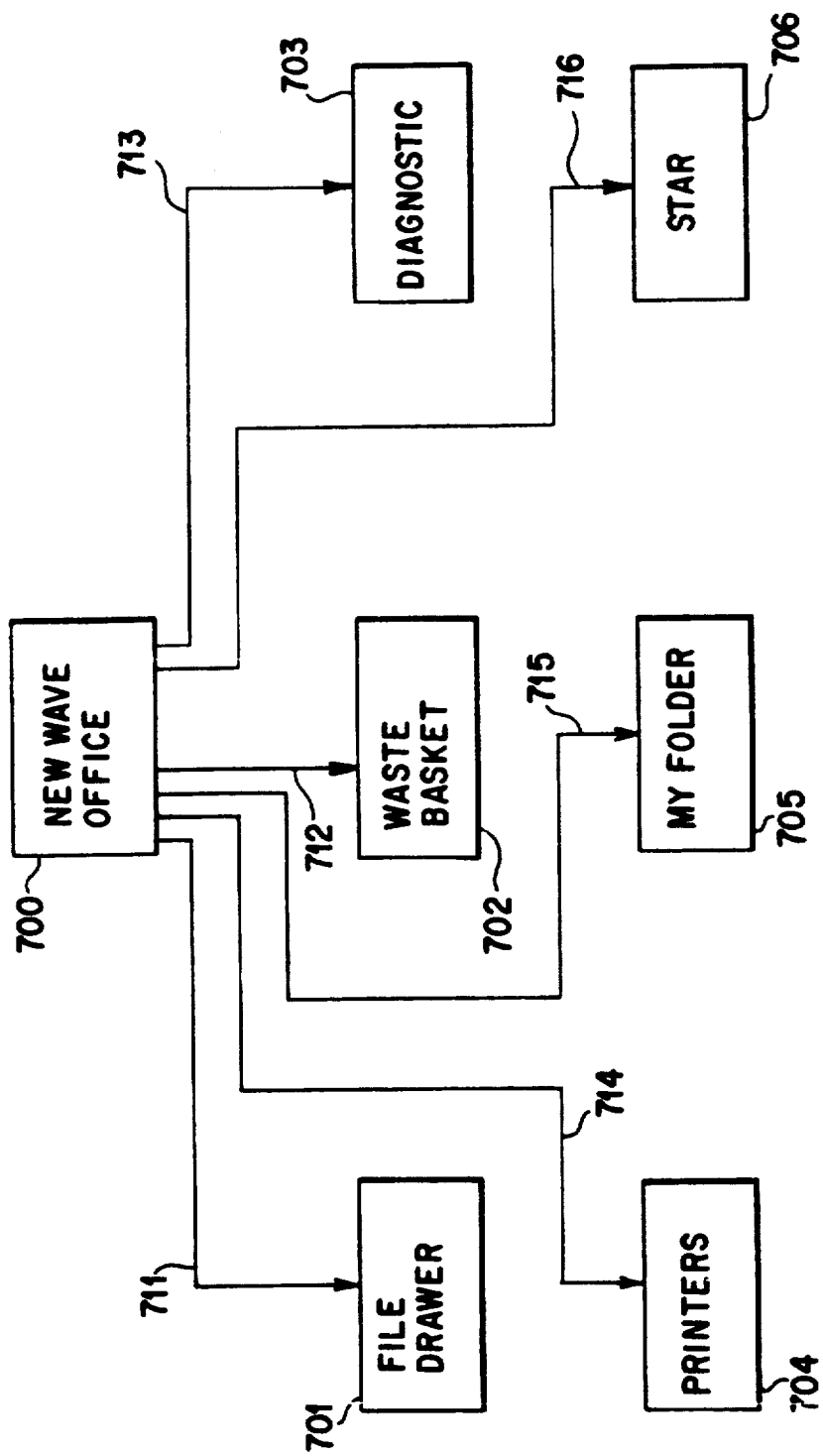

FIG. 13 shows how the objects displayed on monitor 14 are linked. NewWave Office (shown as an object 700) is the parent of "File Drawer" (shown as an object 701) through a link 711, of "Waste Basket" (shown as an object 702) through a link 712, of "Diagnostic" (shown as an object 703) through a link 713, of "Printers" (shown as an object 704) through a link 714, of "My Folder" (shown as an object 705) through a link 715 and of "Star" (shown as an object 706) through a link 716.

Figure 14:
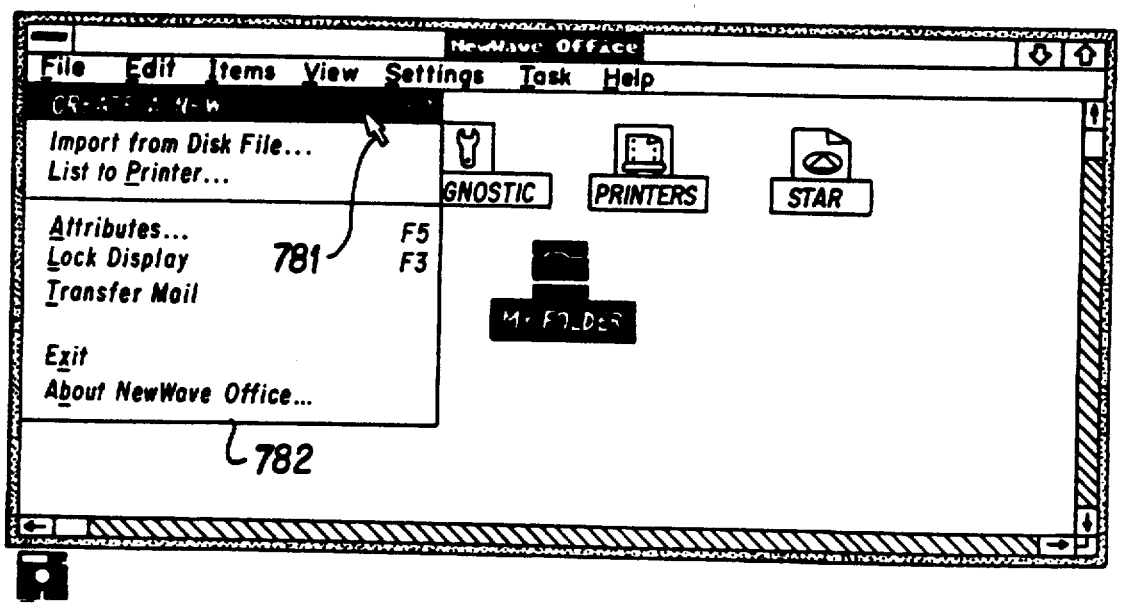
Figure 15:
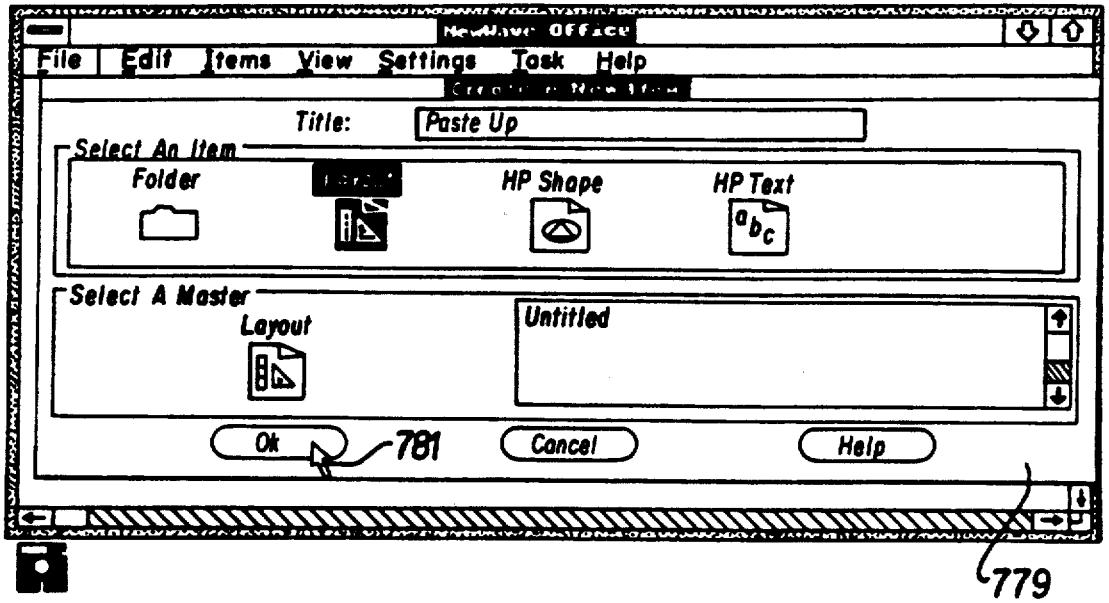
Figure 16:
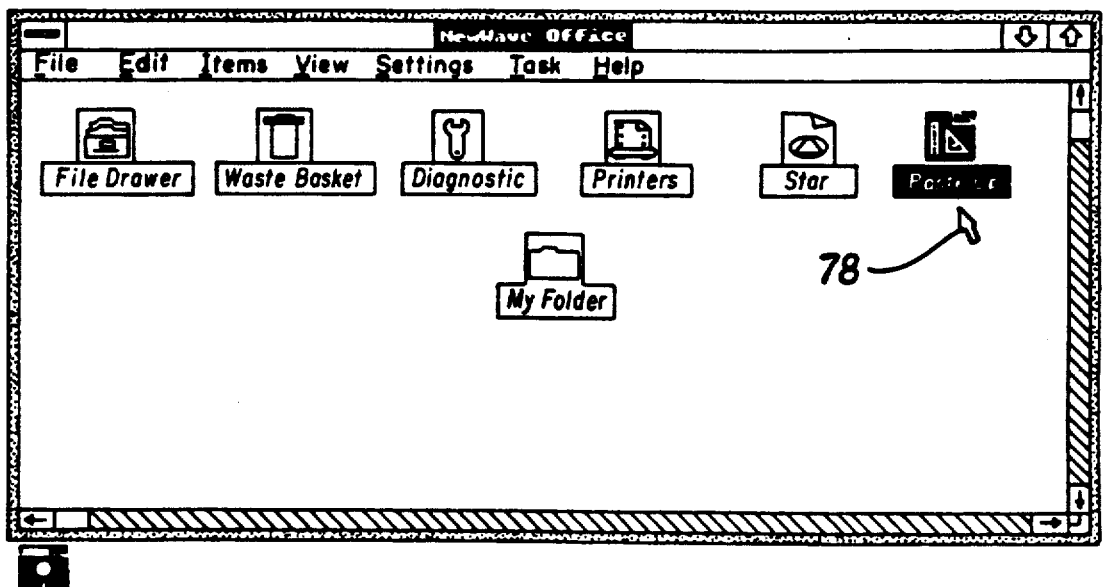

In FIG. 14, the user, using cursor 781, has selected "Create a New . . . " in a pull down menu 782. As a result of this selection a dialog box 779 appears as shown in FIG. 15. Using cursor 781, the user has highlighted the icon "Layout" and using keyboard 19 has typed in the name "Paste Up" as a name for a new object to be created. Cursor 781 now points to a region labelled "OK". Once this region is selected, a new object titled "Paste Up" is created, as is shown in FIG. 16.

Figure 17:
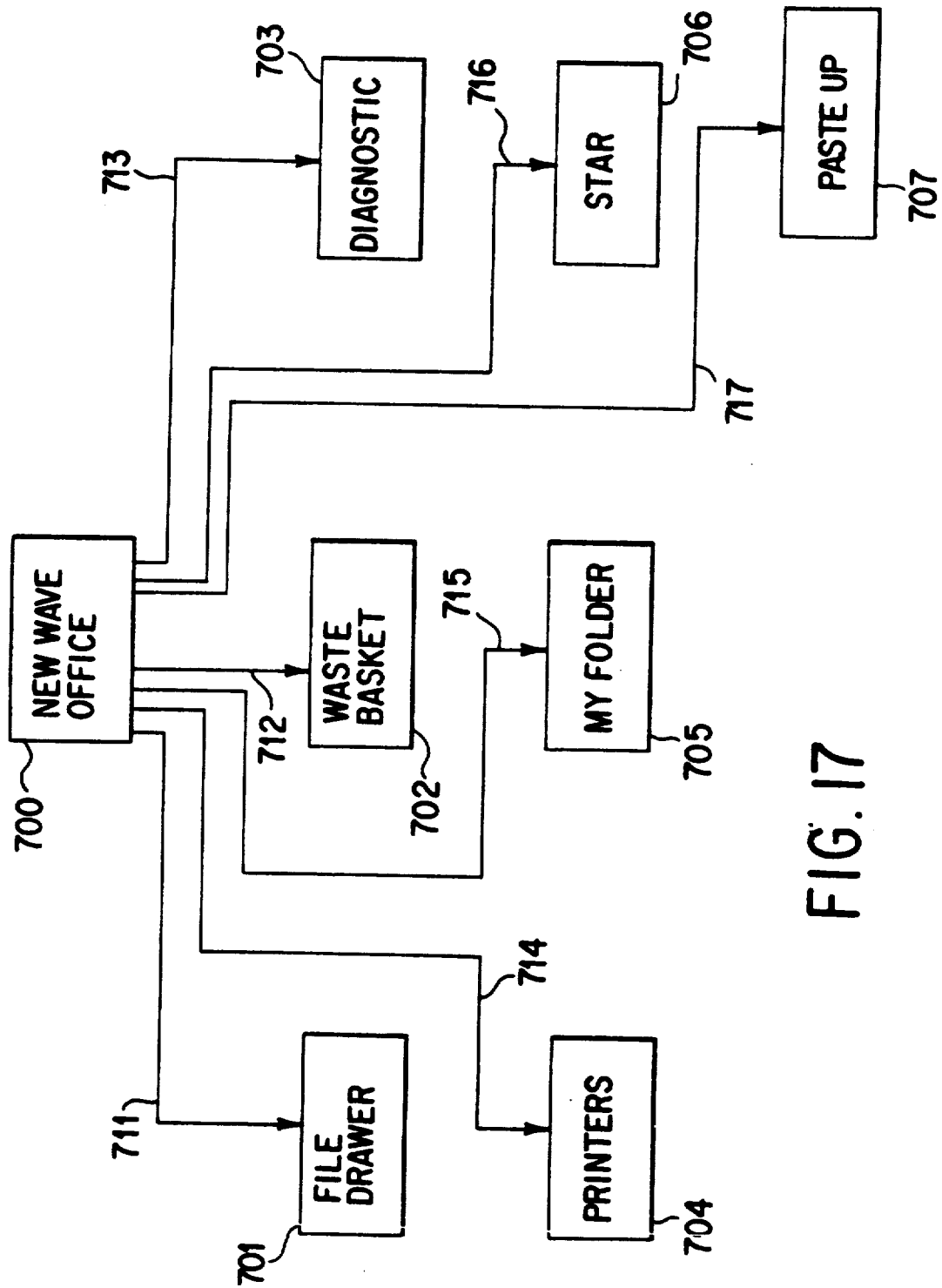

In FIG. 17, "Paste Up" is shown as an object 707 linked as a child of NewWave Office through a link 717.

The basic clipboard operations are Cut, Copy, and Paste. The user must select the data that is to be moved or copied, and then give either the Cut command or the Copy command. Cut moves the selected data to the clipboard (deleting it from its original location). Copy makes a copy of the selected data on the clipboard. The user must then select the location where he wants the data to be moved or copied to, and give the Paste command. This command copies the contents of the clipboard to the selected location.

Figure 18:
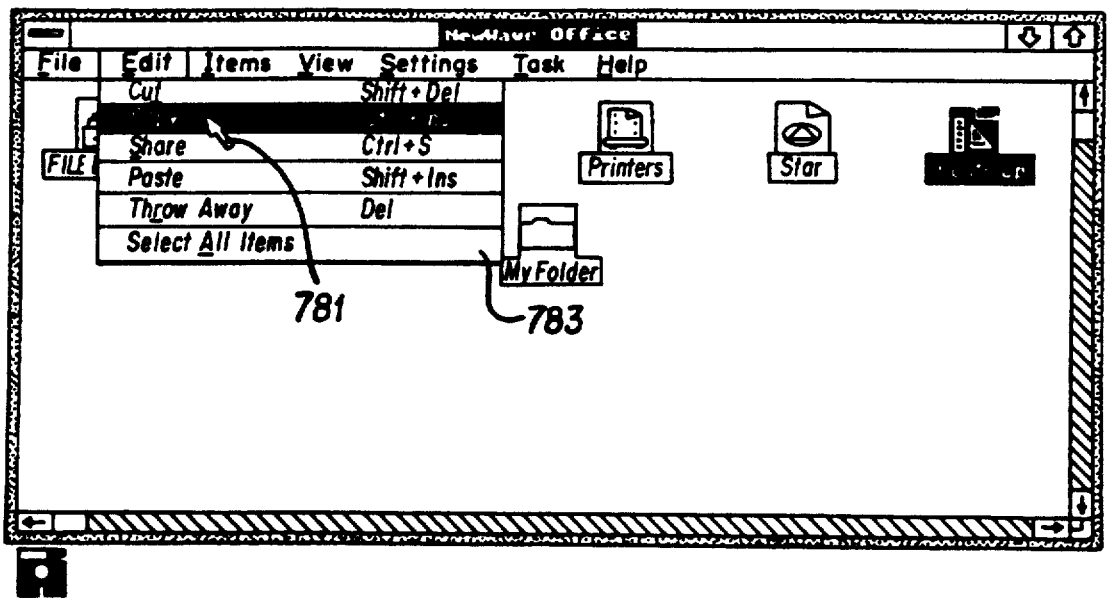
Figure 18A:
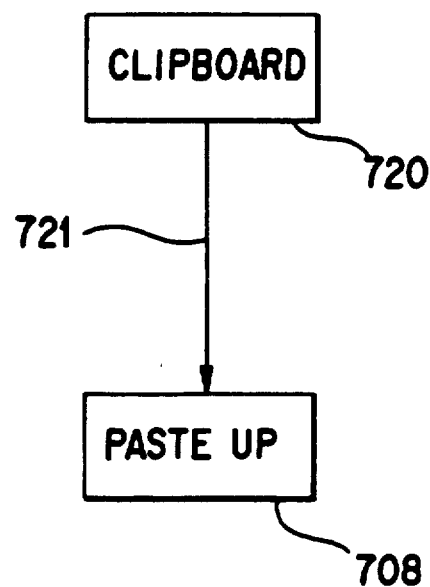

In FIG. 18 a user is shown to have selected "Paste Up". The selection is represented by the icon for "Paste Up" being displayed using inverse video. With cursor 781, the user selects "Copy" from a pull down menu 783. In FIG. 18A a Clipboard object 720 is shown to be a parent of an object 708 through a link 721. Object 708, is a copy of object 707 ("Paste Up").

Figure 19:
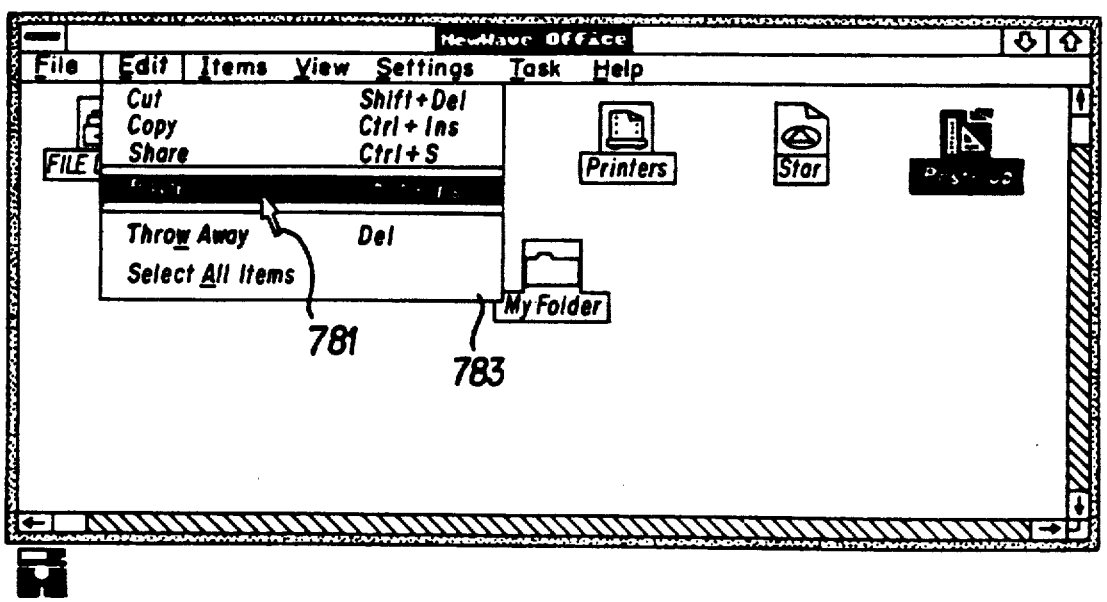
Figure 20:
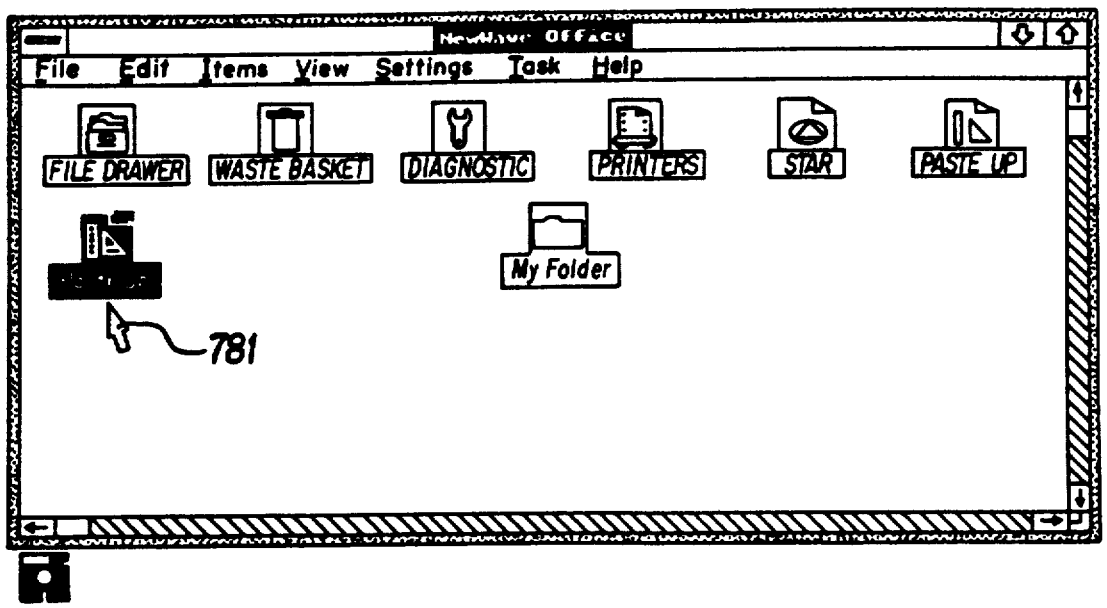

As shown in FIG. 19, next the user selects "Paste" from pull down men 783. The result, shown in FIG. 20, is the addition of an object 708, pointed to by cursor 781, which is a copy of the original "Paste Up" object 707.

Figure 21:
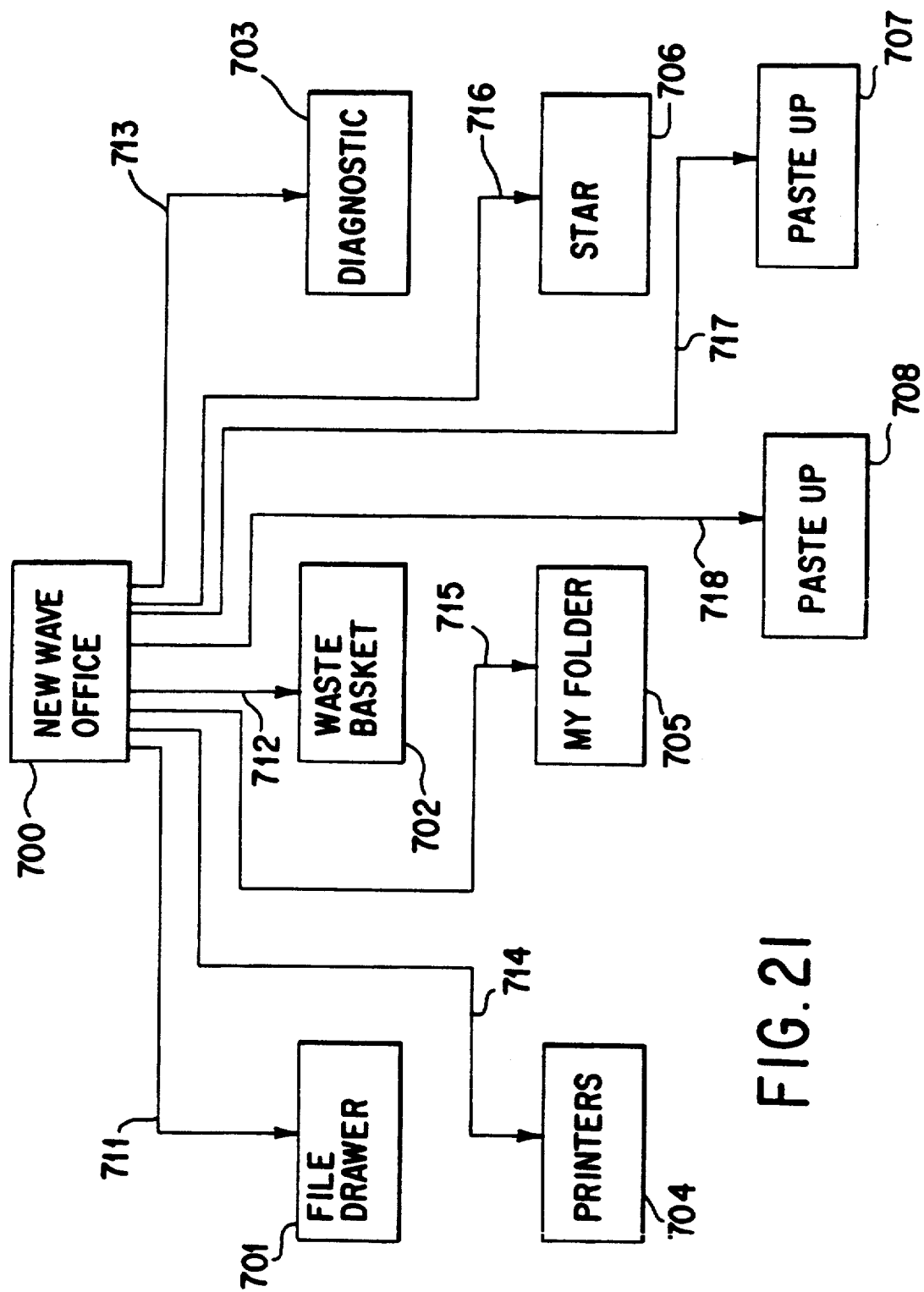

In FIG. 21, the new object is shown as object 708 linked as a child of NewWave Office through a link 718.

Figure 22:
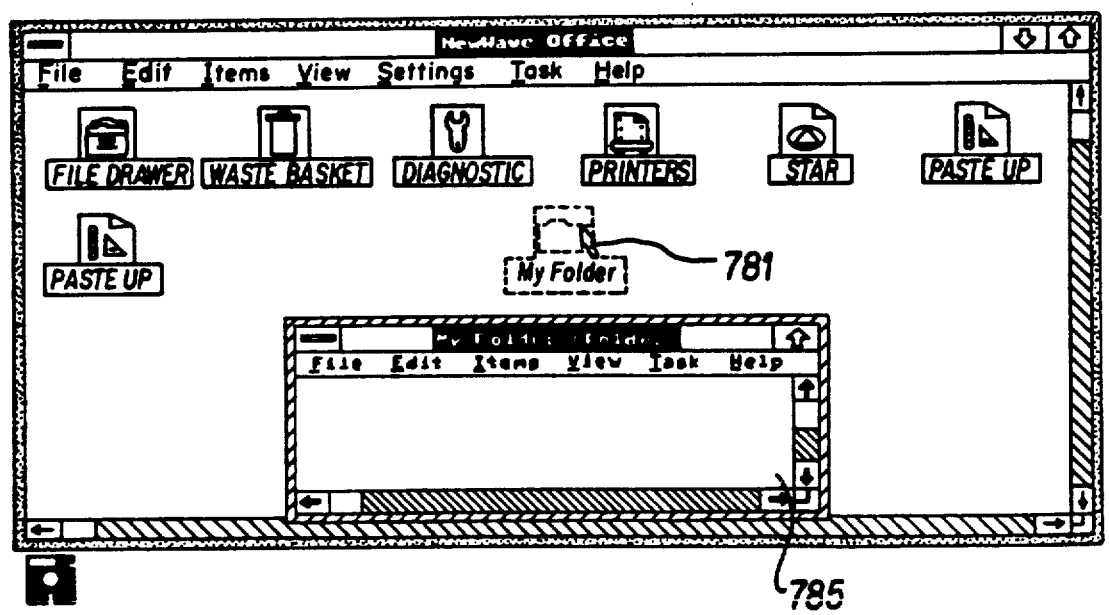

In FIG. 22, "My Folder", has been opened by double clicking the icon for "My Folder" using cursor 781. The result is a new window 785 representing "My Folder".

Figure 23:
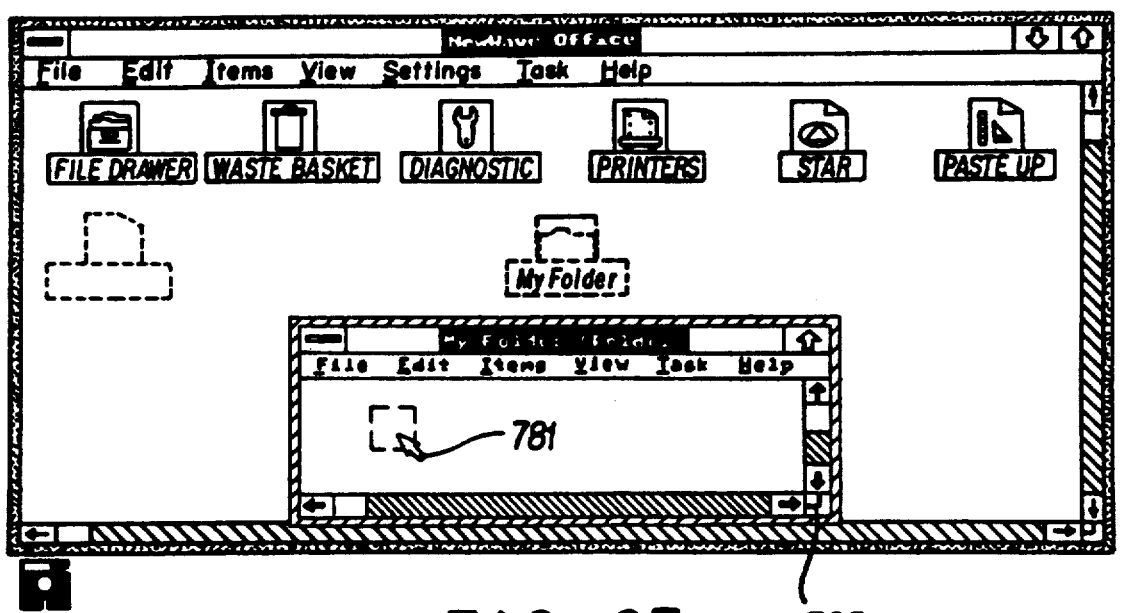
Figure 24:
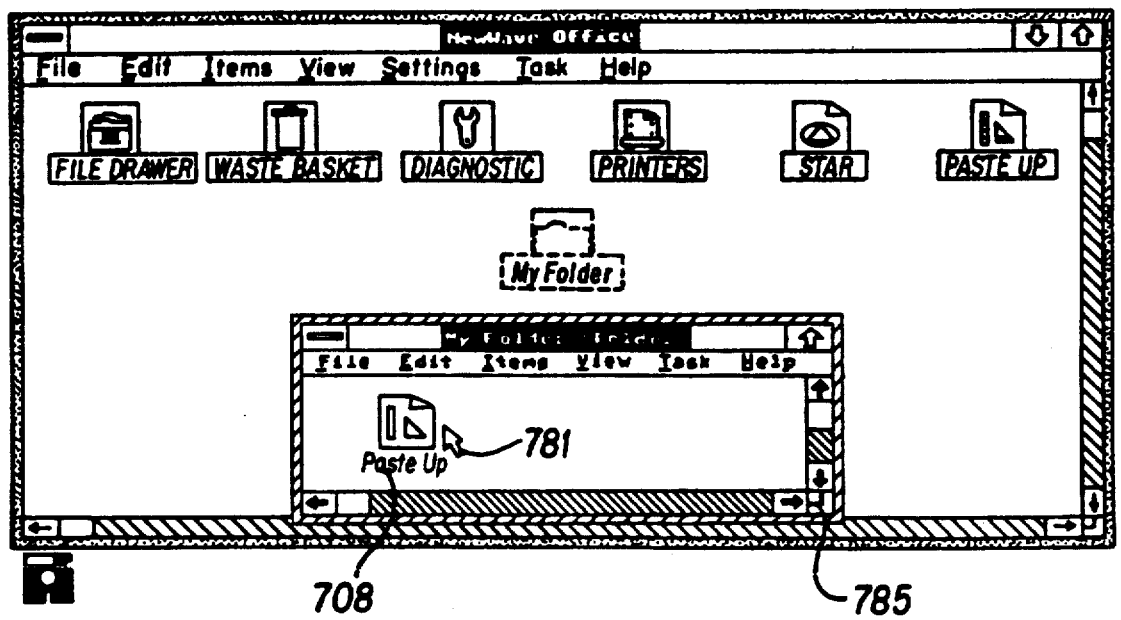
Figure 25:
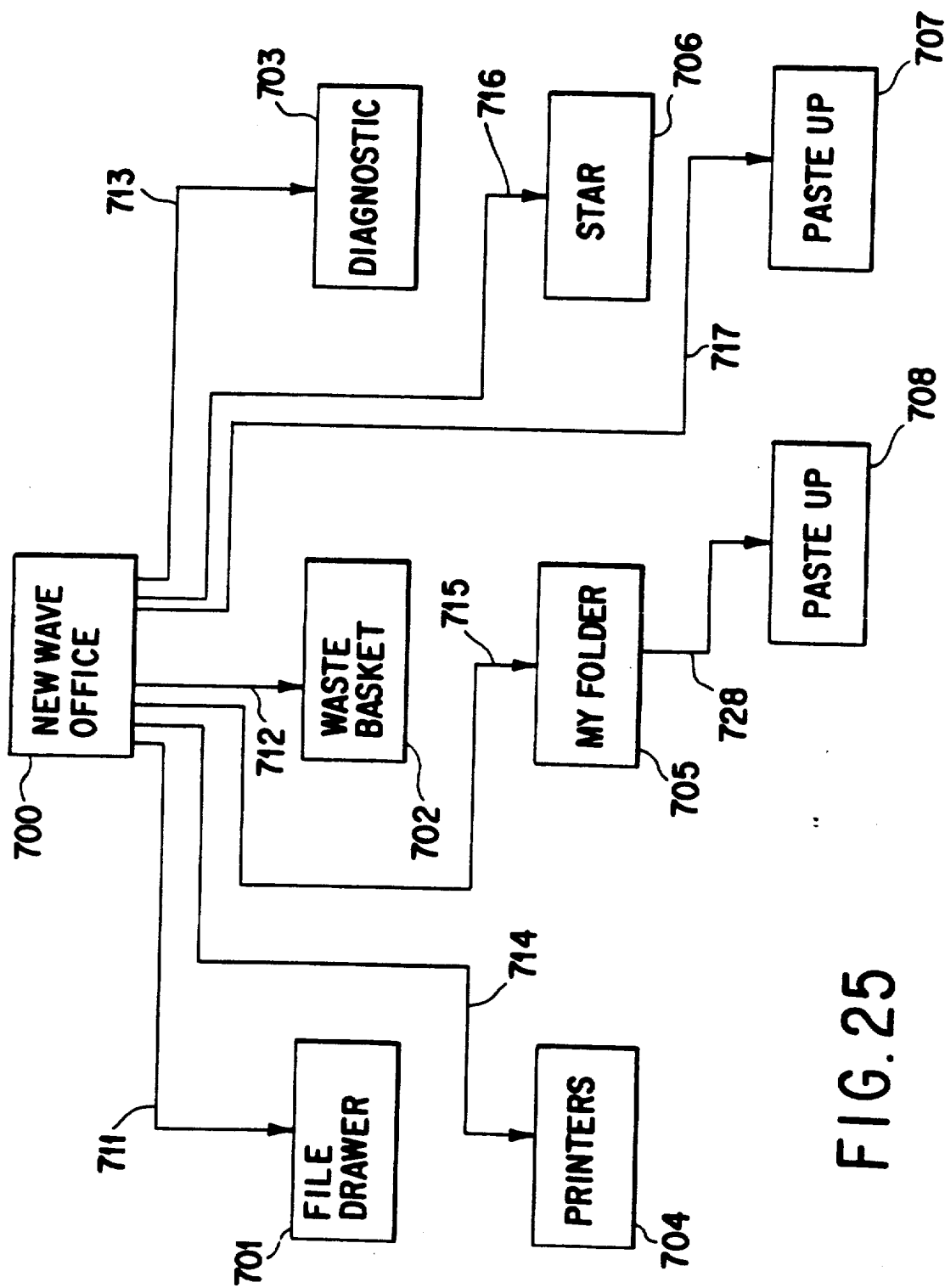

In FIG. 23, using cursor 781, "Paste Up" (object 708) is shown being dragged to window 785. In FIG. 24, the process is complete and "Paste Up" (object 708) is now in window "My Folder". In FIG. 25, "Paste Up", shown as object 708, is now a child of "My Folder" through link 728.

The user sets up multiple links by using the Share command. This command is an extension of the clipboard metaphor common in software packages today for moving and copying data around the system. The clipboard is a special buffer that the system uses to hold data that is in transit.

In one way, the Share command operates similarly to the Cut or Copy command described above. That is, using Share, Cut, or Copy, the user selects some data first and then gives the Share command, which results in something being put on the clipboard. In the case of the Share command, however, what is put on the clipboard is neither the actual data nor a copy of the actual data. Instead, it is a link to the selected data. When this link is pasted, a permanent connection is made between the original data and the location of the Paste. Through use of OMF 100, this link is used by the involved applications to provide easy access to the original data (in its full application) and automatic updating when the original data is modified.

Figure 26:
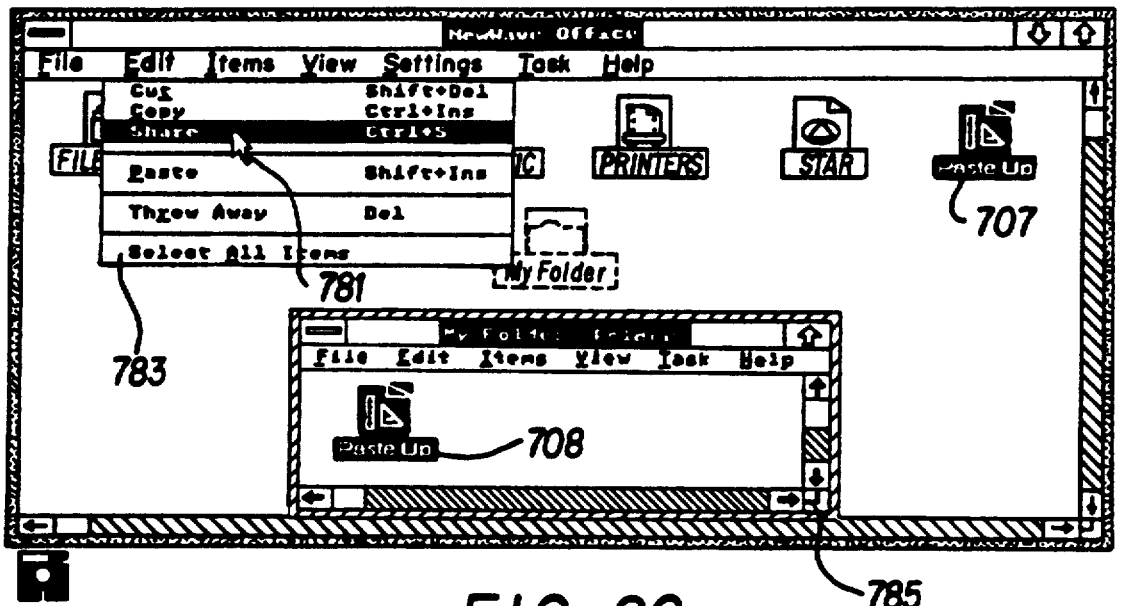

In FIG. 26, the NewWave Office window has been activated. "Paste Up" (object 707) has been selected, as evidenced by "Paste Up" (object 707) being in inverse video. Using cursor 781, "Share" from menu 783 is selected. In FIG. 720, Clipboard object 720 is shown to be a parent of "Paste Up" object 707 through a link 722.

Figure 27:
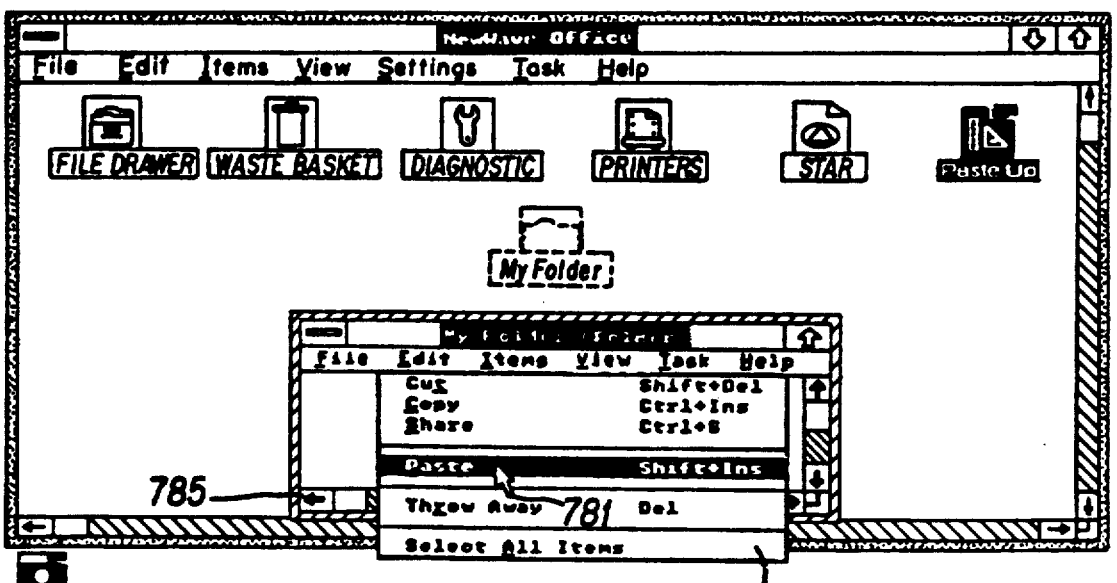
Figure 26A:
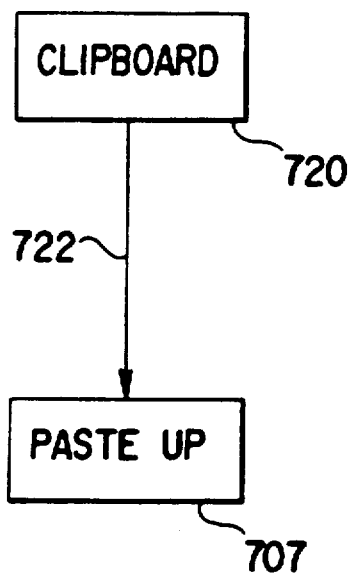
Figure 28A:
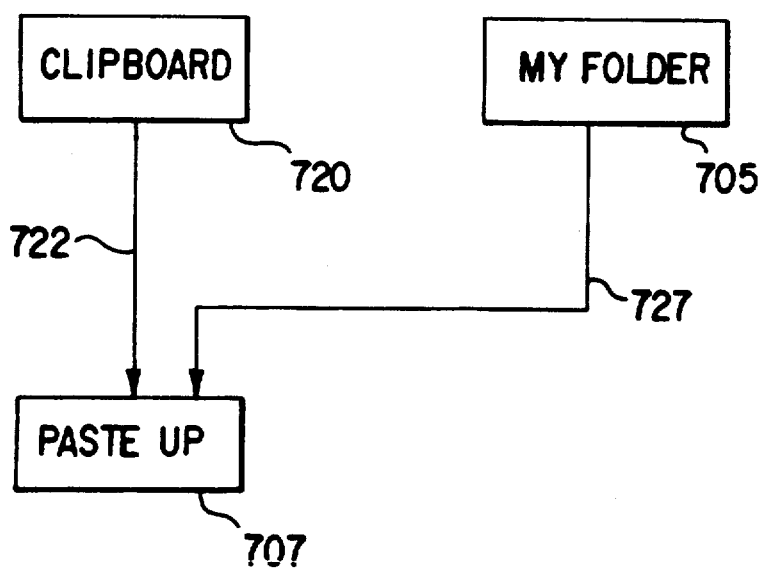
Figure 28:
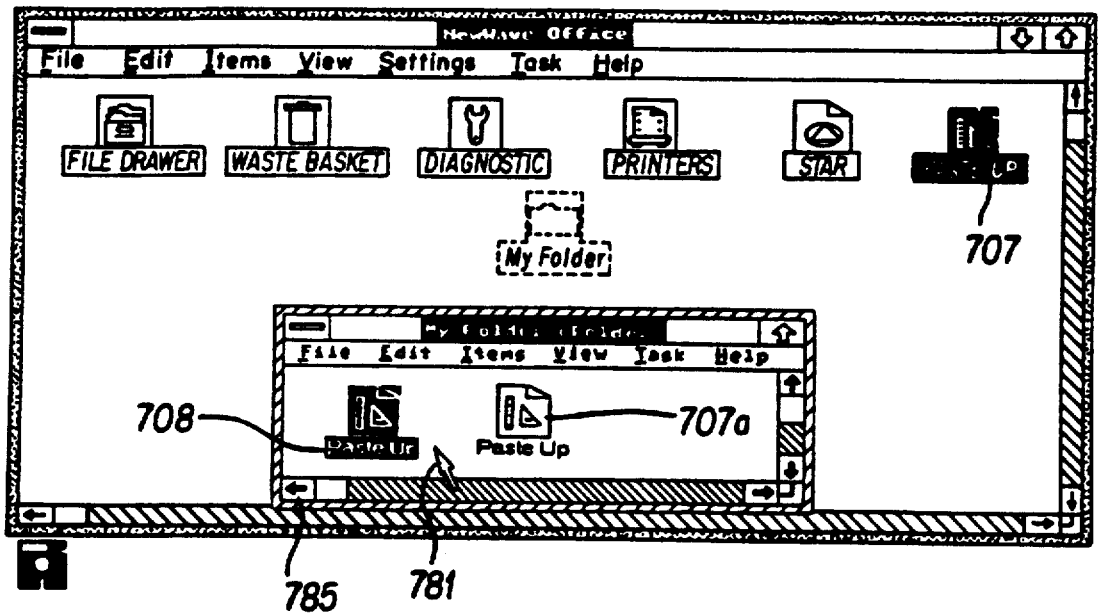
Figure 29:
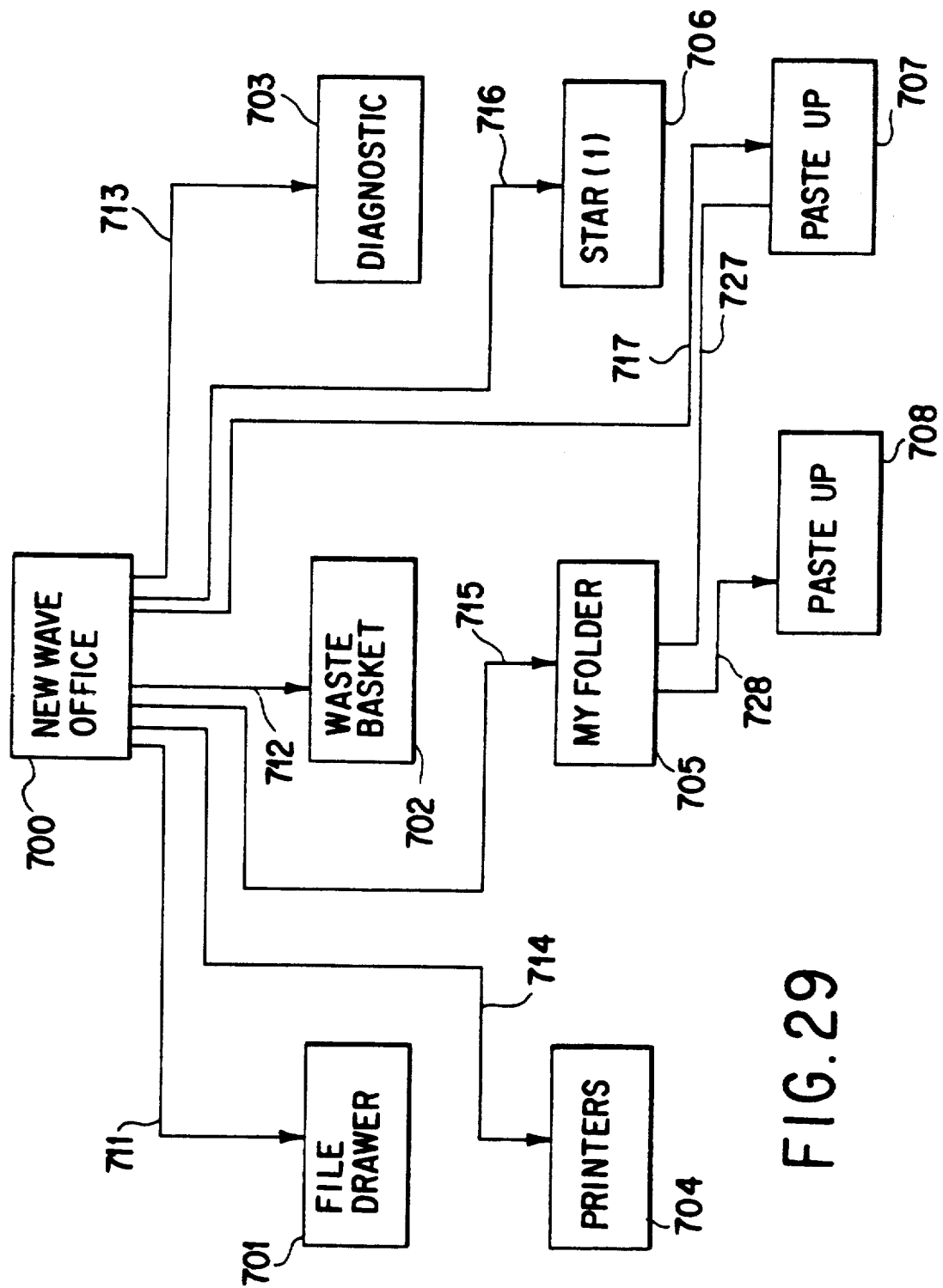

In FIG. 27, window 785 has been activated. From a menu 787, "Paste" is selected. The result, shown in FIG. 28, is an icon 707a appearing in window 785, which indicates that "Paste Up" (object 707) is shared by window 785 and the NewWave Office window. In FIG. 28A, as a result of the paste, "Paste Up" is now shown to be both a child of Clipboard 720 through link 722 and a child of "My Folder" 705 through a link 727. In FIG. 29, showing just the interconnection of objects visible to the user, "Paste Up" (object 707) is shown to ba a child of "My Folder" 705 through link 727. Since "Paste Up" (object 707) is shared, not copied, "Paste Up" (object 707) remains a child of NewWave Office through link 717.

One key feature of data links is automated data transfer. When a child object is open and the user changes a part of it which is "shared out", then it makes a call to OMF 100. OMF 100 checks if any of the object's parents "care" about this particular change. If they care and if they are also open, OMF 100 sends to the parents a message informing them that new data is available. The parent can then send messages to the child to produce or display the data. This feature allows the user to establish compound objects with complex data dependencies, and then have changes made to any sub-part be automatically reflected in other parts. For example, changing a number in a spreadsheet could cause a graph to be re-drawn, and updated as a figure in a document. And since an object can have many parents, a single object can be used as "boiler plate" for any number of other objects. A change in the boiler plate will be reflected in all the objects which have links to it. Automated data transfer is illustrated in the following discussion.

Figure 30:
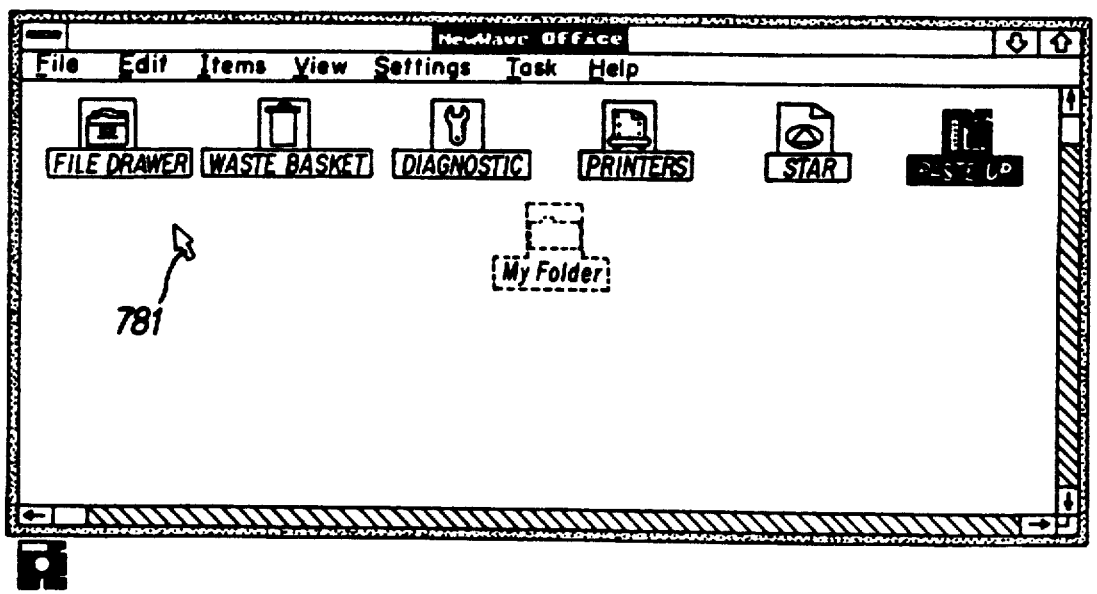
Figure 31:
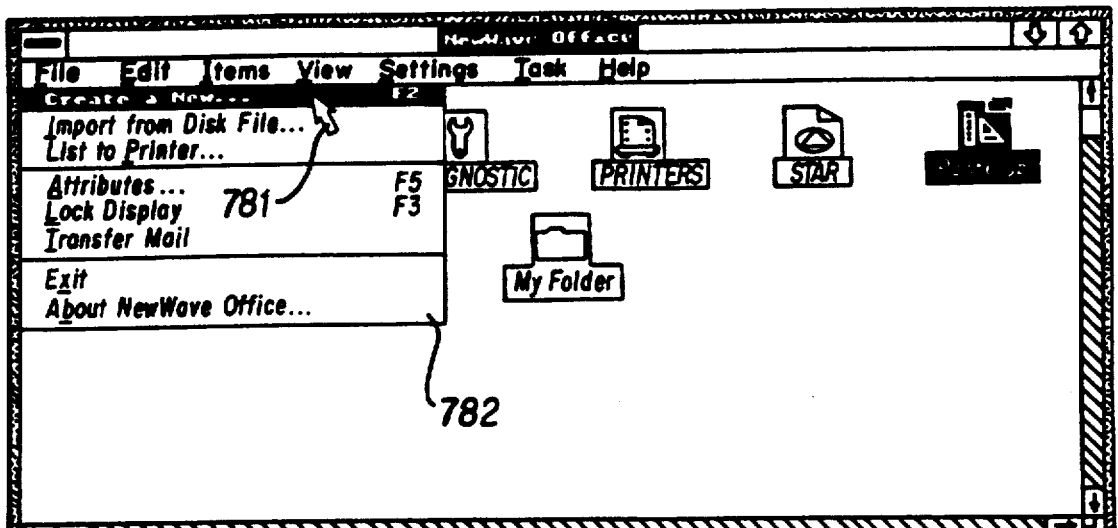
Figure 32:
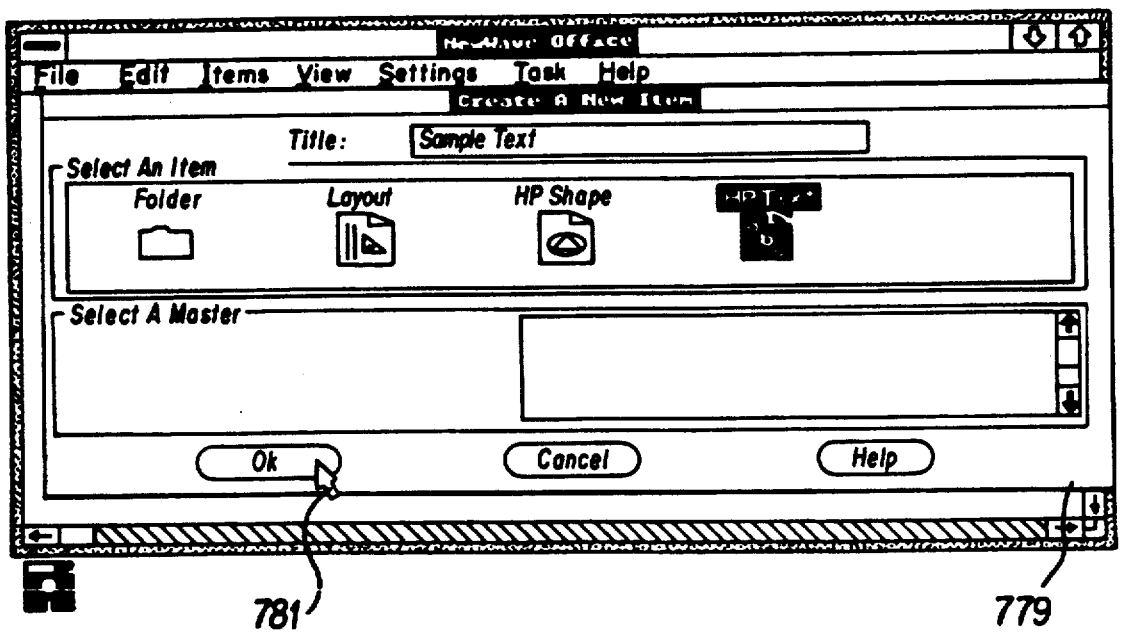
Figure 33:
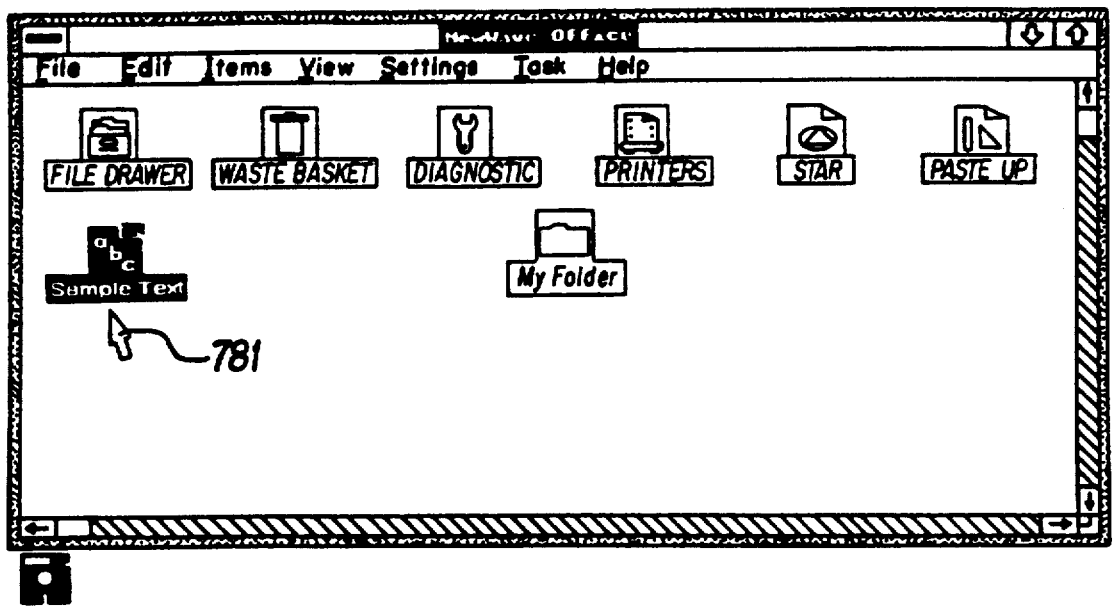

In FIG. 30, window 785 for "My Folder" has been closed. In FIG. 31, cursor 781 is used to select "Create a New . . . " from pull down menu 782. As a result of this selection dialog box 779 appears as shown in FIG. 32. Using cursor 781, the icon HPText has been highlighted and using keyboard 19 the name "Sample Text" has been typed in as the name for a new object to be created. Cursor 781 now points to a region labelled "OK". Once this region is selected, a new object titled "Sample Text" is created, as is shown in FIG. 33.

Figure 34:
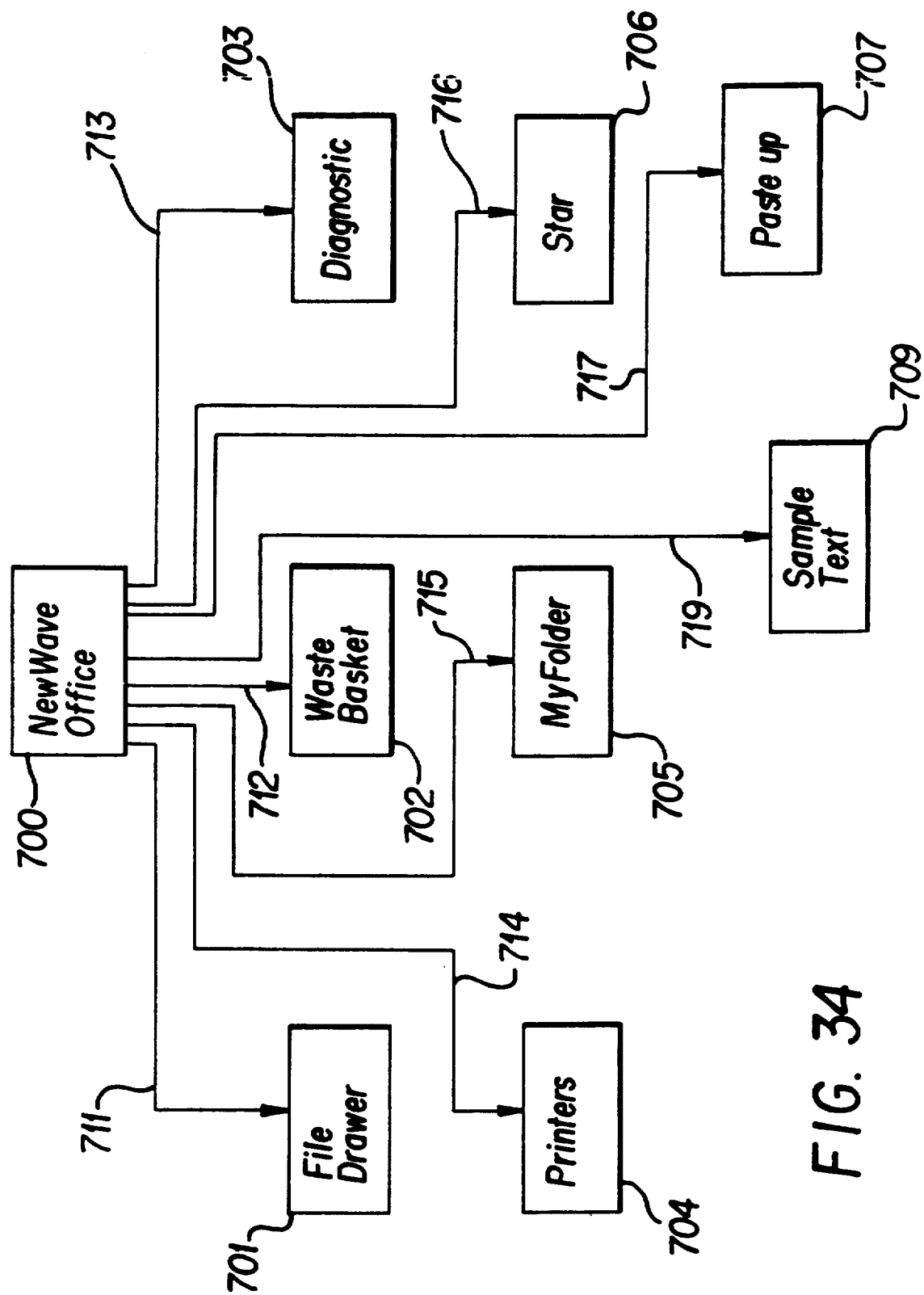

In FIG. 34, "Sample Text" (object 709) is shown to be a child of NewWave Office through a link 719. In FIG. 34, since "My Folder" has been closed, "Paste Up" (object 708), link 728 and link 727 are not shown. However, these still exist, but are not currently visible to a user.

Figure 35:
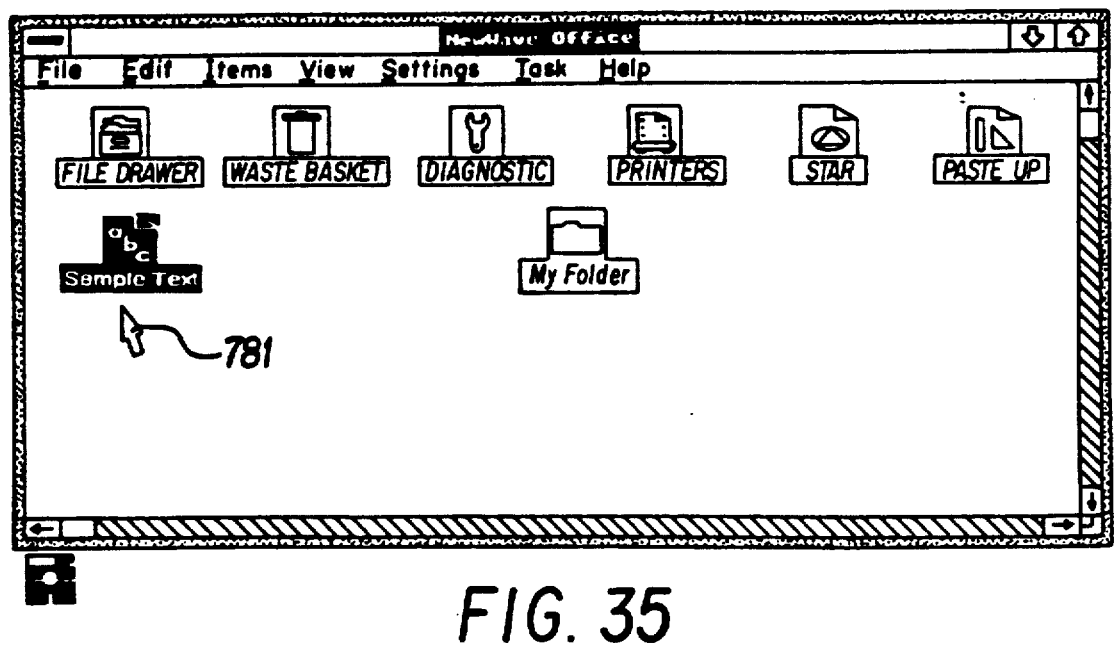
Figure 36:
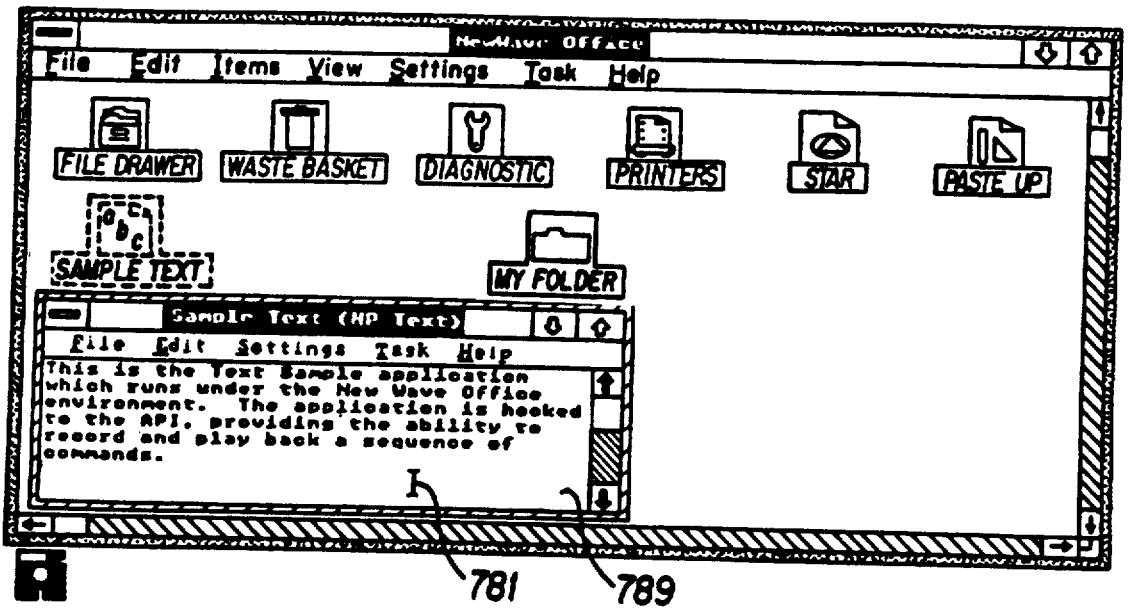

In FIG. 35, placing cursor 781 on the icon "Sample Text" and double clicking a button on mouse 20 results in "Sample Text" being opened. In FIG. 36, an open window 789 for "Sample Text" is shown.

Figure 37:
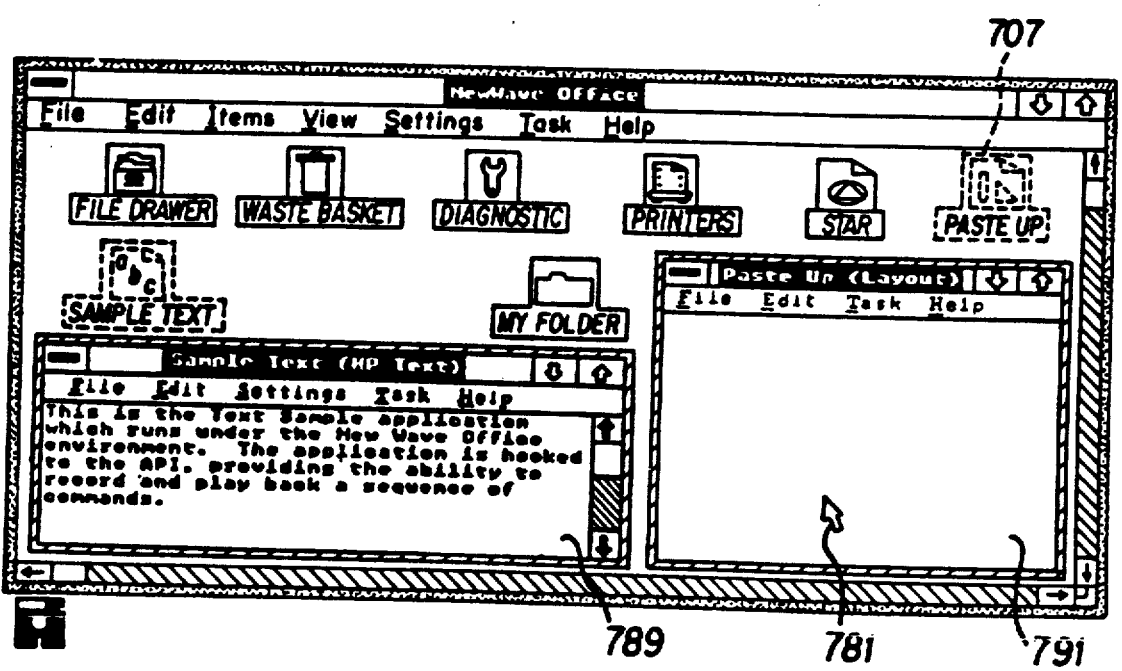
Figure 38:
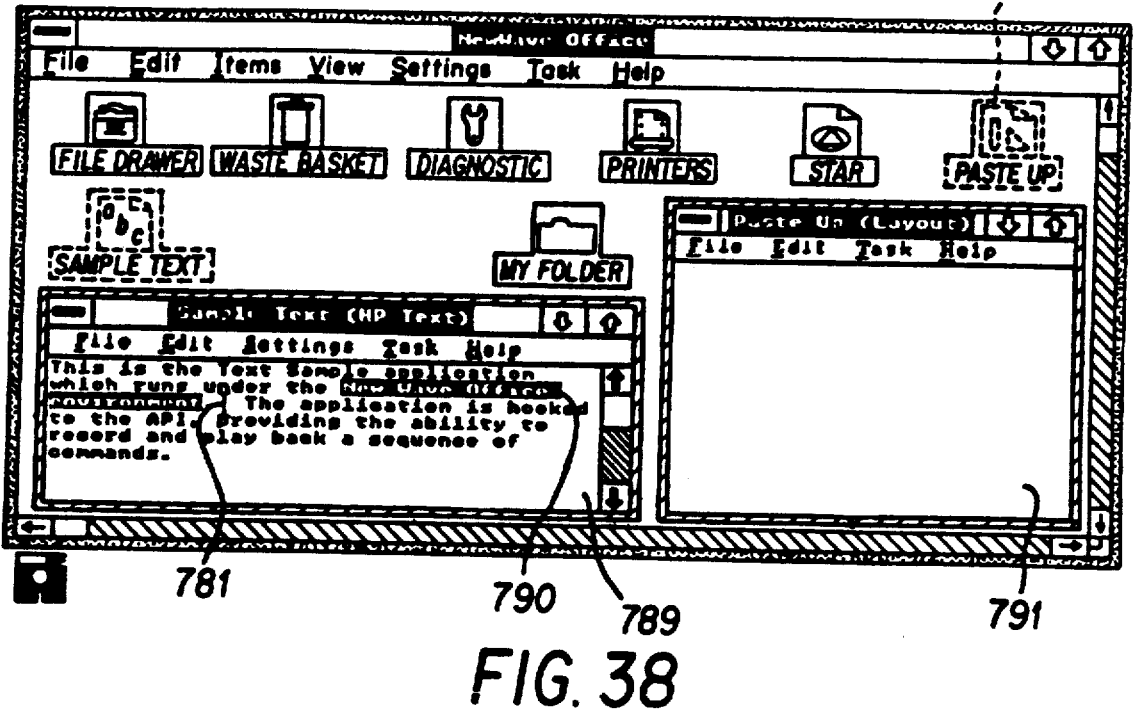

In FIG. 37 a window 791 for "Paste Up" (object 707) has been opened by double clicking on the icon for "Paste Up". In FIG. 38, using Cursor 781, controlled by mouse 20, a portion 790 of the text of "Sample Text" has been selected. The portion in inverse video stating "New Wave Office environment" is portion 790.

Figure 39:
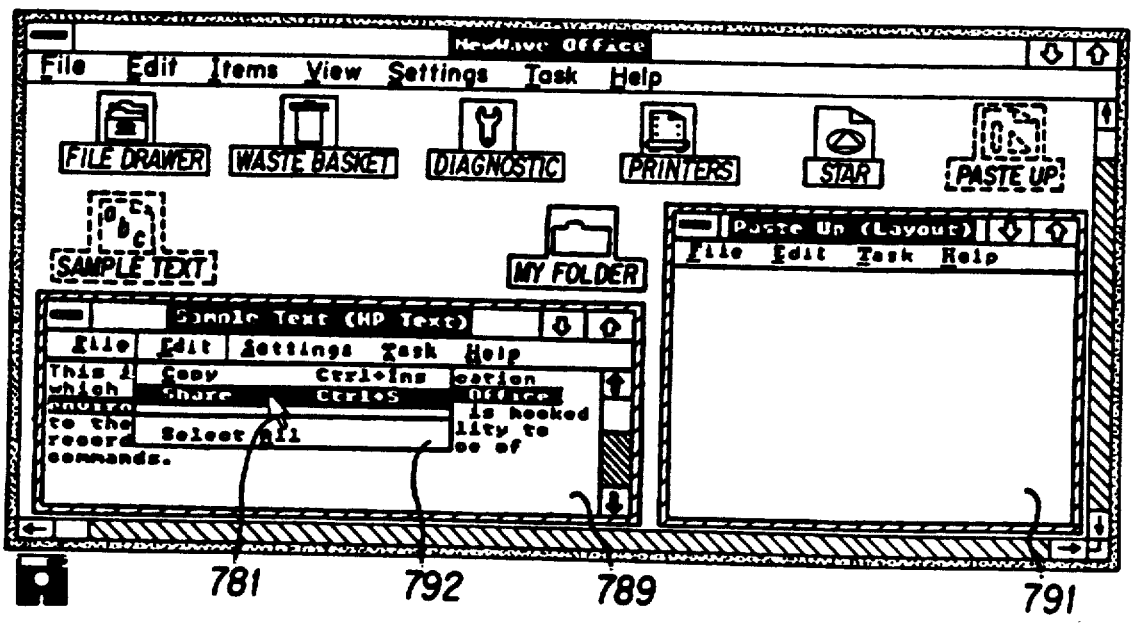
Figure 40:
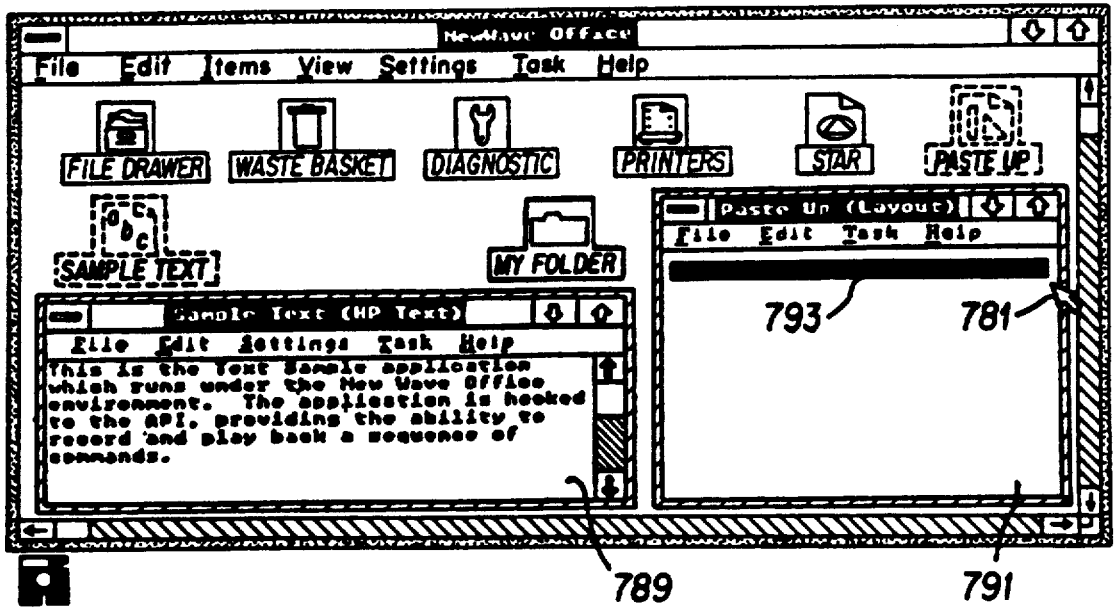
Figure 41:
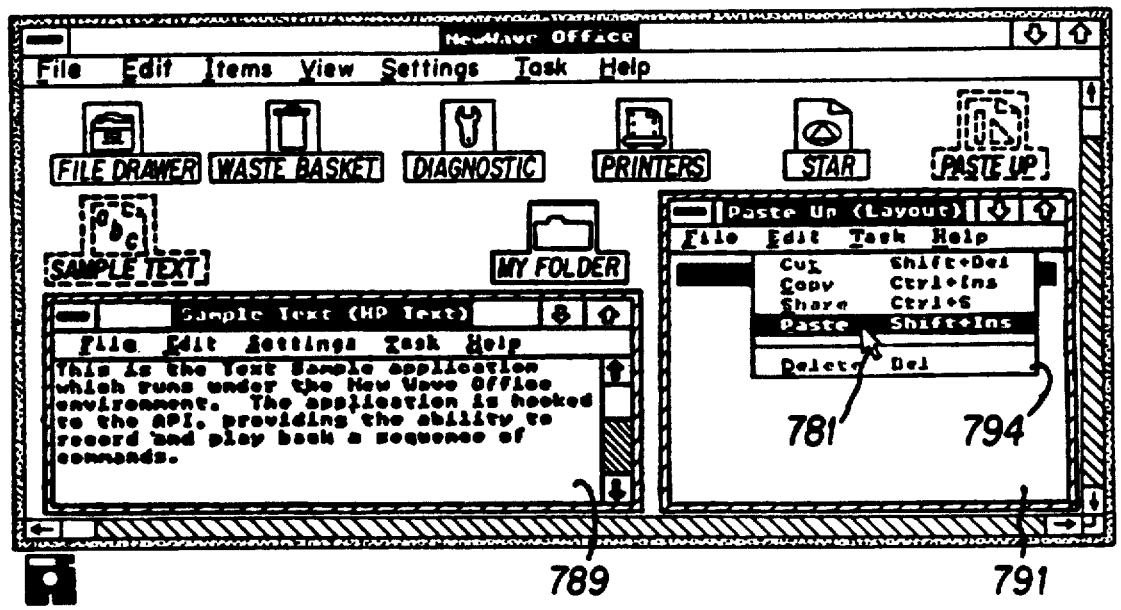
Figure 42:
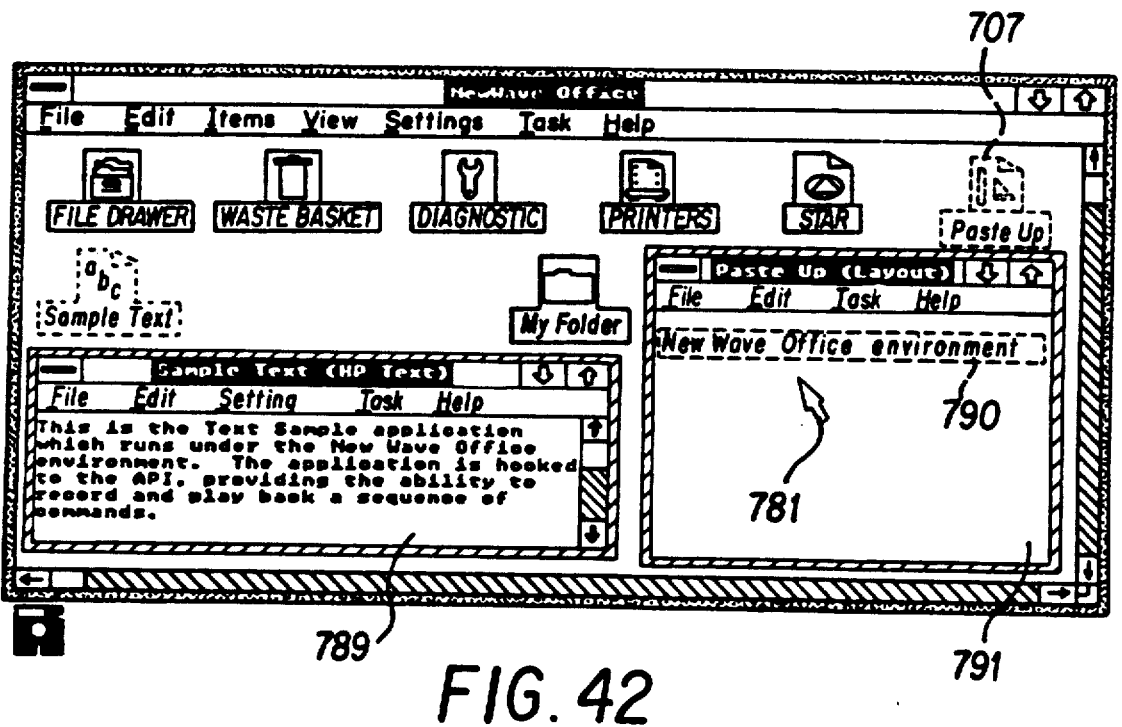
Figure 44:
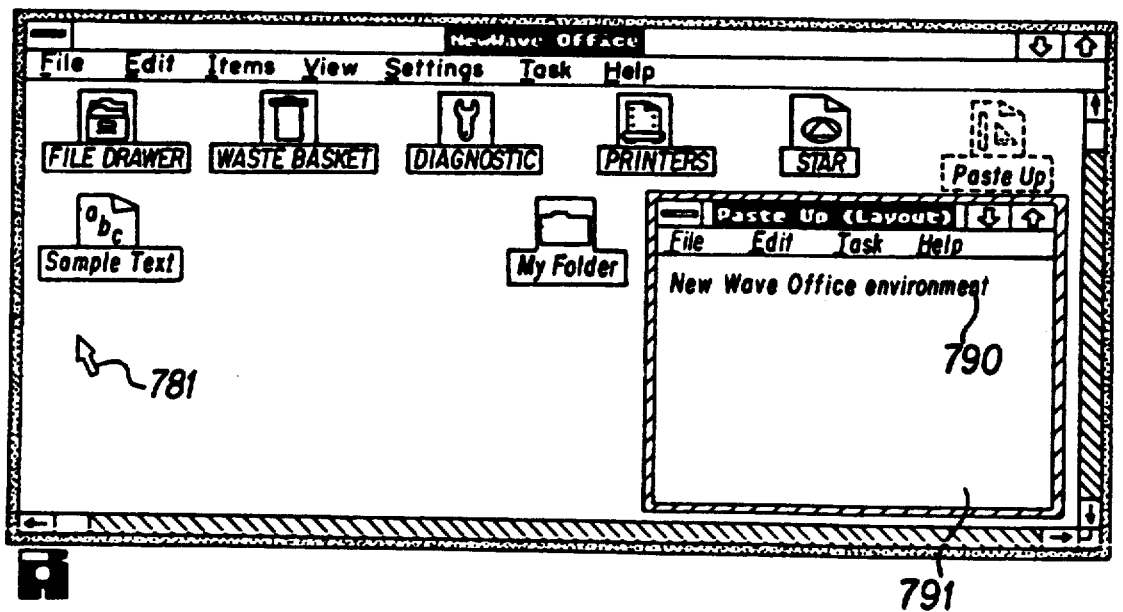
Figure 43:
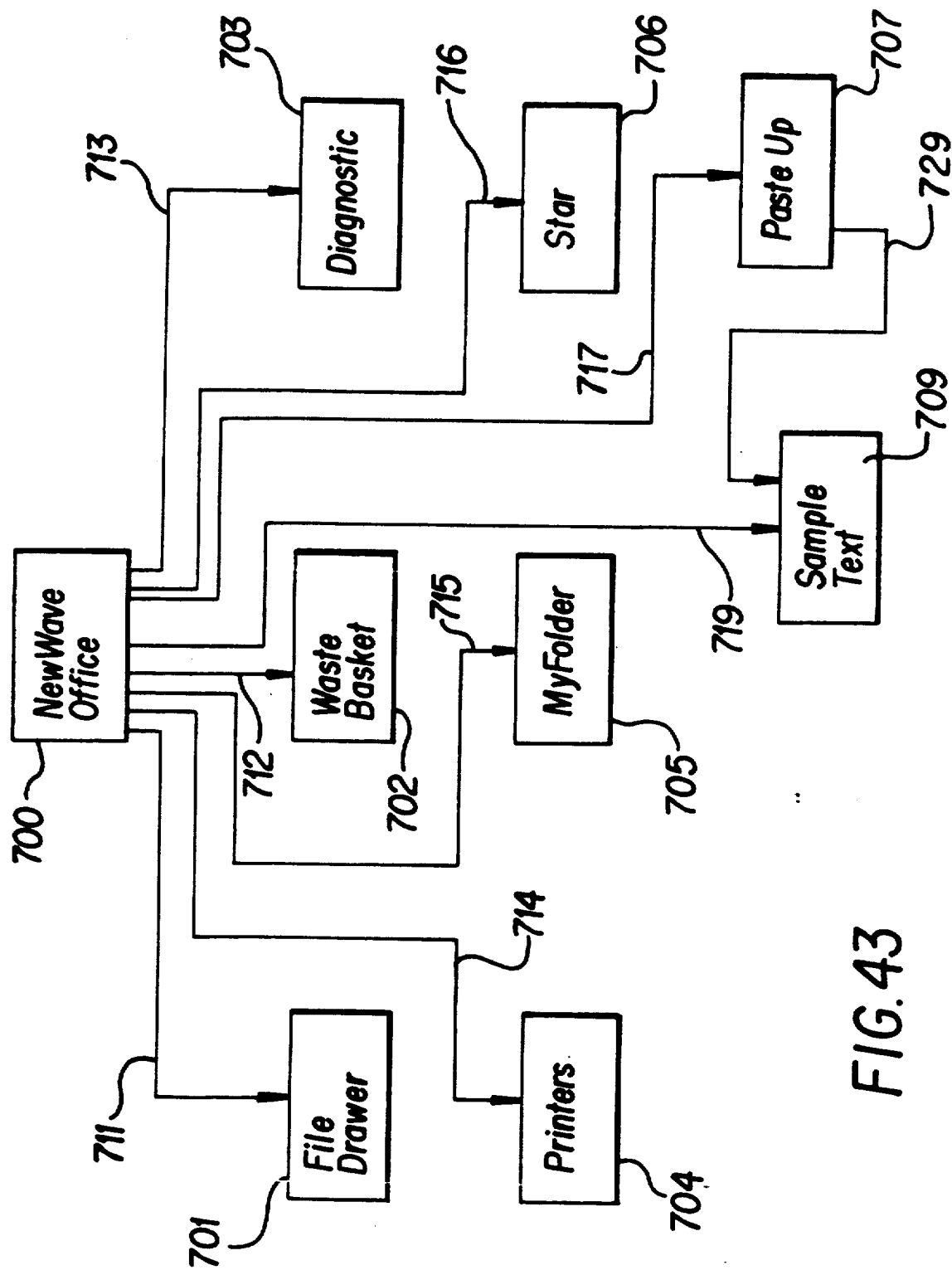

In FIG. 39, cursor 781 is used to select the selection "Share" in a pull down menu 792. In FIG. 40, an area 793 in window 791 is selected using cursor 781. In FIG. 41, a selection "Paste" is selected from a pull down menu 794 using cursor 781. In FIG. 42, "Sample Text" is linked to "Paste Up" (object 707) and displayed text 790 is displayed in "Paste Up" window 791. In FIG. 43 "Sample Text" (object 709) is shown to be a child of "Paste Up" (object 707) through a link 729. In FIG. 42, displayed text 790 is shown in gray because "Star" window 789 is open. In FIG. 44, "Star" window 789 is closed so displayed text 790 is clearly displayed.

Figure 45:
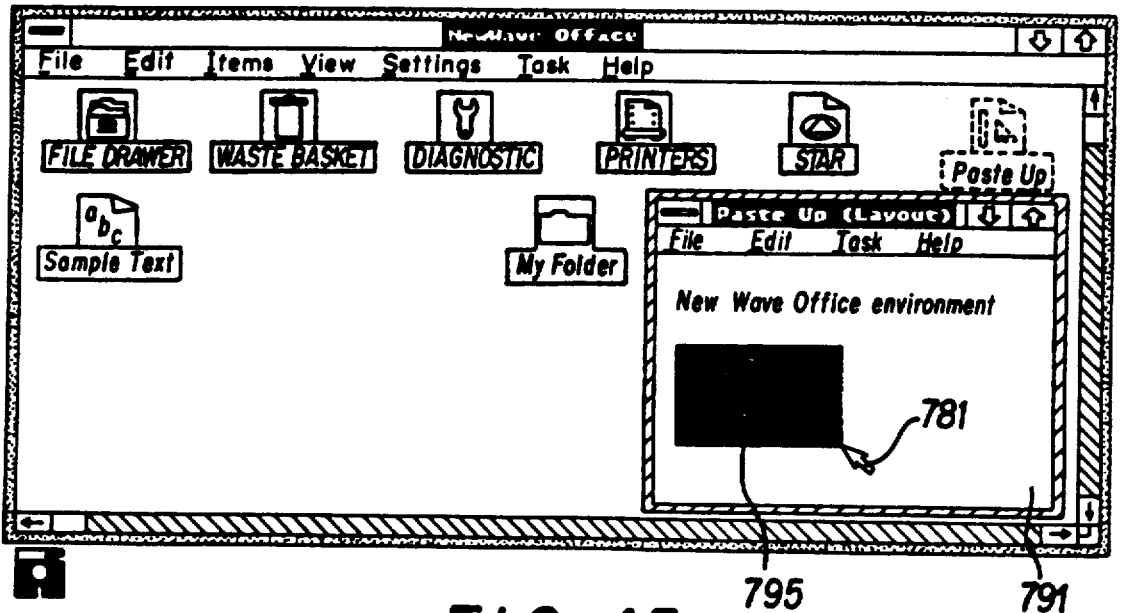
Figure 46:
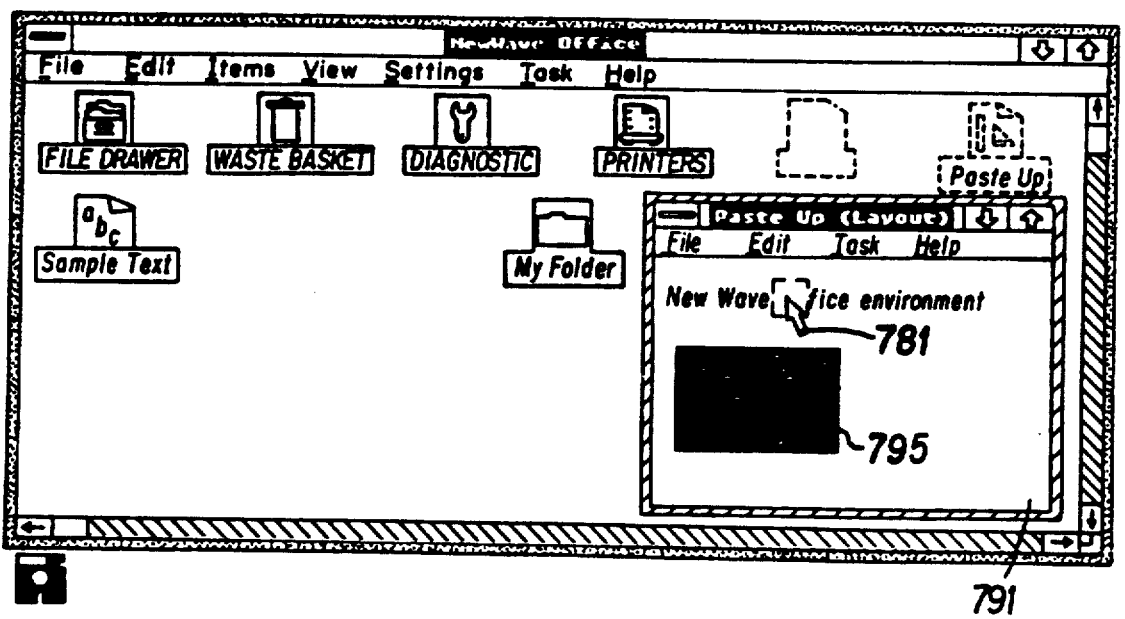

In FIG. 45, a region 795 of window 791 is selected using cursor 781. FIG. 46 shows cursor 781 dragging the icon "Star" into region 795 of window 791.

Figure 47:
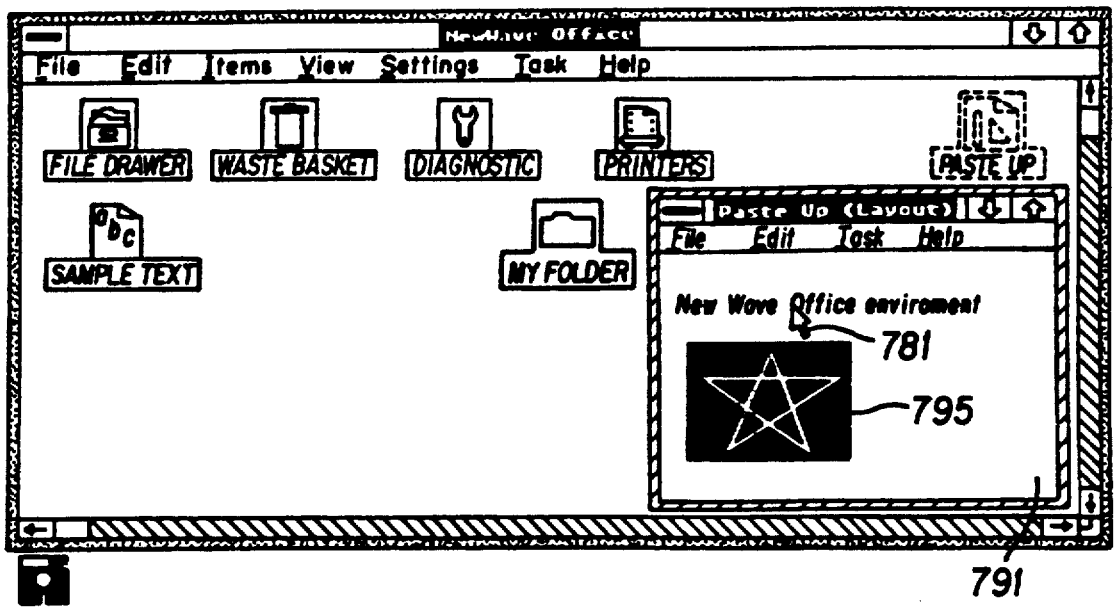
Figure 48:
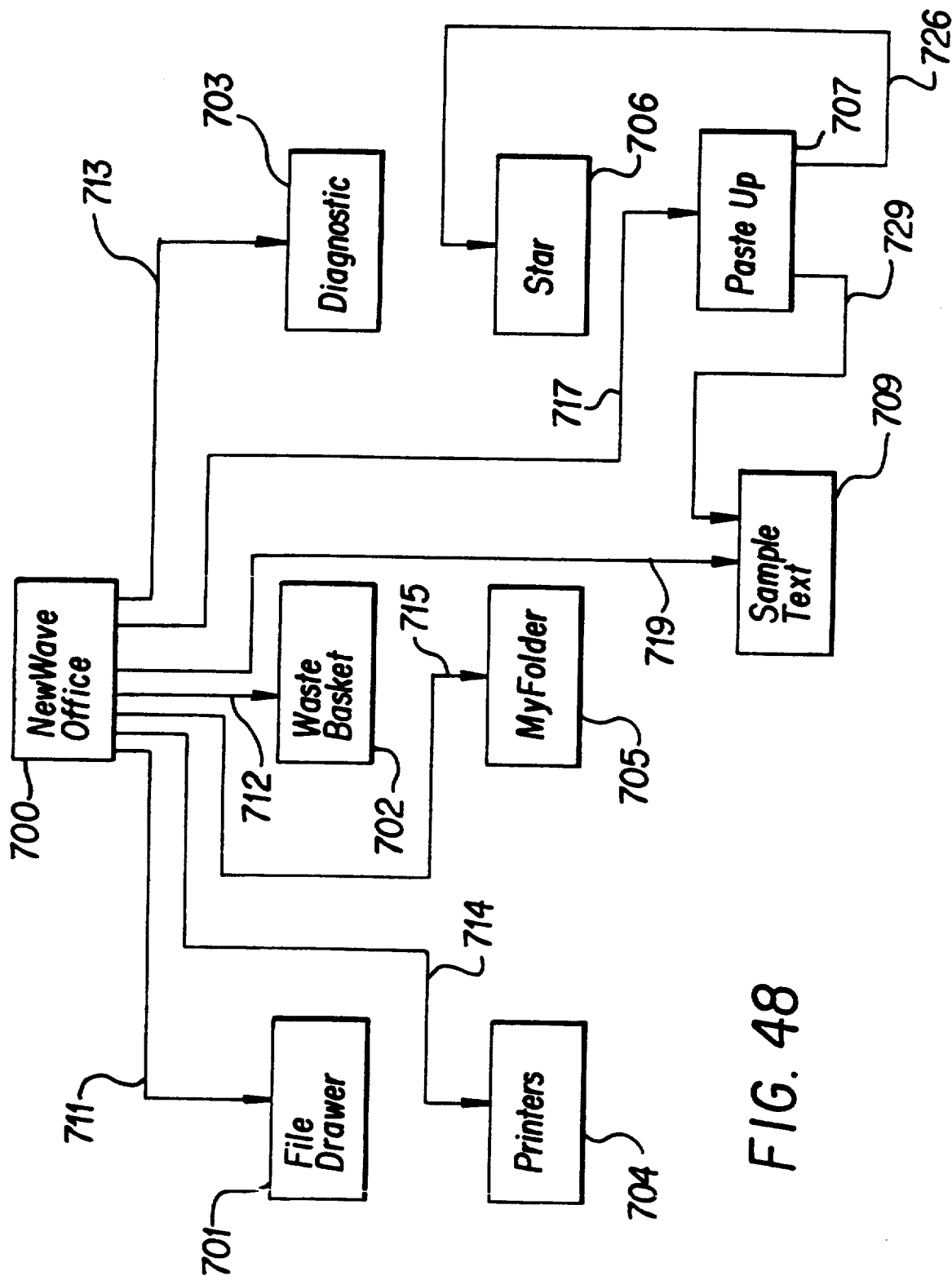
Figure 50:
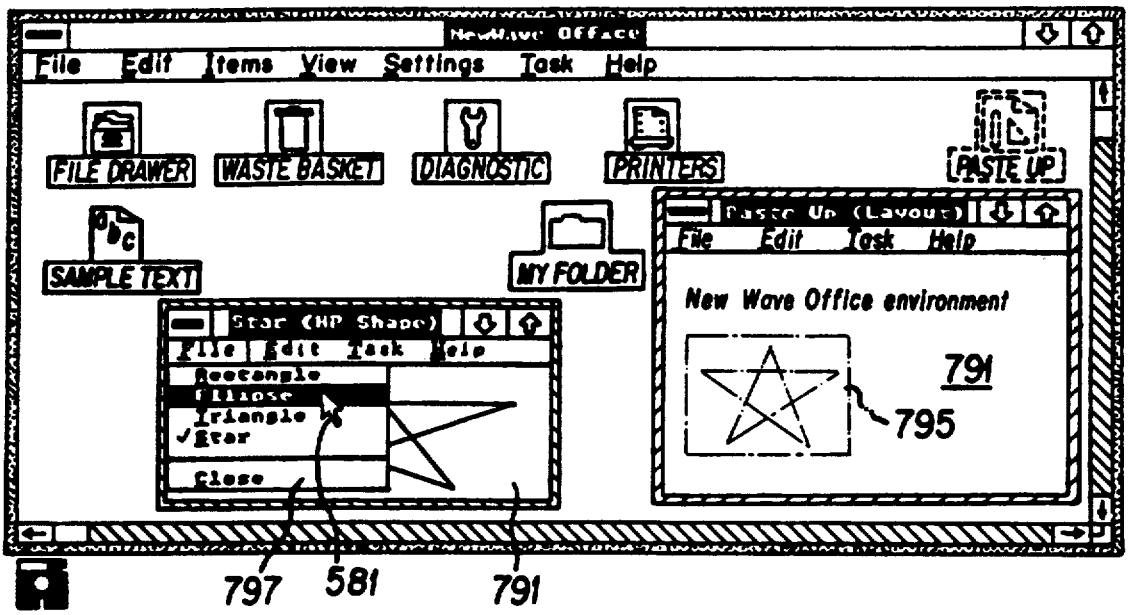

In FIG. 47, data from "Star" (object 706) is now displayed in region 795 of window 791. As may be seen in FIG. 48, "Star" (object 706) is now a child of "Paste Up" (object 707) through a link 726.

Figure 49:
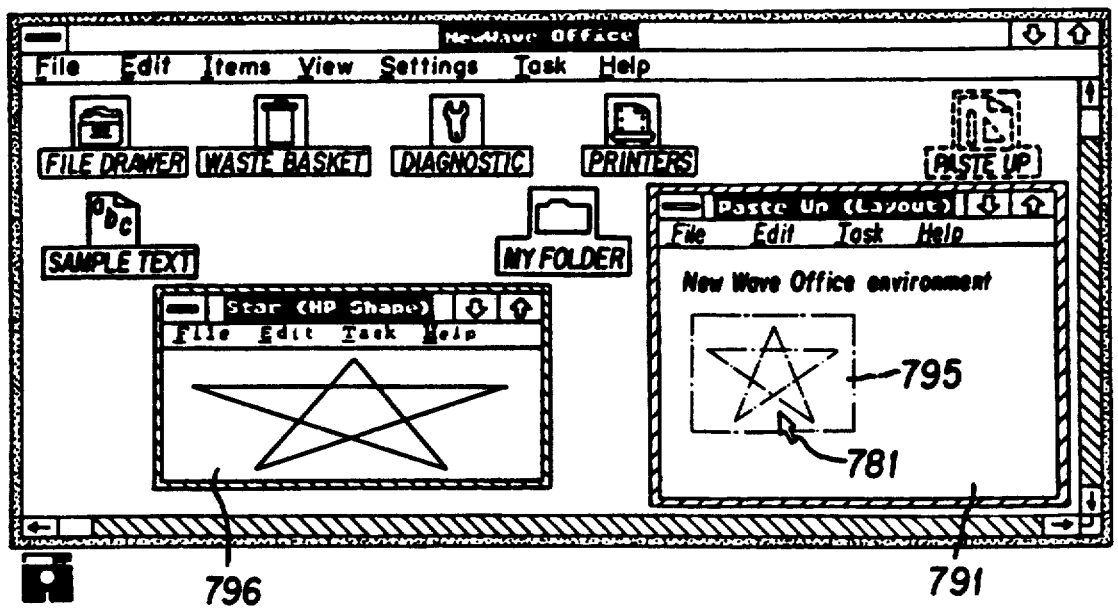

In FIG. 49, a user has placed cursor 781 over region 795 of window 791 and double clicked a button on mouse 20. The result is the opening and display of "Star" (object 706) in a window 796. FIG. 40 shows the use of cursor 781 to select selection "Ellipse" in a menu window 797 which results in the data within "Star"

Figure 51:
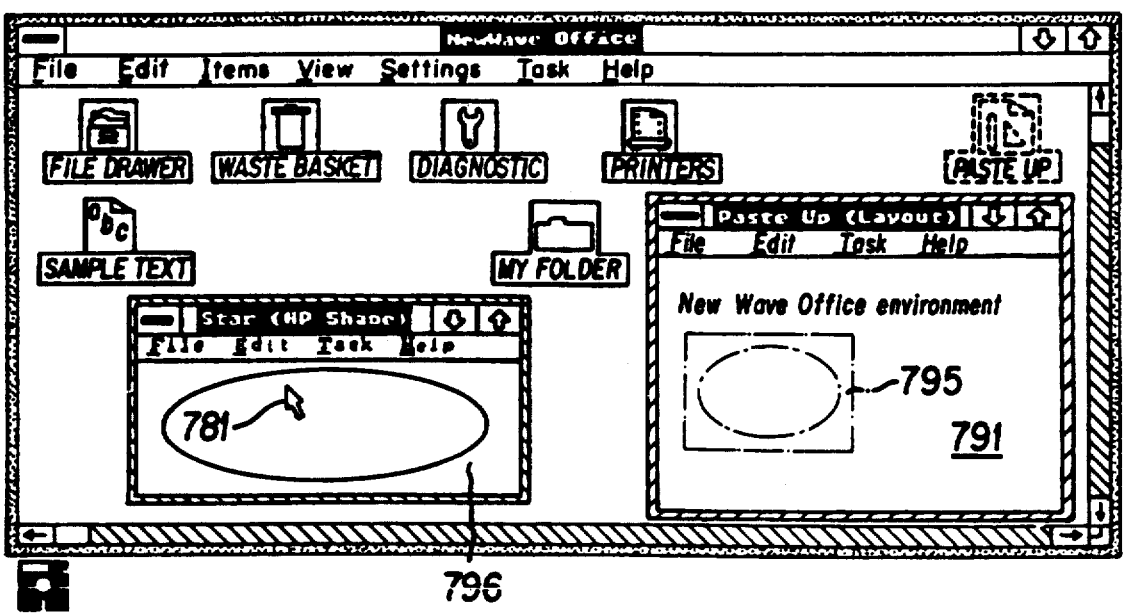

(object 706) being changed from a star to an ellipse. As shown in FIG. 51, the result is a change both in data displayed in window 796 and data displayed in region 795 of window 791.

Figure 52:
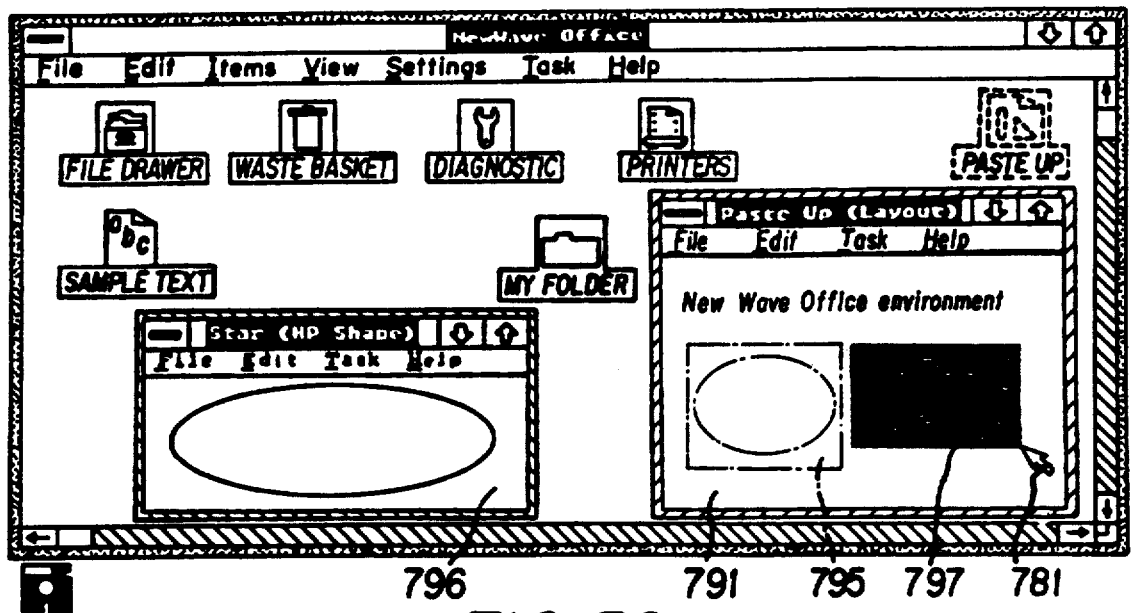
Figure 53:
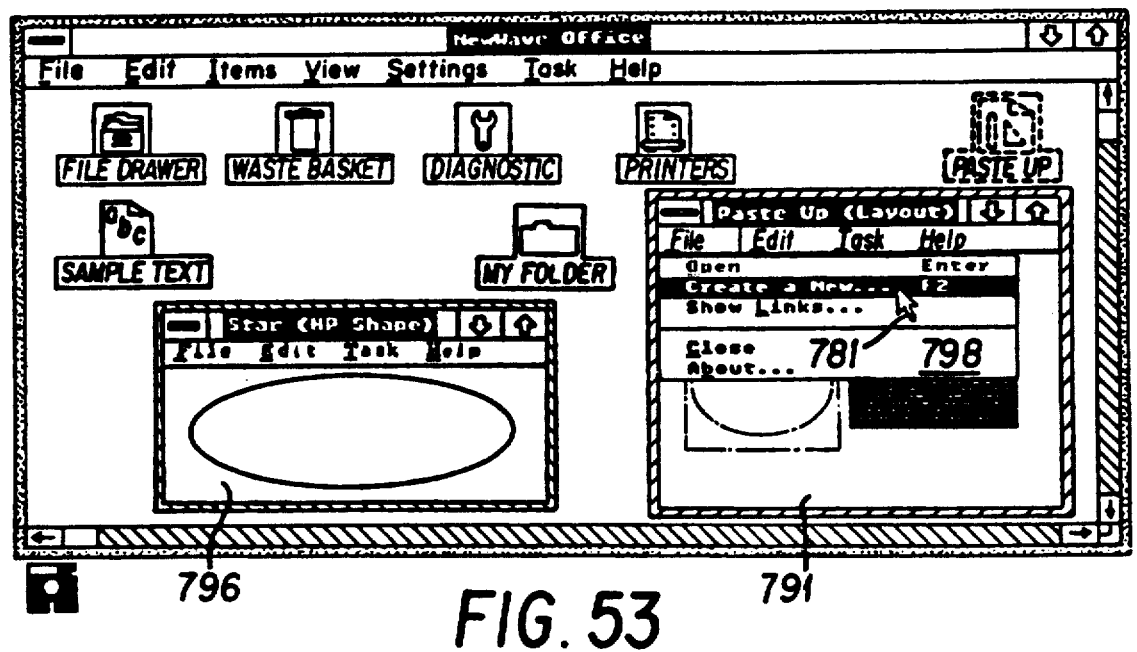
Figure 54:
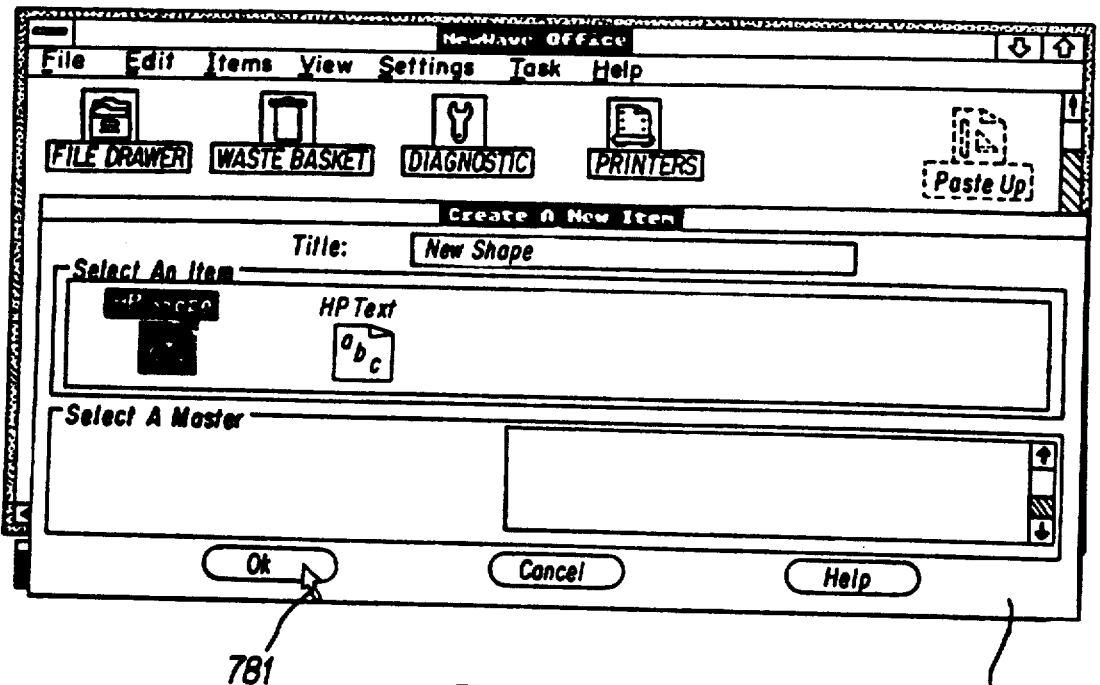
Figure 55:
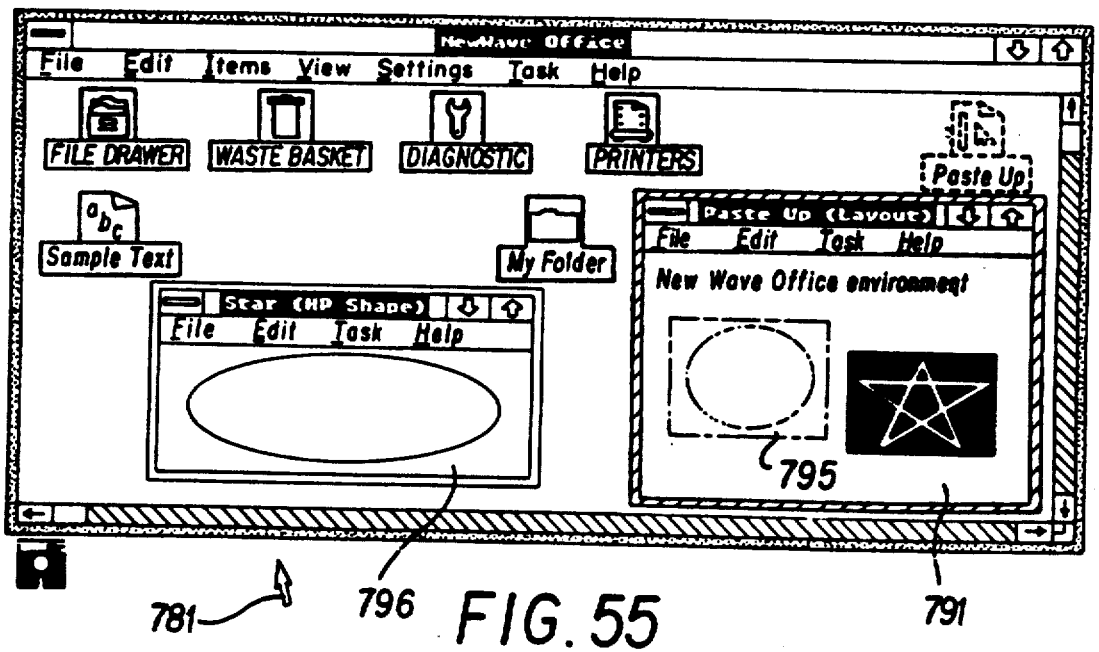
Figure 56:
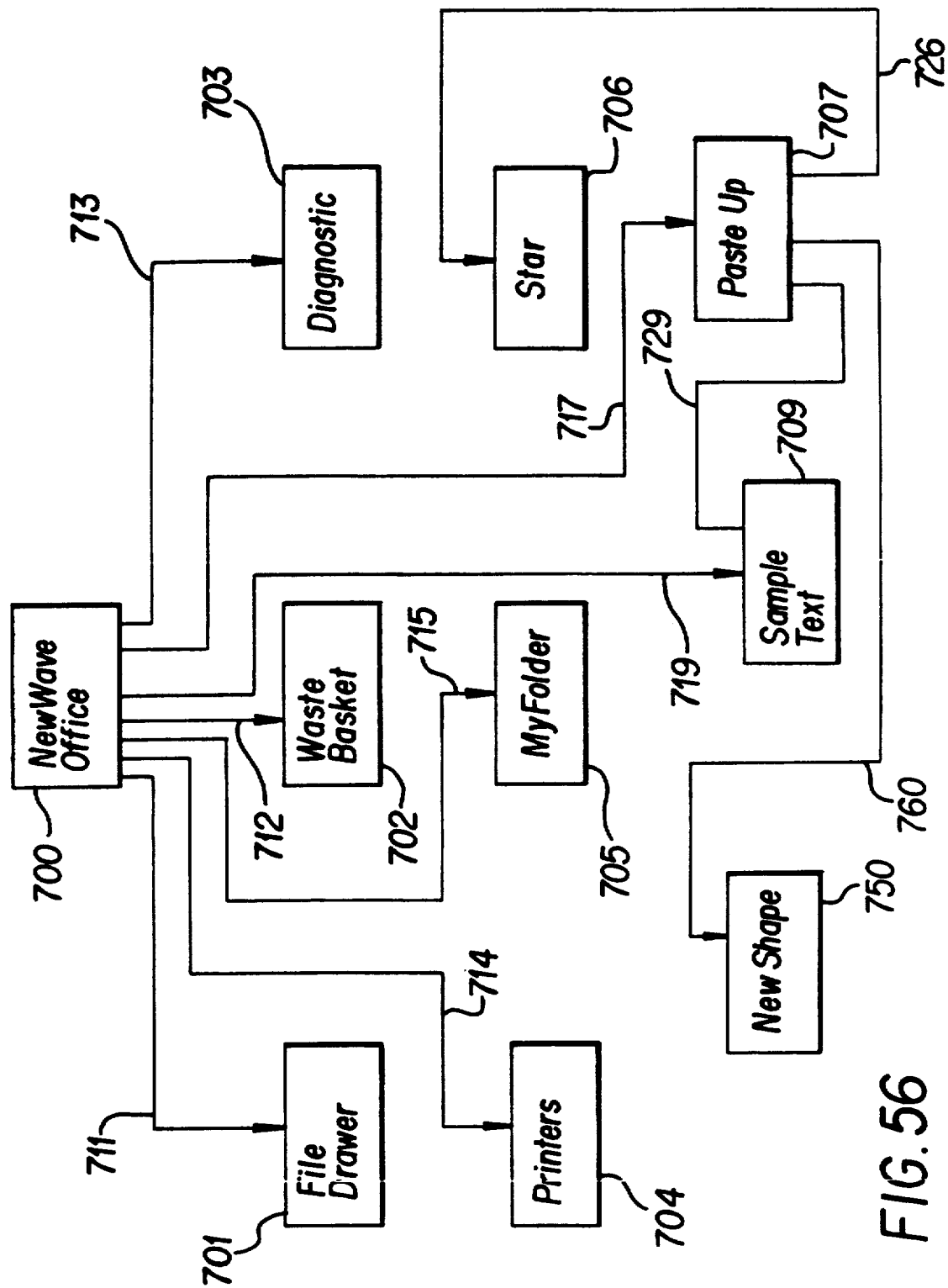

In FIG. 52, cursor 781 is used to define a region 797 in window 791. In FIG. 53, cursor 781 is used to select a selection "Create a New . . . " in pull down menu 798. As a result of this selection dialog box 799 appears in FIG. 54. Dialog box 799 contains icons for the two classes of objects available which are able to display data in region 797 of window 791. Using cursor 781, the icon "HP Shape" has been highlighted. Using keyboard 19 the name "New Shape" has been typed in as the name for a new object to be created. Cursor 781 now points to a regions laballed "OK". Once this region is selected, a new object titled "New Shape" is created. Data for "New Shape" is displayed in region 797 of window 791 as is shown in FIG. 55. In FIG. 56, "New Shape", (object 750) is shown to be a child of "Paste Up" (object 707) through a link 760.

Figure 57:
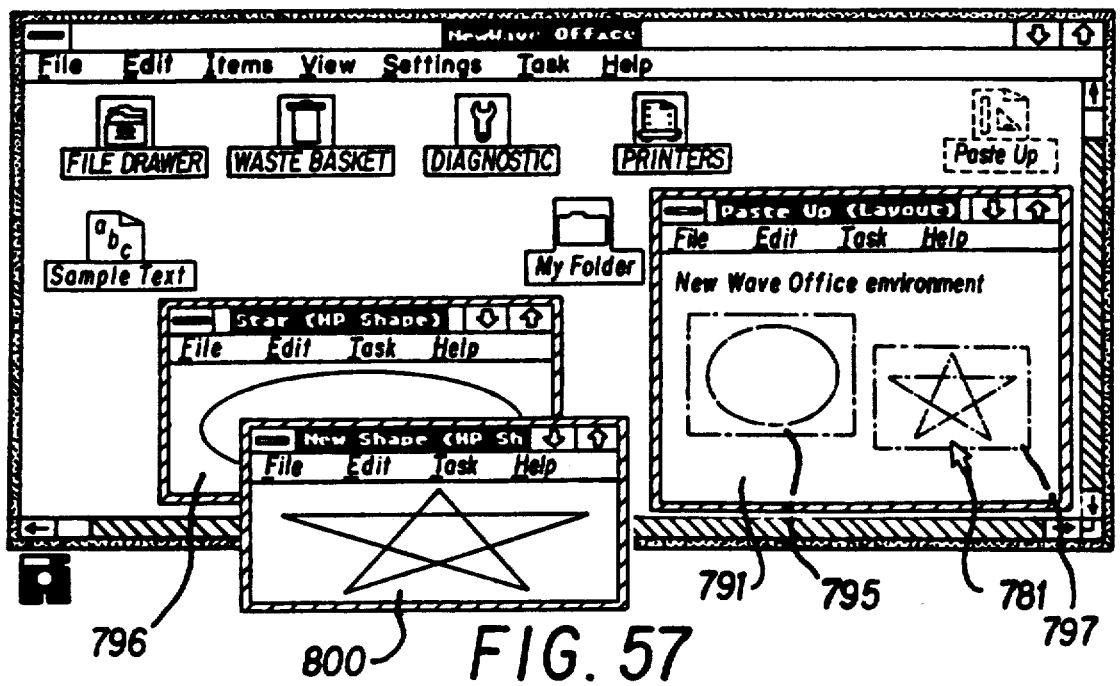
Figure 58:
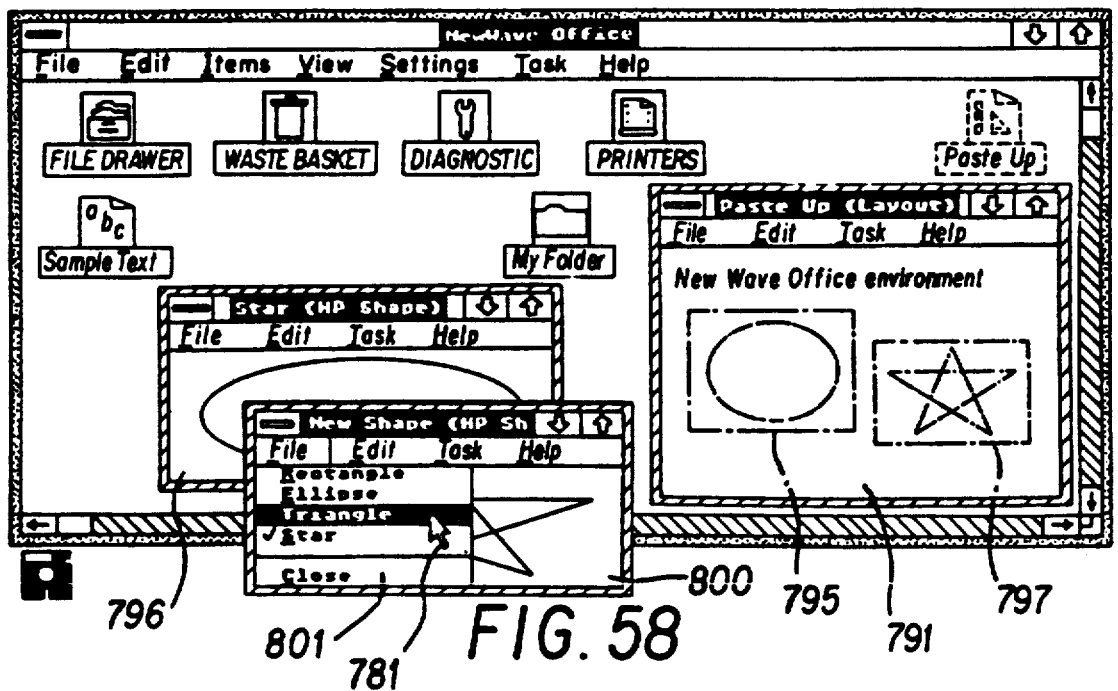
Figure 59:
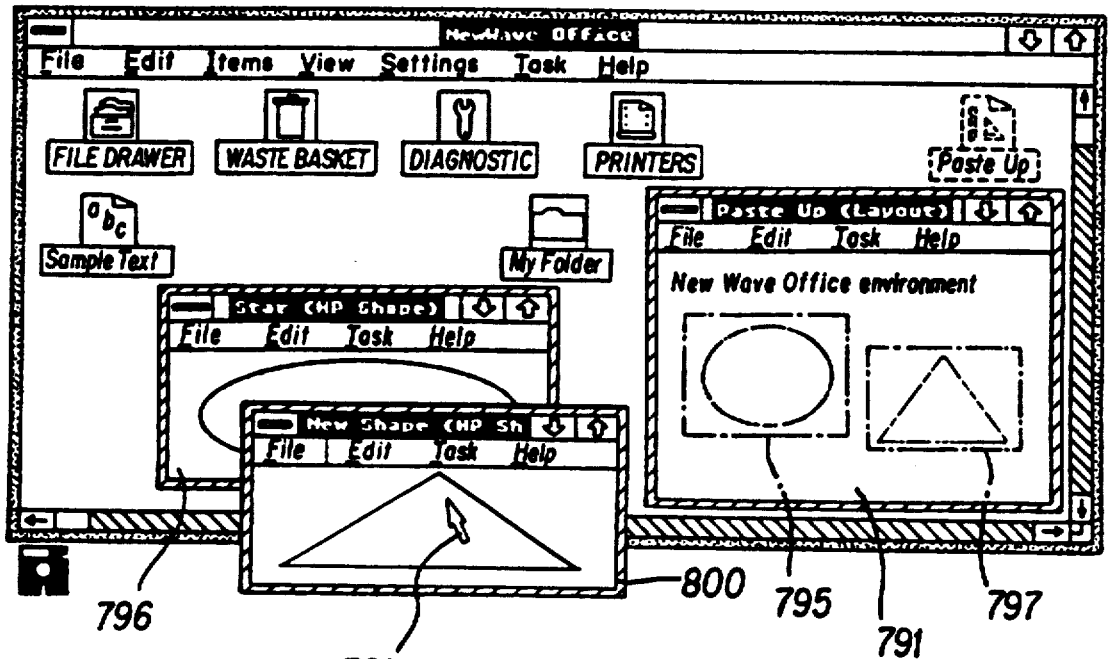

In FIG. 57 a window 800 for "New Shape" was opened by placing cursor 781 over region 797 of window 791 and clicking twice on a button on mouse 20. In FIG. 58, cursor 781 is used to select the selection "Triangle" from a pull down menu 801. The result, as shown in FIG. 59, is that a triangle is now displayed both in window 800 and in region 797 of window 791.

Figure 60:
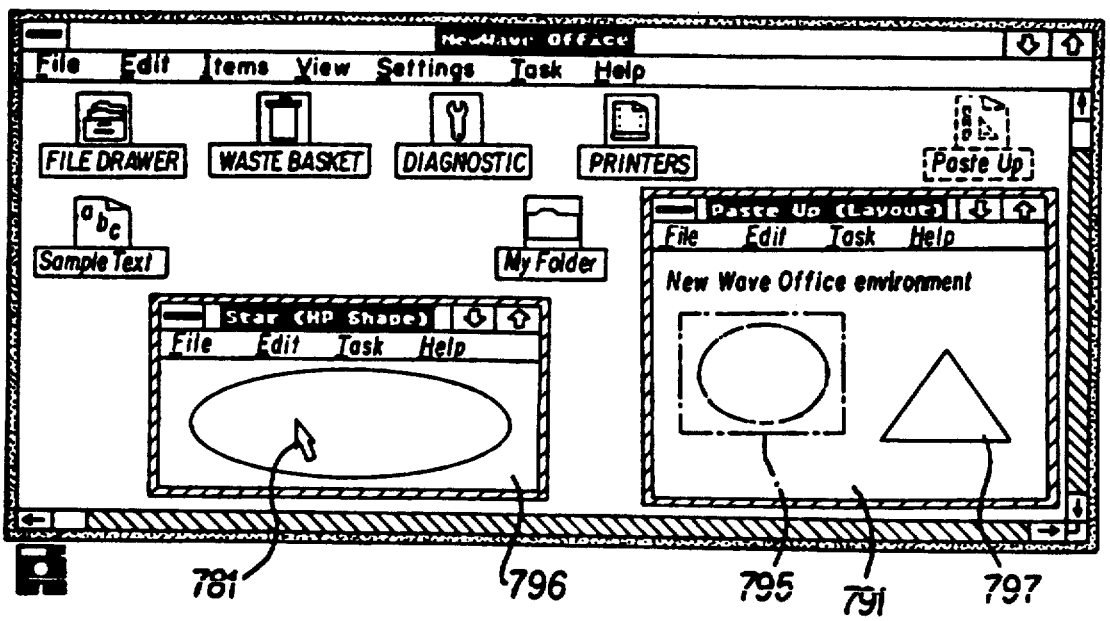
Figure 61:
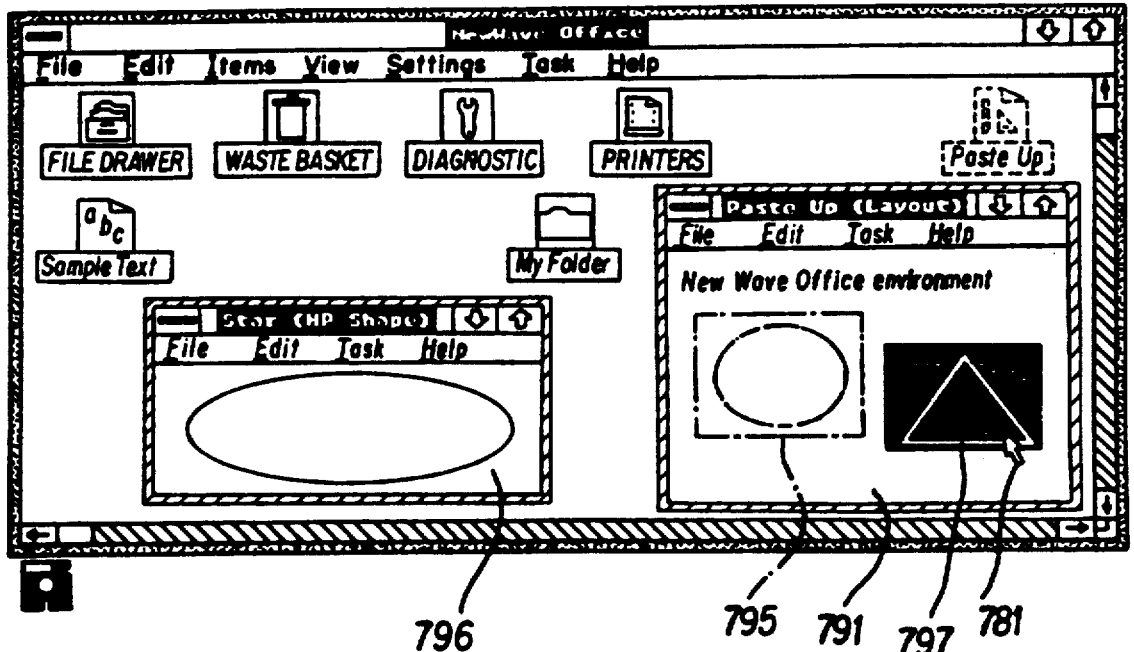
Figure 62:
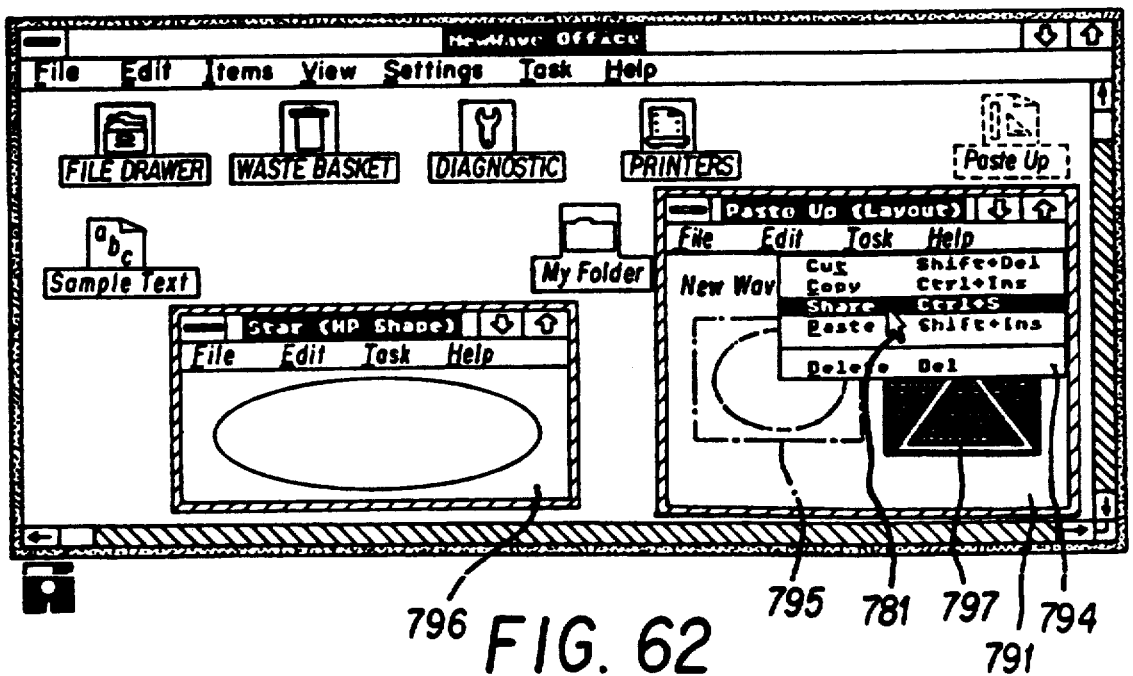
Figure 63:
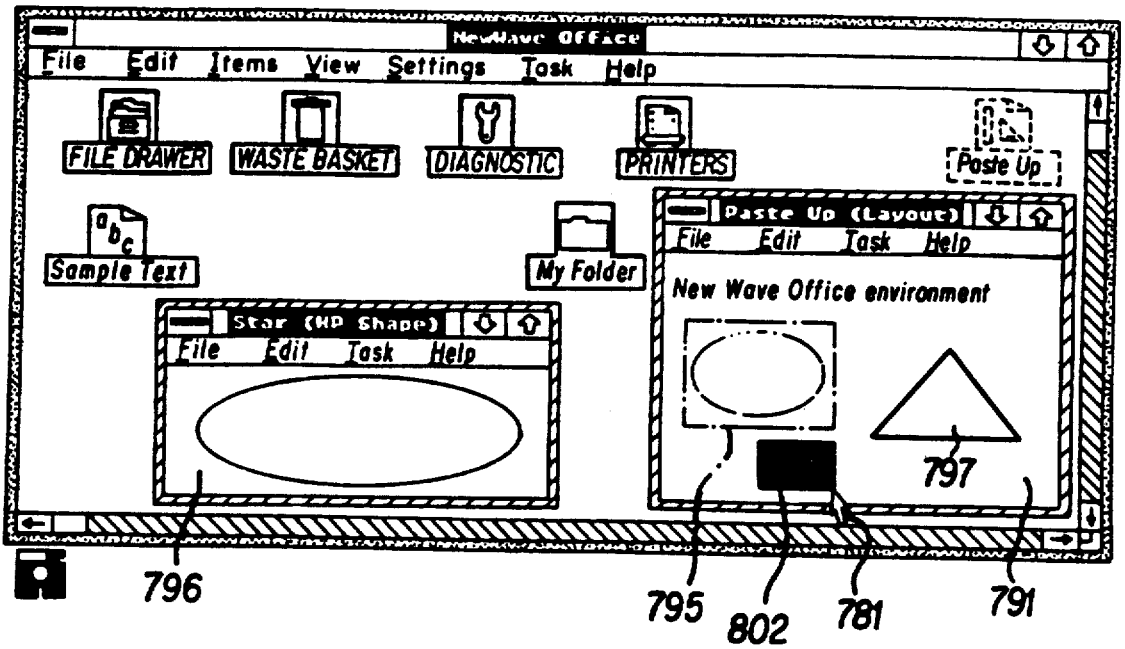
Figure 64:
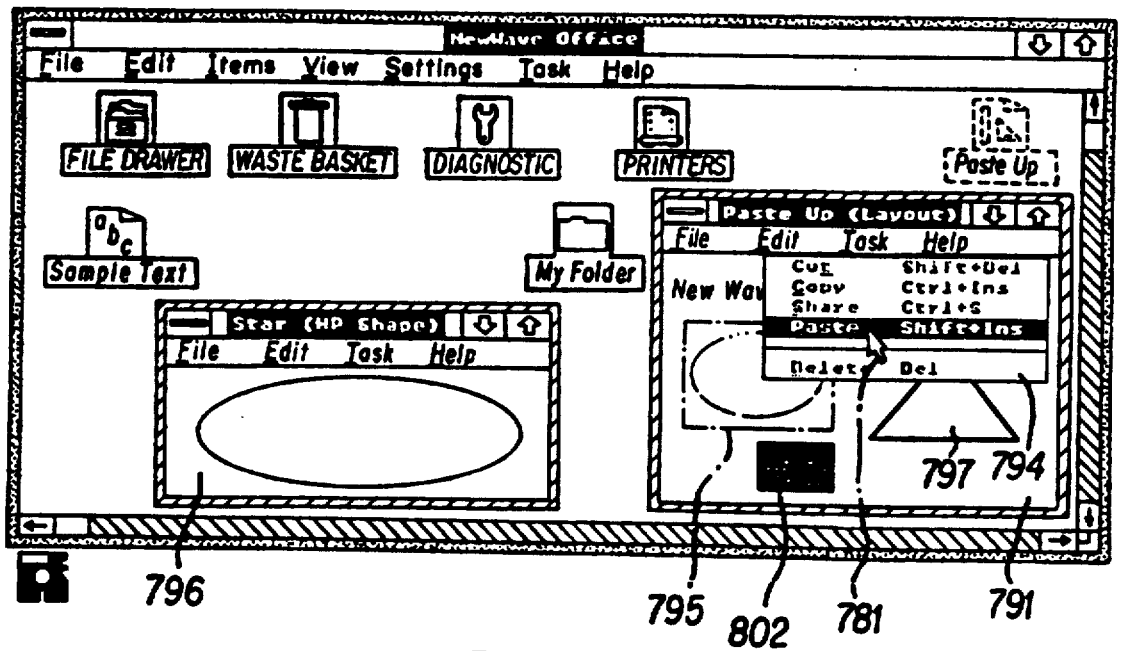
Figure 65:
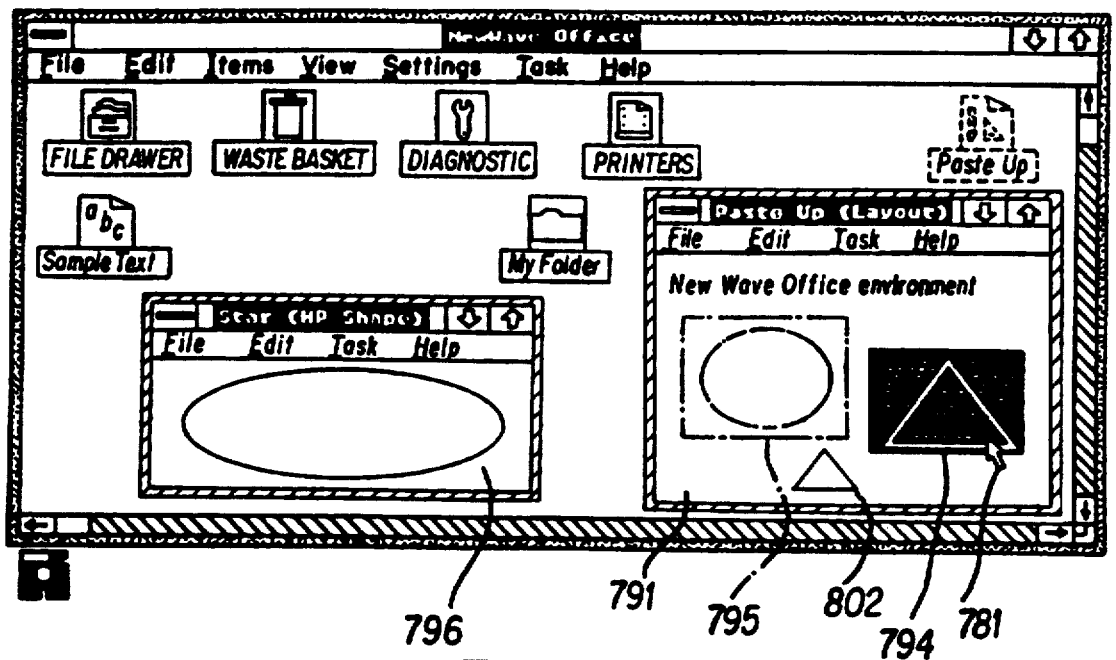
Figure 66:
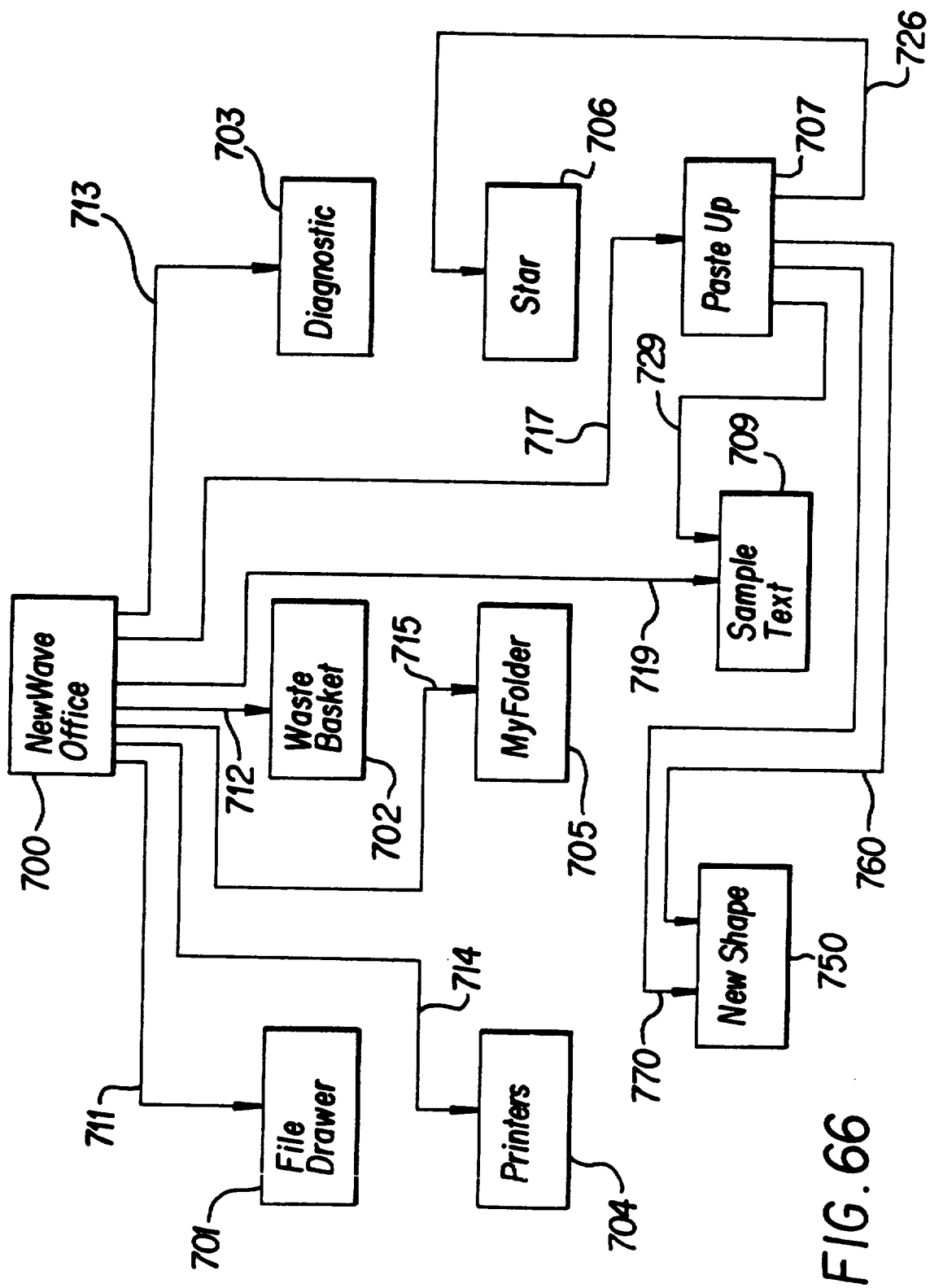

In FIG. 60, window 800 has been closed. In FIG. 61, "New Shape" is selected by placing cursor 781 over region 797 of window 796, and clicking a button on mouse 20. In FIG. 62, cursor 781 is used to select selection "Share" from pull down menu 794. In FIG. 63, cursor 781 is used to select a region 802 of window 791. In FIG. 64, cursor 781 is used to select selection "Paste" from pull down menu 794. The result, as shown in FIG. 65, is the sharing of "New Shape" with data from "New Shape" being displayed in region 797 and in region 802 of window 791. In FIG. 66, "New Shape" (object 750) is shown to have an additional link 770, from its parent "Paste Up" (object 707).

Figure 67:
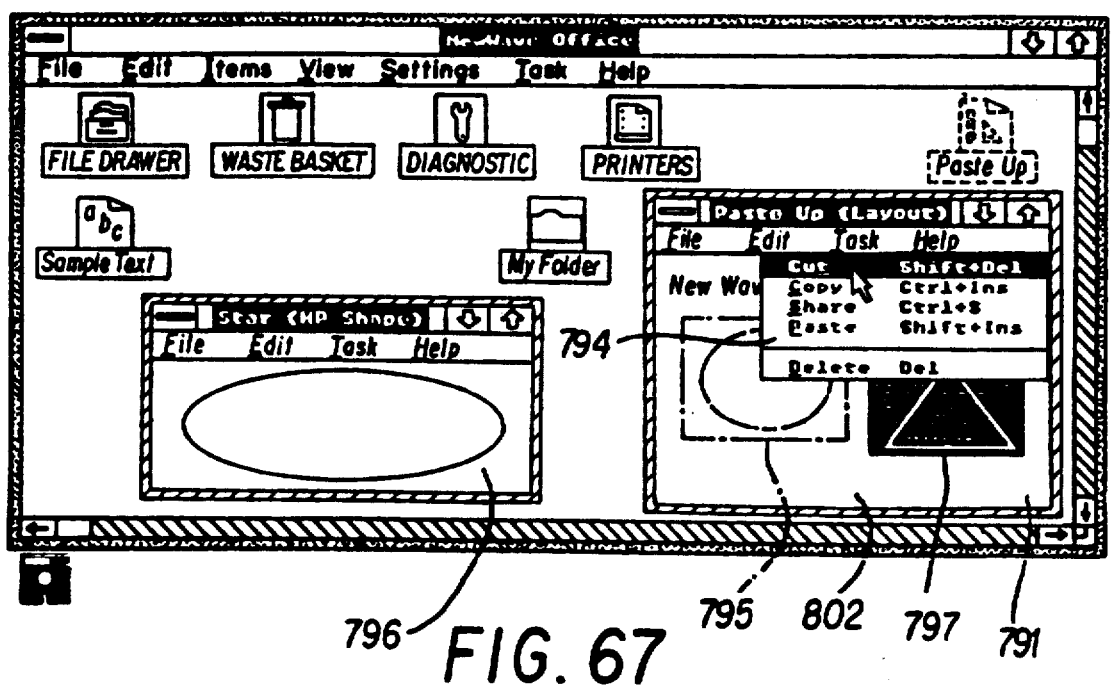
Figure 68:
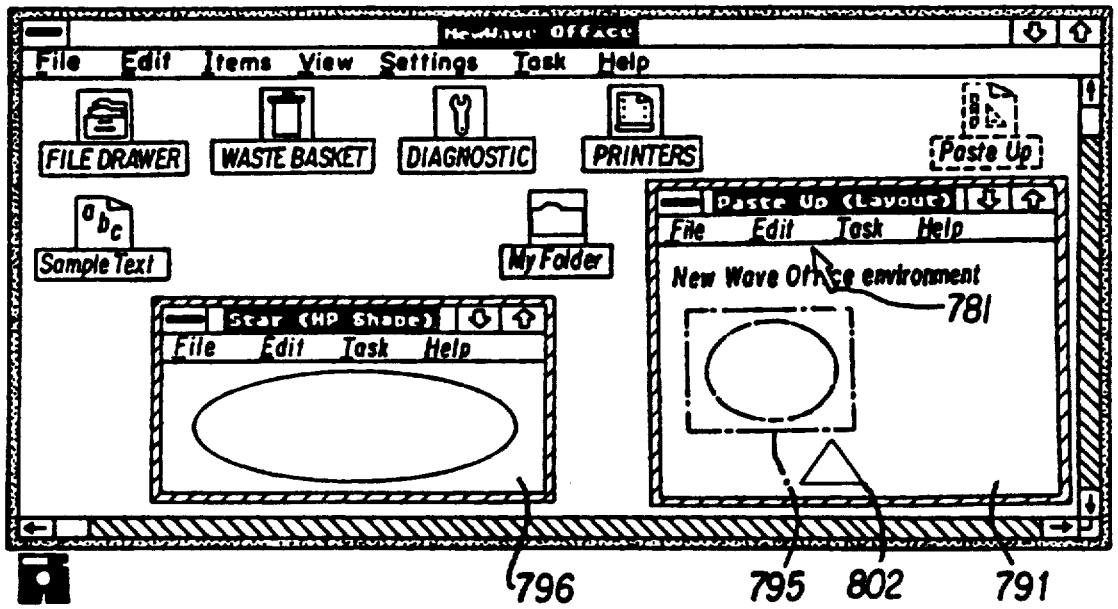
Figure 69:
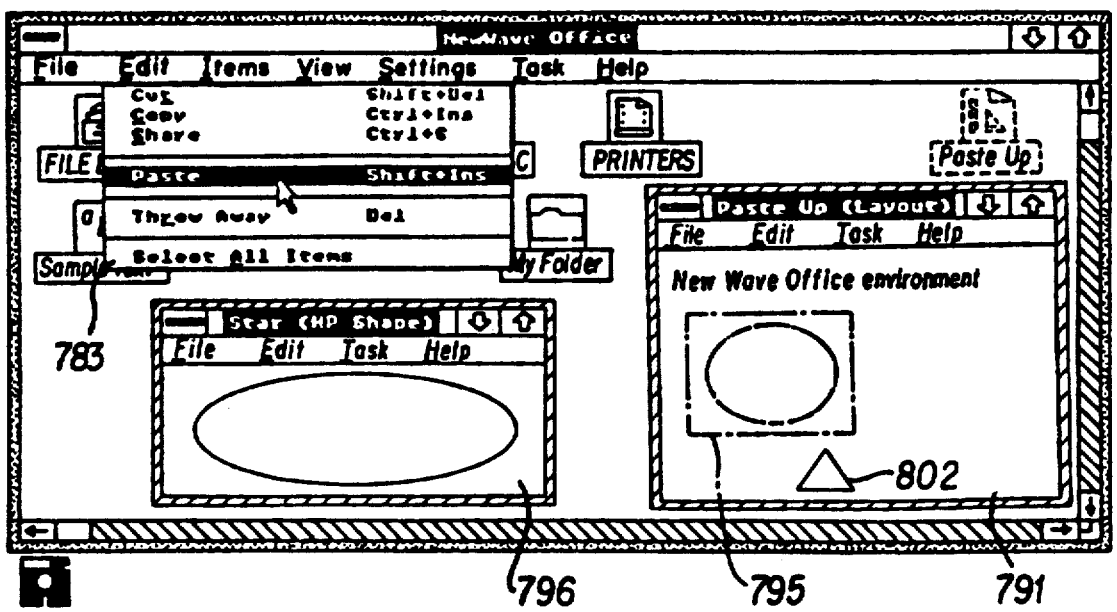
Figure 70:
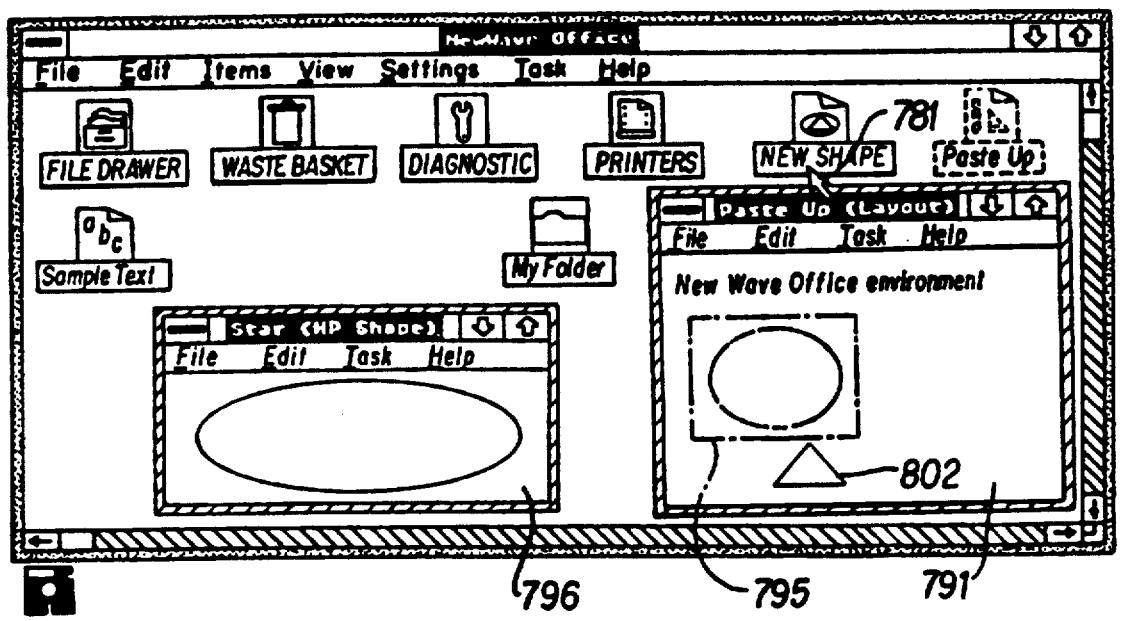

In FIG. 67, region 797 has been selected using cursor 781. Cursor 781 is then used to select selection "Cut" from pull down menu 794. The result, as seen in FIG. 68, is that region 781 has been removed from window 791. In FIG. 69, cursor 781 is used to select selection "Paste" from pull down menu 783. The result, shown in FIG. 70, is an icon for "New Shape", pointed to by cursor 781. In FIG. 71, "New Shape (object 750) is shown to now be a child of NewWave Office (object 100), through a link 780.

Figure 72:
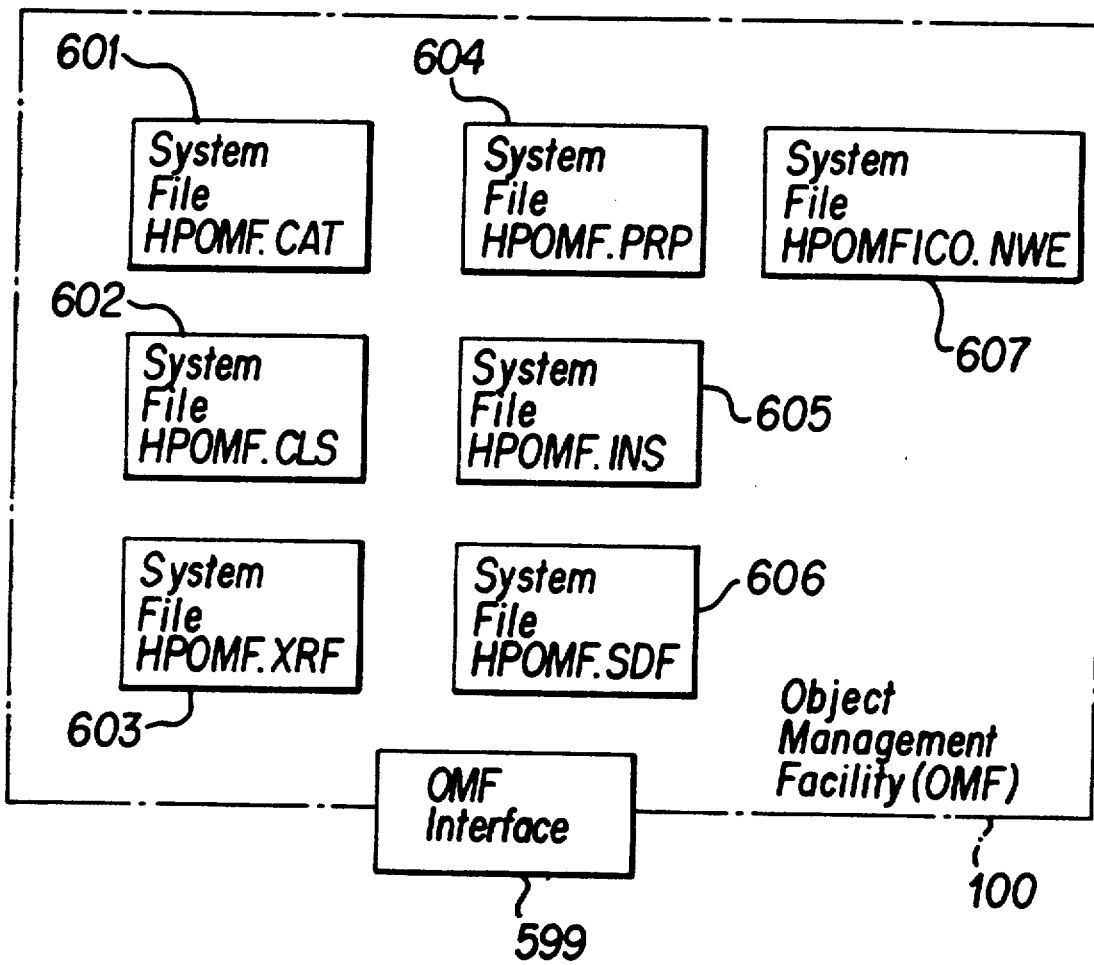
FIG. 72 is a block diagram of an Object Management Facility (OMF) in accordance with the preferred embodiment of the present invention.

In FIG. 72, OMF 100 is shown to contain seven system files: system file 601, system file 602, system file 603, system file 604, system file 605, system file 606 and system file 607. OMF interface 599 serves as interface of OMF to other programs running on computer 18. System files 601-607 serve as a data base that provides various information. They provide information about object properties such as what class each object is what is the name of each object. System files 601-607 provide information about classes of objects such as what application is associated with each class of objects, what icon represents objects of a particular class and lists of what messages (such as those shown in FIG. 2) can be processed by objects of a particular class. System files 601-607 also contain information about links between parent and child objects including a list of parents and reference names of each link from a parent for each object; a list of children and reference names of each link to a child for each object; and additional information to manage data exchange across data links. Additionally, system files 601-607 contain general information such as what files are installed in the operating system for each class that is installed, and what objects have requested automatic restart when the OMF 100 is restarted.

In the preferred embodiment of the present invention system file 601 is referred to as HPOMF.CAT, system file 602 is referred to as HPOMF.CLS, system file 603 is referred to as HPOMF.XRF, system file 604 is referred to as HPOMF.PRP, system file 605 is referred to as HPOMF.INS, system file 606 is referred to as HPOMF.SDF and system file 607 is referred to as HPOMFICO.NWE. A description of each system file is now given.

Figure 73:
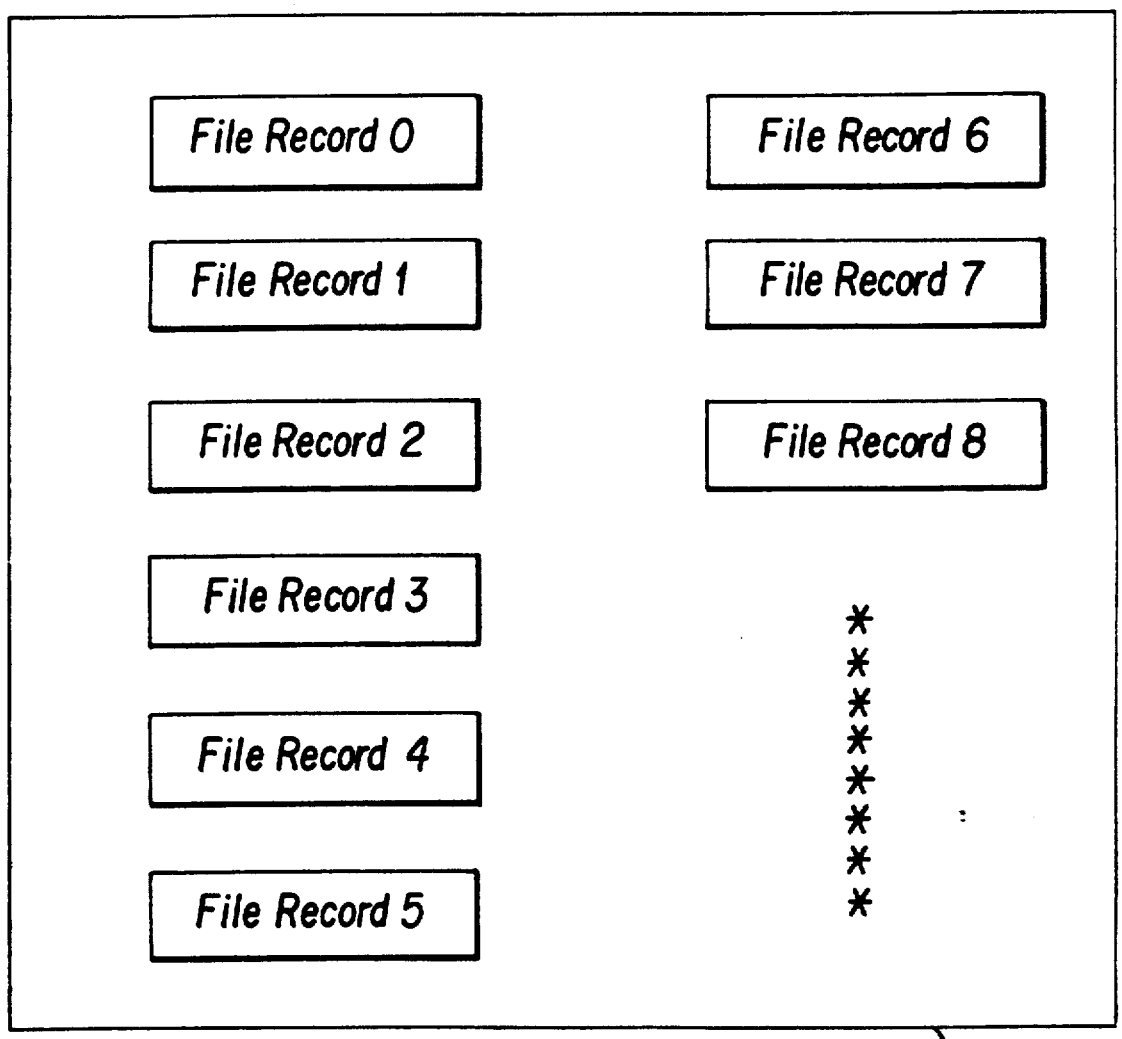
FIG. 73 shows a block diagram of the organization of HPOMF.CAT, a system file included in the OMF shown in FIG. 72.

System file 601, HPOMF.CAT, is also referred to as SYSCAT. HPOMF.CAT is a catalog of all the existing objects in the system. In FIG. 73, HPOMF.CAT is shown to be record oriented. HPOMF.CAT has a plurality of file records. In FIG. 73, file record 0 through file record 8 are shown, although HPOMF.CAT may contain many more file records than are shown in FIG. 73. File record 0 is a header which contains various signatures and is used to manage a list of free file records. A signature is some known value which if present indicates that the file is not corrupted. File record 1 through file record 8 and additional file records (not shown) either define an existing object, or are free. In the preferred embodiment HPOMF.CAT can grow dynamically, as more file records are needed, but cannot shrink.

Figure 74:
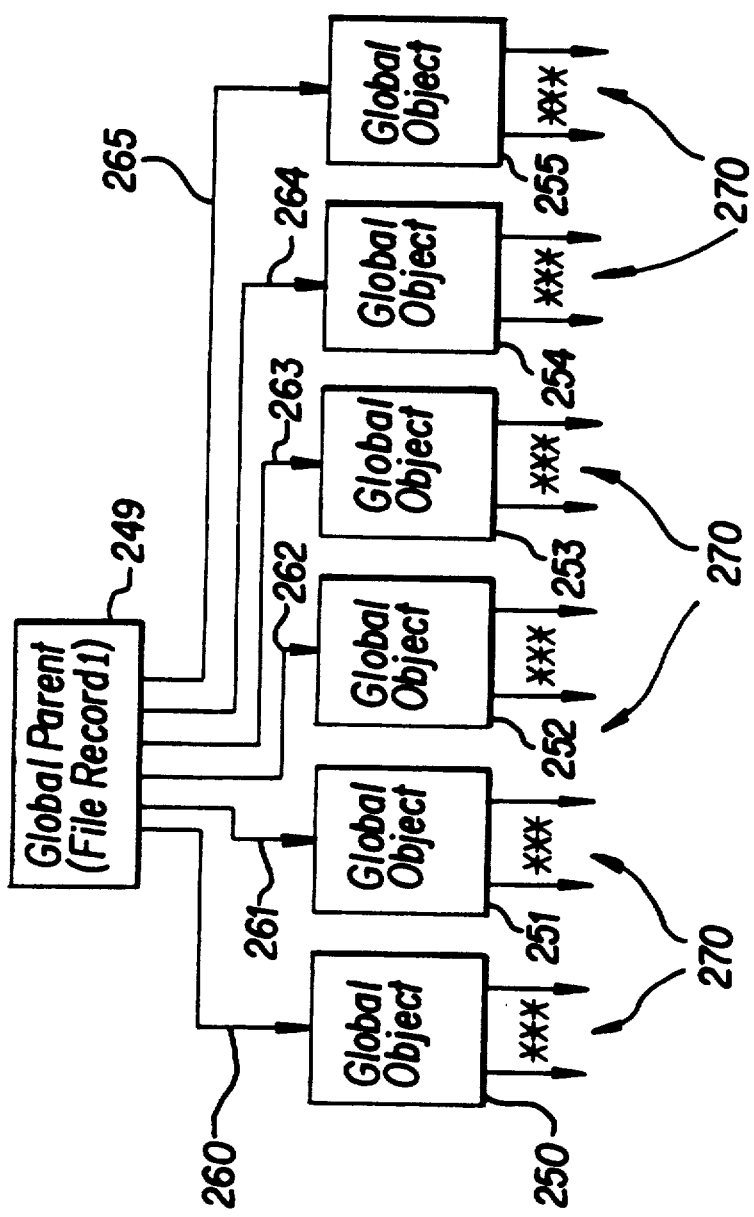
FIG. 74 shows the relation between a global parent and global objects in accordance with the preferred embodiment of the present invention.

File record 1 defines a special object called the global parent. The global parent has a form different than every other object, and may be regarded as a "pseudo" object. FIG. 74 shows the global parent to be the parent of global object 250 through link 260, global object 251 through link 261, global object through link 262, global object 253 through link 263, global object 254 through link 64 and global object 255 through link 265, as shown. Global objects 250-255 are also within HPOMF.CAT. Each global object 250-255 may be a parent of one or more objects in HPOMF.CAT. Each object in HPOMF.CAT which is not a global object, is a descendent of global object. Although FIG. 74 shows only six global objects, the number of global objects operating on a system is a matter of system configuration. Any object in the system can rafer to a global object by by using the reference name of the link to that global object from the global parent.

As may be seen from FIG. 73, file records in HPOMF.CAT are numbered consecutively. These numbers serve as tags, which identify each object.

In the preferred embodiment of the present invention, each record is 128 bytes in length. The fields for file record 0 are listed in Table 1 below:

TABLE 1

| | |
|---|---|
| lFirstFreeEntry | Contains the record number of the first free record in HPOMF.CAT, or "0" if there are no free records. |
| FileId | Contains the null terminated string "HPOMF.CAT". This serves as a signature. |
| Version | Contains the file format version number, which also serves as a signature. |
| lMaxRecordNumber | Contains the number of the highest record ever allocated |

TABLE 1-continued from within HPOMF.CAT (this highest record may or may not be free).

Table 2, below, contains the fields for file records in HPOMF.CAT for file records other than file record 0:

TABLE 2

| | |
|---|---|
| lFirstFreeEntry | Is "−1" if this record defines an object, otherwise this record is free and this field is the record number of the next free record, or "0" if there are no more free records. If the record is free, none of the other fields in the record is meaningful. |
| TypeInClass | Specifies the class of this object. This is the number of the record in HPOMF.CLS that indicates to which class the object belongs (see discussion of class above). |
| SysCatFlags | Specifies if the object is global if the bit masked by the number 20 (hexadecimal) is set in this byte. In the preferred embodiment all other bit positions must contain "0" and are not used. |
| properties | Specifies the number of properties, the length of the property names and the location in HPOMF.PRP of the object's properties. See the description of HPOMF.PRP below for further definition of the structure of this field. |
| fastprops | Certain object properties, such as name, are so heavily accessed that they are stored directly in this field, rather than indirectly in the properties file. Properties stored in this field are called "fast properties." |

System file 602, HPOMF.CLS is also referred to as SYSCLASS. This system file is a list of all installed classes in the system. It is record oriented. The first record, numbered 0, is a header which contains various signatures (see above) and is used to manage a list of free recores. All other records either define an installed class or are free. In the preferred embodiment HPOMF.CLS can grow dynamically, but cannot shrink.

Each file record in HPOMF.CLS is thirty-two bytes in length. HPOMF.CLS file record 0 (the header) contains the following fields listed in Table 3:

TABLE 3

| | |
|---|---|
| lFirstFreeEntry | Contains the record number of the first free record in HPOMF.CLS, or "0" if there are no free records. |
| FileId | Contains the null terminated string "HPOMF.CLS" |
| Version | Contains the file format version number. |
| lMaxRecordNumber | Contains the number of the highest record ever allocated from within HPOMF.CLS (this highest record may or may not be free). |

Table 4, below, contains the fields for file records in HPOMF.CLS for file records otehr than file record 0:

TABLE 4

| | |
|---|---|
| lFirstFreeEntry | Is "−1" if this record defines an installed class, otherwise this record is free and this field is the record number of the next free record, or "0" if there are no more free records. If the record is free, none of the other fields in the record is meaningful. |
| ModuleFileName | Specifies the name of the application associated with objects of this class as a null-terminated string. |
| properties | Specifies the number of properties, the length of the property names and the location in HPOMF.PRP of the object's properties. See the description of HPOMF.PRP below for further definition of the structure of this field. |

Figure 75:
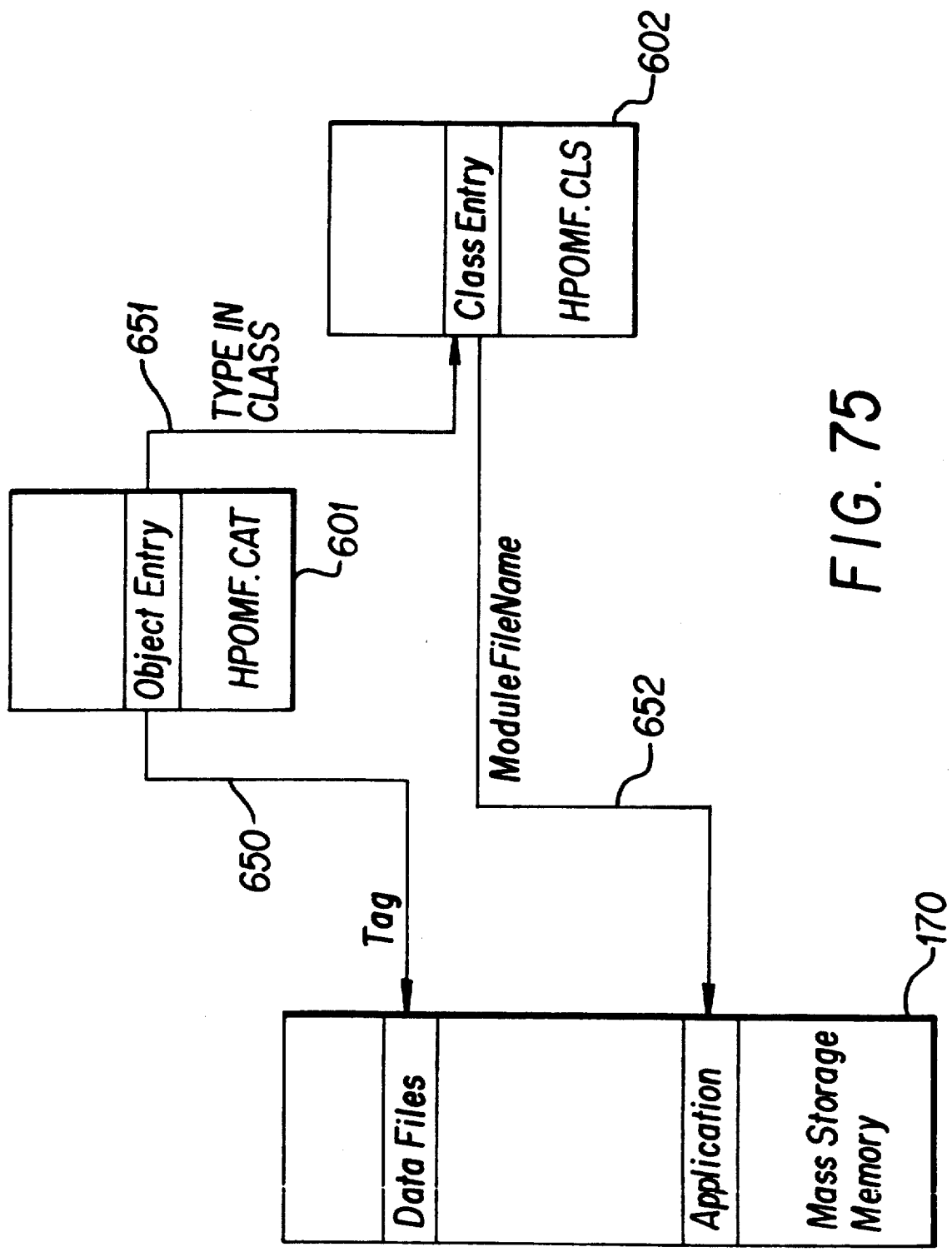
FIG. 75 is a block diagram which shows how system files within the OMF shown in FIG. 72 accesses data files and applications from a memory shown In FIG. 1.

In FIG. 75, the relationship of HPOMF.CAT and HPOMF.CLS is shown. Within each object entry within HPOMF.CAT, the record number, which is an object's tag, serves as an identifier 650 of data files in a mass storage memory 170 associated with the object. The field "TypeInClass" serves as an identifier 651 of the class entry in HPOMF.CLS, which identifies the class of each object. Within each class entry in HPOMF.CLS, the field "ModuleFileName" serves as an identifier 652 of the application file in mass storage memory 170 which is associated with the class.

Figure 76:
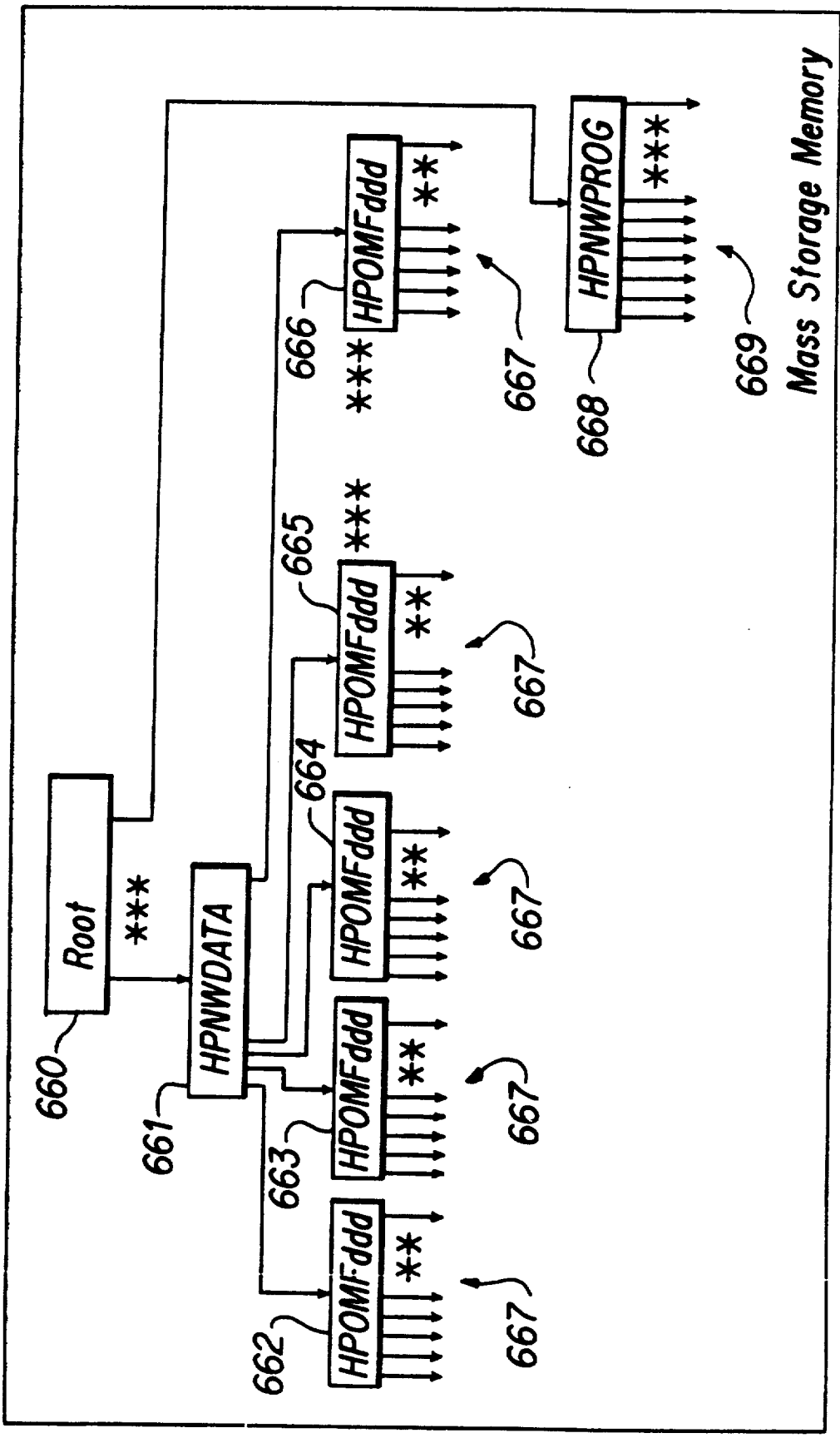
FIG. 76 is a block diagram of the organization of the memory shown in FIG. 75.

In FIG. 76, the organization of a portion of mass storage memory 170 is shown. A root directory 660 contains pointers to an HPNWDATA directory 661 and HPNWPROG directory 668. HFNWPROG directory 668 is the location of storage for applications files, represented by arrows 669. HPNWDATA contains a plurality of HPOMFddd directories, represented by directories 662, 663, 664, 665 and 666. In the HPOMFddd directories are stored data files associated with objects. The "ddd" in HPOMFddd stands for a three digit, leading zeros, hexadecimal number. Each HPOMFddd directory has a different "ddd" hexadecimal number. The "ddd" number indicates which HPOMFddd directory stores data files for a particular object. Data files for a particular object are stored in the HPOMFddd directory which has a "ddd" number equal to the tag for the object divided by an integer number, e.g., fifty four. Within each HPOMFddd directory, files are stored by tag numbers, e.g. data file names have the format xxxxxxxx.111, where "xxxxxxxx" is an eight digit leading zeros hexadecimal tag, and "111" are a reference chosen by the application.

System file 603, HPOMF.XRF is also referred to as SYSXREF. This file is a list of all the links existing in the system. It is record oriented, but does not have a header record. Each record file is either free, or defines an existing link, or is used as an overflow record from the previous record to specify additional view specification information. Records that contain view specifications are called view specification file records. View specification file records can be identified only by a previous record which defines an existing data link; view specification file records cannot be identified by the content within a view specification file record. HPOMF.XRF is increased in size 16 K bytes at a time.

A newly allocated portion of HPOMF.XRF is filled with zeros. File records within HPOMF.XRF which are free or which define a link have the following fields listed in Table 5:

TABLE 5

| | |
|---|---|
| ParentTag | Contains the tag (HPOMF.CAT record number) of the parent object of this link. If this field is 0, then this record does not define a link and is free. |
| ChildTag | Contains the tag of the child object of this link. If ParentTag in this record is 0, and this field is also 0, then no record beyond this record in HPOMF.XRF defines a link. |
| RefName | Contains the reference name that the parent has assigned to the link. This field is meaningless if ParentTag or ChildTag is zero. Otherwise, if the top three bits of this value are 110, the next record in the file is a view specification. |

File records within HPOMF.XRF which are view specification file records have the following fields listed in Table 5A:

TABLE 5A

| | |
|---|---|
| DataId | Contains the value that the child has assigned to identify the part of itself that is being viewed through the link. |
| Snapshot | Contains the tag (HPOMF.CAT record number) of the object which is the view's snapshot, or if zero, the view has no snapshot. For further discussion of snapshots, see below. |
| Misc | Composed of several bit fields described below: |
| VS_NEWDATASET | Set if child has told OMF that new data is available, but has not been announced to the parent. The hexadecimal number 8000 0000 is a mask which indicates which bits are used for this bit field. |
| VS_NEWDATAANNOUNCED | Set if child has told OMF to announce new data to parent, but parent was inactive and was not notified. The hexadecimal number 4000 0000 is a mask which indicates which bits are used for this bit field. |
| VS_SNAPSHOTOLD | Set if child has told OMF that the view's snapshot is out-of-date. The hexadecimal number 2000 0000 is a mask which indicates which bits are used for this bit field. |
| VS_WANTMESSAGES | Set if child has told OMF that it wants to process view messages when snapshot is out-of-date. The hexadecimal number 1000 0000 is a mask which indicates which bits are used for this bit field. |
| VS_TEXTDISKLOC | File position in HPOMF.PRP where a view's 32 character textual data ID is located. This contains zero if no textual data ID has been defined by the child. The low order five bits of the file position are always zero and are thus not stored in the Misc field. The hexadecimal number 0FFF FFE0 is a mask which indicates which bits are used for this bit field. |
| VS_INITIALIZED | Set if the view specification has been initialized. If clear, all information in the view specification is zero. The hexadecimal number 0000 |

TABLE 5A-continued

| | |
|---|---|
| | 0010 is a mask which indicates which bits are used for this bit field. |
| VS_RESERVED | Reserved for future expansion. The hexadecimal number 0000 0008 is a mask which indicates which bits are used for this bit field. |
| VS_VIEWCLASS | Specifies the view class the child assigned to the view. The view class defines what view methods are available to the parent. The hexadecimal number 0000 0007 is a mask which indicates which bits are used for this bit field. |

Figure 77:
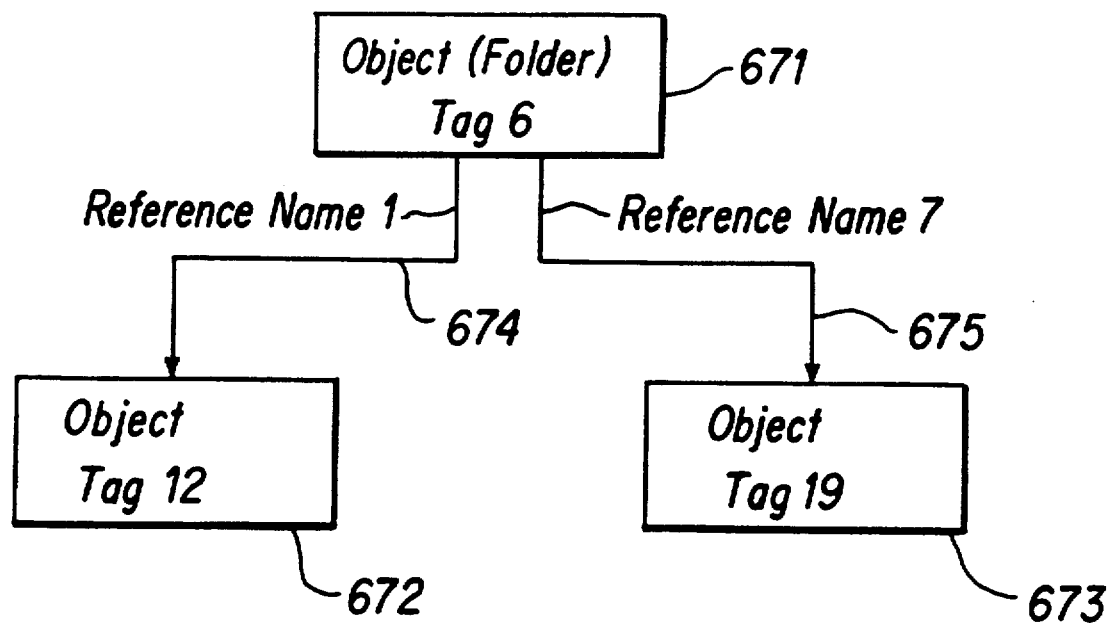
FIG. 77 and FIG. 78 show objects and links in accordance with the preferred embodiment of the present invention.

For example, in FIG. 77, Object 671 is a folder and has a tag of "6". Object 671 is a parent of an object 672 through a link 674 and a parent of an object 673 through a link 675. Object 672 has a tag of "12". Link 674 as a reference name "1". Object 673 has a tab of "19". Link 675 has a reference name "7". Reference names are picked by the parent object and need to be unique for the particular parent object; however, other parents may have a link with the same reference name provided each reference name is unique for each parent.

Figure 79:
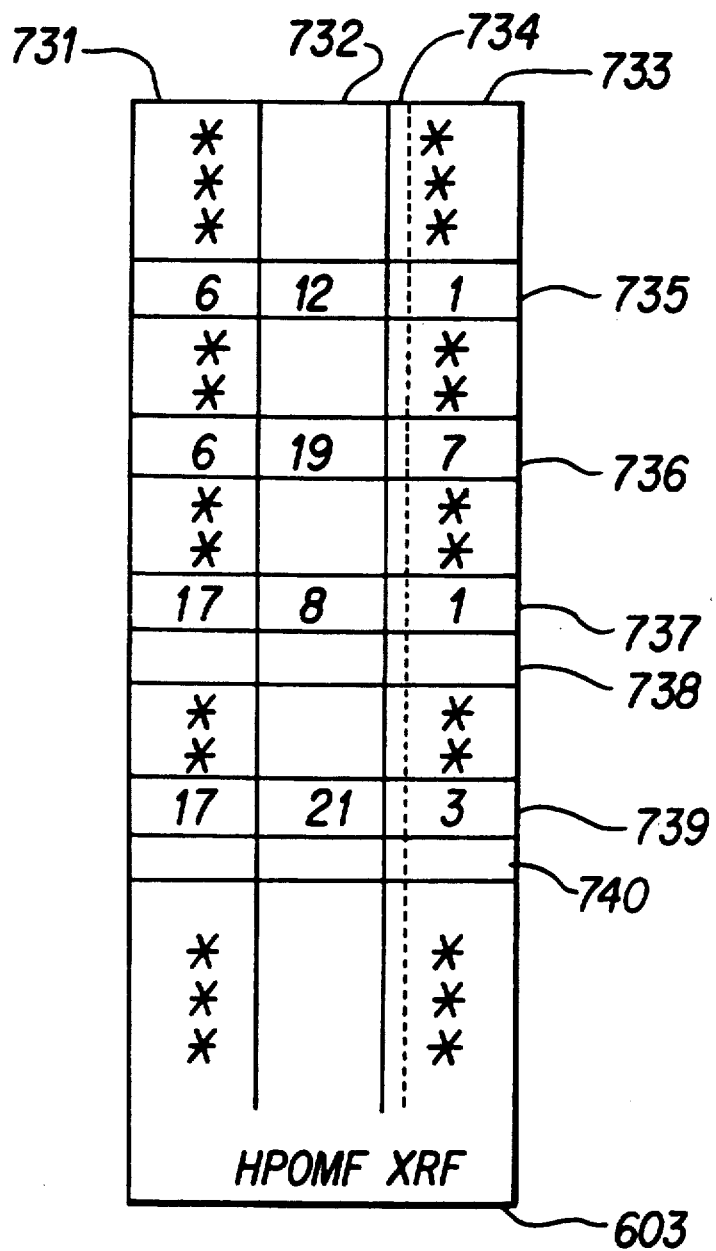
FIG. 79 is a block diagram of the organization of HPOMF.XRF, a system file included in the OMF shown in FIG. 72.

FIG. 79 shows a block diagram of HPOMF.XRF 603. HPOMF.XRF contains an entry for each link between parents and children. In HPOMF.XRF 603 column 731 contains the tag of the parent for each link. Column 732 contains tha tag of the child for each link. Column 733 contains the reference name for each link. The first three bit positions of column 733, shown in FIG. 79 as sub-column 734, indicate whether a view specification file record is present ("110") whether no view specification file record follows ("000") or whether the link is between is a link from the global parent to a global object ("100").

As may be seen, entry 735 is an entry which describes link 674 shown in FIG. 77. That is, in column 731 of entry 735 there is the parent tag "6". In column 732 there is the child tag "12" and in column 733 there is the reference name "1". Since object 671 is a folder, there is no view, therefore the three bits within subcolumn 734 would be "000".

Similarly, entry 736 is an entry which describes link 675 shown in FIG. 77. That is, in column 731 of entry 736 there is the parent tag "6". In column 732 there is the child tag "19" and in column 733 thera is the reference name "7". Since object 671 is a folder, there is no view, therefore the three bits within subcolumn 734 would be "000".

Figure 78:
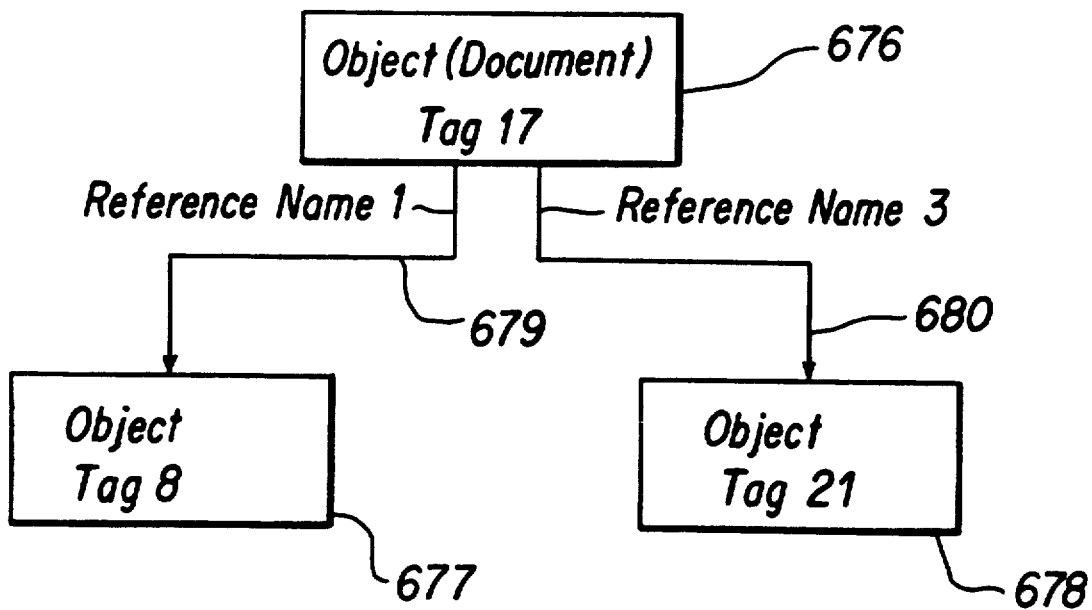

In FIG. 78, Object 676 is a document and has a tag of "17". Object 676 is a parent of an object 677 through a link 679 and a parent of an object 678 through a link 680. Object 677 has a tag of "8". Link 679 as a reference name "1". Object 678 has a tag of "21". Link 680 has a reference name "3".

In FIG. 79, an entry 737 describes link 679 shown in FIG. 78. That is, in column 731 of entry 737 there is the parent tag "17". In column 732 there is the child tag "8" and in column 733 there is the reference name "1". Object 676 is a document, and assuming there is a view associated with link 679, the three bits within subcolumn 734 contain the three bits "110" and entry 738 is a view specification record.

Similarly, an entry 739 describes link 680 shown in FIG. 78. That is, in column 731 of entry 739 there is the parent tag "17". In column 732 there is the child tag "21" and in column 733 there is the reference name "3". Assuming there is a view associated with link 680, the three bits within subcolumn 734 contain the three bits "110" and entry 740 is a view specification record.

Figure 80:
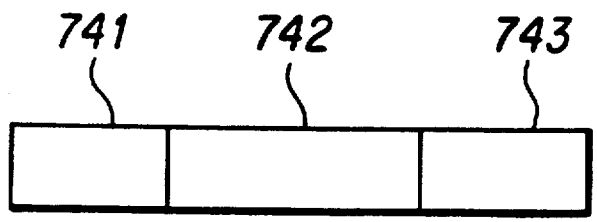
FIG. 80 shows a view specification record in accordance with the preferred embodiment of the present invention.

In FIG. 80, view specification record 740 is shown to include a field 741 which contains a data identification for the view, a field 742 which indicates whether there is a snapshot used in the view, and a field 743 which contains miscellaneous information about the view. The data identification number is used by the child object of the link, to determine what data is sent through the link.

FIGS. 37-43 show the establishment of a link with a view. As has been discussed before, in FIG. 37 window 791 for "Paste Up" (object 707) has been opened by double clicking on the icon for "Paste Up". In FIG. 38, using Cursor 781, controlled by mouse 20, portion 790 of the text of "Sample Text" has been selected. The portion in inverse video stating "New Wave Office environment" is portion 790.

In FIG. 39, cursor 781 is used to select the selection "Share" in a pull down menu 792. Once "Share" is selected, child object 709 ("Sample Text") creates a data identification number which identifies portion 790 of the text to child object 709. Child object 709 also causes OMF 100 to put a link to child object 709 on clipboard 720— Child object 709 communicates to OMF 100 through command set forth in Appendix B, attached hereto—. Child object 709 also informs OMF 100 what data identification number is associated with the new link between the child 709 and clipboard 720. If there is a snapshot associated with the link, child 709 will also inform OMF 100 if there is a snapshot associated with the link. Snapshots are discussed more fully below. As a result OMF 100 will make an entry in HPOMF.XRF 603 for a link between clipboard 720 and child object 709. The view specification record for the link will include the data identification number given to OMF 100 by child 709.

In FIG. 40, area 793 in window 791 is selected using cursor 781. In FIG. 41, a selection "Paste" is selected from a pull down menu 794 using cursor 781. At this point parent object 707 ("Paste Up") requests OMF 100 for a link making him the parent of what is on clipboard 720. The view specification record for the between clipboard 720 and child 709 is copied for link 729 between parent 707 and child 709. In FIG. 43 "Sample Text" (object 709) is shown to be a child of "Paste Up" (object 707) through link 729.

In FIG. 42, "displayed text 790 is displayed in "Paste Up" window 791. In accomplishing this, parent object 707 makes a call to OMF 100 asking that a message be sent to the object identified by the reference name for link 729. This message requests the child object 709 to display data from this link into a location specified by parent object 707. OMF 100 takes the message from parent 707, adds the data identification number from the view specification record for link 729, and delivers the message to child 709. Child 709 displays the data in the specified location, in this case area 793. The name of the message sent from parent 707 to OMF 100 to child 709 is "DISPLAY_VIEW", further described in Appendix B, attached hereto.

Another message "PRINT_SLAVE", also described in Appendix B, may be used when it is desired to print data on a printer rather than display data on a terminal screen.

In addition, Parent 707 may send a "GET_SIZE" message to ohild objeot 709. In a "GET_SIZE" message, parent objeot 707 identifies a reference name for link 729 and indicates coordinates for a display. OMF 100 takes the GET_SIZE message from parent 707, adds the data identification number from the view specification record for link 729, and delivers the message to child 709. Child 709 returns to parent 707 the size of the portion of the specified area that child 709 would use to display the data. This allows parent 707 to modify the region reserved for displaying data from child 709 when child 709 is not able to scale the data to fit in the region specified by parent 707.

When a data from a child object is being displayed by a parent object, and the child object changes the displayed data, the child objects notifies OMF 100 that there has been a change in the data object. For example, as described above, in FIG. 47, data from "Star" (object 706) now displayed in region 795 of window 791. And, as may be seen in FIG. 48, "Star" (object 706) is a child of "Paste Up" (object 707) through a link 726. Since data is being passed from child object 706 to parent object 707, link 726 is a data link which includes a view specification.

In FIG. 49, the method for changing data in child object 706 is shown. A user places cursor 781 over region 795 of window 791 and double clicks a button on mouse 20. The result is the opening and display of "Star" (object 706) in a window 796. Using cursor 781 to select selection "Ellipse" in a menu window 797 results in the data within "Star" (object 706) being changad from a star to an ellipse. As shown in FIG. 51, the result is a change both in data displayed in window 796 and data displayed in region 795 of window 791.

Child object 706 accomplishes this change by making a call to OMF 100 stating that data associated with the data identification number associated with link 726 is changed. OMF 100 looks up all of the links that use the data identification number. If the parent object of any of the links is not active, OMF 100 sets the bit VS_NEW-DATAANNOUNCED for that link in HPOMF.XRF. When the parent object is activated, the parent object can then request the new data.

If the parent object is active, OMF 100 will send a message to the parent object saying that new data is available. OMF 100 will identify to the parent object the reference name of the link for which there is additional data. The parent cbject sends a message tc tbe cbild object if it wants the new data displayed. In the present case parent object 707 is active , and has requested the new data to be displayed in region 795 of window 791. A further description of the View Specifications are found in Appendixes B, C and D.

The advantage of the present invention is that parent object 707 is able to communicate with child object 706 through OMF 100, without parent object 707 or child object 706 knowing the identity or any other details about each other. The parent objeot IdentIfies the link using only the reference name of the link. The child object identifies the link using just the data identification number of the link. OMF 100 does all the translation and identification of which links and which objects are involved. System file 604, HPOMF.PRP, is also referred to as SYSPROP. HPOMF.PRP contains all the object and class properties except for the fast object properties which are contained in HPOMF.CAT. Each record in system file 601 (HPOMF.CAT) and system file 602 (HPOMF.CLS) has a properties field, as described above. Each properties field contains the fields described in Table 6 below:

TABLE 6

| | |
|---|---|
| DirDiskLoc | Contains the position (byte offset) within HPOMF.PRP of the property list directory. |
| nProps | Contains the number of properties in the property list. This is the number of entries in the directory entry array described below. |
| PoolSize | Contains the combined length of all the names of the properties in the property list, including a null-terminating byte for each name. This is the size of the directory name pool described below. |

For each object and for each class, at the DirDiskLoc position in the HPOMF.PRP file is the property directory for that object or that class. The directory has two major portions: the entry array, followed by the name pool. The entry array has one entry for each property in the property list. Each entry has fields set out in Table 7 below:

TABLE 7

| | |
|---|---|
| ValueLen | Specifies the length in bytes of the associated property. This can be zero. |
| ValueDiskLoc | Contains the position within HPOMF.PRP of the value of the associated property. If ValueLen is zero, this is also zero, and there is no value stored anywhere. |
| CacheOffset | This field is only used at run time and is not meaningful in the file. |

Immediately following the entry array is the name pool. This portion of HPOMF.PRP contains the null-terminated names of properties in the property list, in the same order as the entry array. Properties may include such things as titles, user comments, date and time of creation, the user who created the object, etc. For more information on properties, see Appendix D.

HPOMF.PRP grows dynamically as need. At the beginning of HPOMF.PRP there is a 128 byte bitmap which controls the allocation of the first 1024 pages of HPOMF.PRP. Each page is 32 bytes in length. These pages immediately follow the bit map. The bitmap is an array of words with the most significant bit of each word used first. Thus, bits 15 through 0 of the first word of the bitmap control the allocation of pages 0 through 15 of the file, respectively.

When storage in the first 1024 pages is insufficient, a second bitmap is added to the file following page 1023. This bitmap controls the allocation of pages 1024 through 2047, which immediately follow the second bitmap. Additional bitmaps and pages are added in the same way, as needed. Each directory and property value is stored as a single block in the file, i.e., as a contiguous run of pages that are all allocated in the same bitmap. This causes the restriction that no directory or value can exceed 32 K bytes (1024 times 32) in length.

System file 605, HPOMF.INS, is also referred to as SYSINSTL. HPOMF.INS contains a list of the files that were copied to the system when each class was installed. This information is used so that these files can be deleted when the class is de-installed.

The very beginning of HPOMF.INS is a double word value which serves as a validity/version identifier. In the preferred embodiment the value of this double word must be 0101ABCD hex to be valid. In Table 8, this number is stored as shown because of the protocols for storage in the particular processor used by the preferred embodiment, i.e. an 80286 microprocessor made by Intel Corporation.

Following the double word comes a series of variable length records. There is one record for each installed class. The first word of each record is the length of the rest of the record, in bytes. This is followed by the null-terminated class name of the installed class. Then follows the file names of the files copied to the OMF directories, each terminated by a null byte, and preceded by a byte which gives the length of the file name, including the length byte and the null terminator. If the file name begins with the special character "*", the file is assumed to be located in the HPNWPROG directory. If the file name begins with the special character "+" the file si assumed to be located in the HPNWDATA directory.

For example, assume two classes are installed: class "AB" and class "CDE". Class "AB" caused two files to be installed: "Z" to HFNWPROG directory 668 and "YY" to the HPNWDATA directory. Class "CDE" caused 1 file to be installed: "XXX" to HPNWPROG directory 668. Given this case Table 8 below shows the contents of HPOMF.INS for this example:

TABLE 8

| offset | content | comments |
| --- | --- | --- |
| 0 | CD AB 01 01 | File header/version check |
| 4 | 0C 00 | Length of AB record (12 decimal) |
| 6 | 41 42 00 | "AB" + Null |
| 9 | 04 | Length of length byte "*Z" + Null |
| A | 2A 5A 00 | "*Z" + Null |
| D | 05 | Length of length byte + "+YY" + Null |
| E | 2B 59 59 00 | "+YY" + Null |
| 12 | 0A 00 | Length of CDE record (10 decimal) |
| 14 | 43 44 45 00 | "CDE" + Null |
| 18 | 06 | Length of length byte + "*XXX" + Null |

TABLE 8-continued

| offset | content | comments |
| --- | --- | --- |
| 19 | 2A 58 58 58 00 | "*XXX" + Null |

System File 606, HPOMF.SDF is also referred to as the "shutdown file". HPOMF.SDF exists only when the system has been cleanly shut down. It is deleted as the system starts, and created as it shuts down. On startup, if this file is missing, OMF assumes that the last session ended abnormally, and so it goes through its crash recovery procedures to validate and repair the system files as best it can. The system files can be in an invalid but predictable state on a crash. These errors are corrected without user intervention. Certain other kinds of file consistency errors are detected, but are not really possible from an "ordinary" system crash. These errors are in general not correctable and the OMF will not allow the system to come up in this case.

If HPOMF.SDF is present, it contains a list of objects. When the system is being shut down normally, each object which is active at the time can request that the OMF restart them when the system is restarted. The list of objects, then is the list of tags of objects which have requested that they be restarted when the system is restarted.

The first word in HPOMF.SDF is a flag word. If this word is non-zero, OMF will execute its crash recovery code even though HPOMF.SDF exists. Normal shutdown will set this flag when producing the file if some serious error occurred in the session being ended.

After the first word, the rest of the file is a sequence of three byte records. The first two bytes of each record contain the tag of the object to be restored. The least significant byte is first. The third byte is not used in the preferred embodiment, and is zero.

For example, if the system is shut down cleanly in the last session and two objects, having tags of 2 and 7, respectively, have requested restart, the contents of HPOMF.SDF will be as set out in Table 9 below:

TABLE 9

| offset | content | comments |
| --- | --- | --- |
| 0 | 00 00 | Indicates no crash recovery needed |
| 2 | 02 00 | Tag of first object to restart |
| 4 | 00 | Unused and reserved |
| 5 | 07 00 | Tag of second object to restart |
| 7 | 00 | Unused and reserved |

System file 7, HPOMFICO.NWE, is a Microsoft Windows dynamic library executable file which contains a dummy entry point and no data. Microsoft Windows is a program sold by Microsoft Corporation, having a business address at 16011 NE 36th Way, Redmond, Wash. 98073-9717. HPOMFICO.NWE also contains as "resources" the icons of each installed class. OMF modifies HPOMFICO.NWE directly during run time, and loads and unloads it to get the icon resources from it. The format of HPOMFICO.NWE is defined in Microsoft Windows documentation distributed by Microsoft Corporation.

Normally working with a view (see discussion on views above) causes a child's application to be invoked. Where large applications are involved, this can cause a lot of unnecessary overhead. The use of snapshots allow this overhead to be eliminated.

A snapshot is an object that uses executable code from a separate library referred to as a dynamic access library (or DAL) rather than using the full application executable code. The only data file associated with a snapshot contains data which is to be sent from a child object to a parent object. The code which encapsulates the data file although referred to as a dynamic library, is still stored in directory HPOMFPROG (directory 668).

Figure 81:
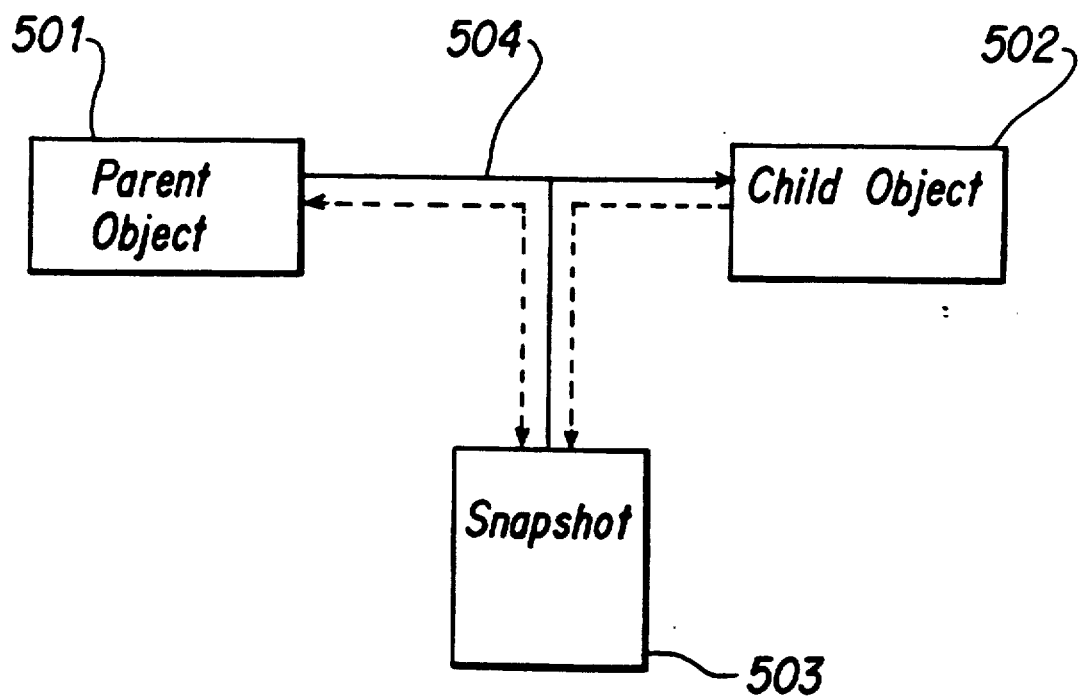
FIG. 81 shows the use of a snapshot in accordance with a preferred embodiment of the present invention.

For example, FIG. 81 shows a parent object 501 linked to a child object 502 through a link 504. Associated with link 504 is a snapshot 503. Once child object has designated snapshot 503 in a view specification record for link 504, snapshot 503 is able to provide data from child object 502 to parent 501 without the necessity of invoking an application associated with child object 502.

Figure 82:
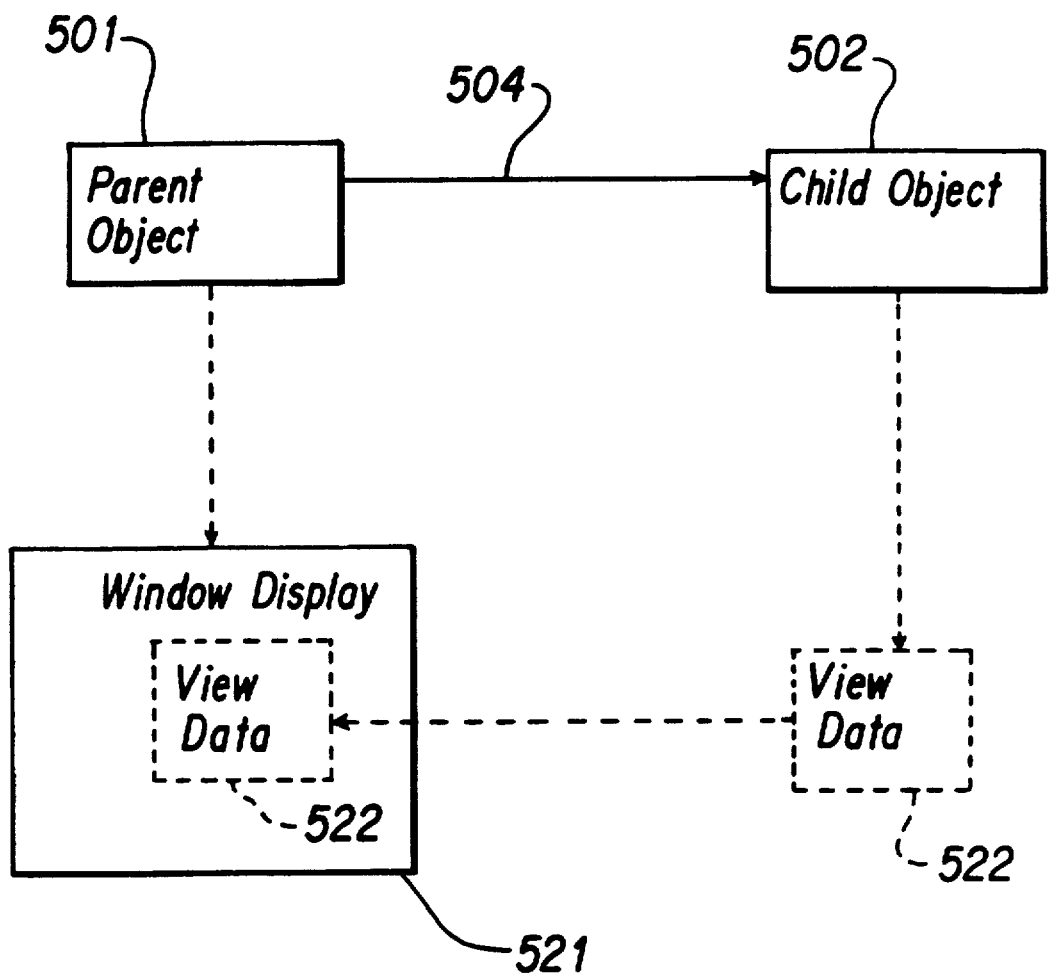
FIG. 82 shows the data path of a view when there is no snapshot, in accordance with a preferred embodiment of the present invention.
Figure 83:
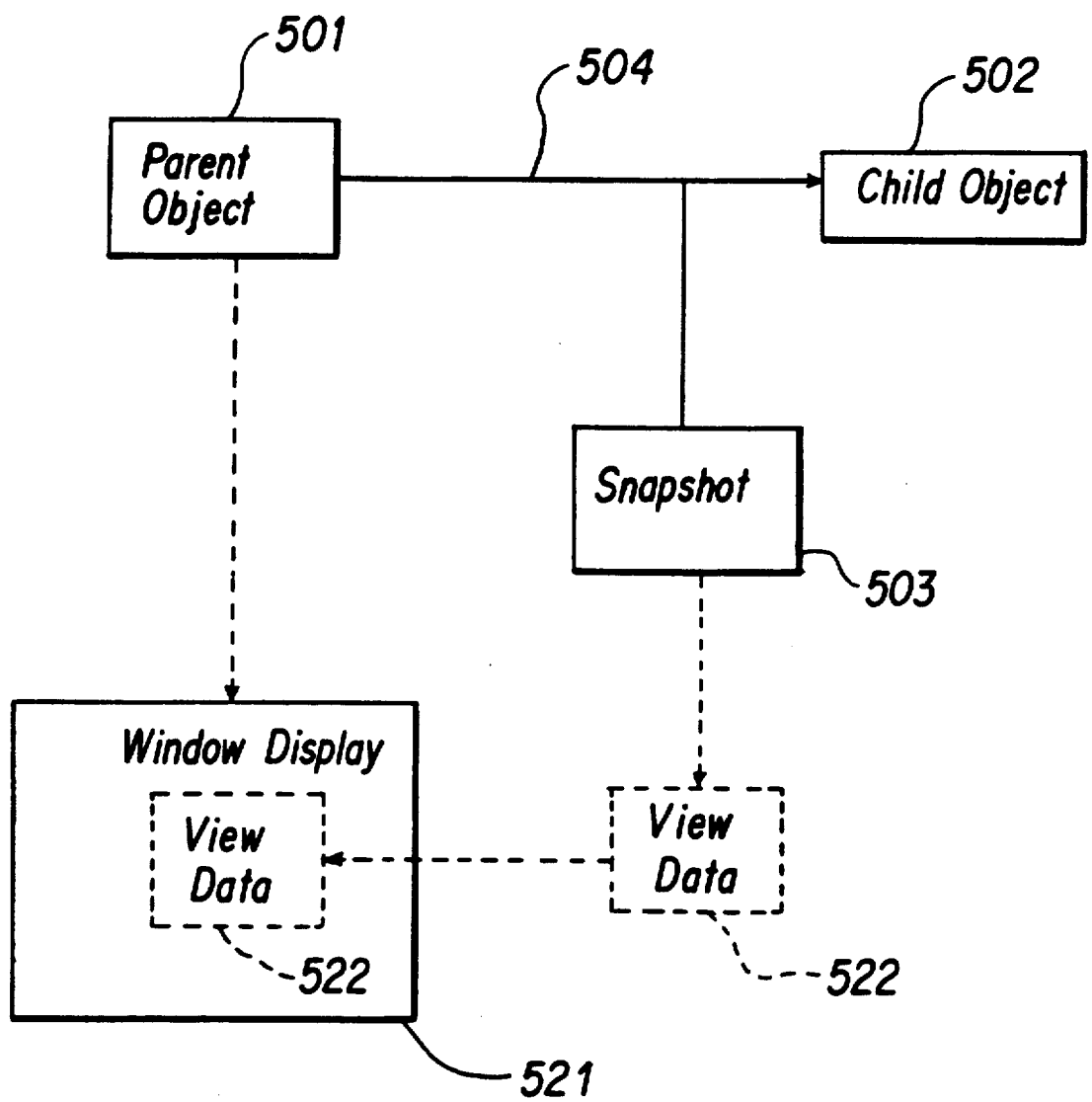
FIG. 83 shows the data path of a view when there is a snapshot, in accordance with a preferred embodiment of the present invention.

As shown in FIG. 82, when there is no snapshot, child object 502 must be active in order to send view data 522 to parent object 501, in order for parent object 501 to display view data 522 in a window display 521. In FIG. 83, however, snapshot 503 is shown to provide view data 522 to parent object 501 without the necessity of child 502 being active. Further implementation details of snapshots are given is Appendix B, Appendix C and Appendix D.

Appendix A is a list of major data structures within OMF 100.

Appendix B is a description of functions which OMF interface 599 recognizes in the preferred embodiment of the present invention.

Appendix C (HP NewWave Environment: Program Design Examples) Gives examples of how the preferred embodiment of the present invention may be implemented.including detail as to how OMF 100 allows data to be viewed between windows displayed on monitor 14.

Appendix D (Chapter 2 of Programmer's Guide) gives a further overview of the preferred embodiment of the present invention. further detail as to the operation of the preferred embodiment of the present invention.

We claim:

1. A computer system comprising:
   a first object;
   a second object;
   a snapshot object which performs a subset of functions performed by the first object, the subset of functions including transfer of data originating from the first object; and,
   a file management system, the file management system coordinating a transfer of data originating from the first object to another location in the computer system in accordance with a data transfer request from the second object, the file management system including
      a link reference file, the link reference file having an entry, the entry including
         a reference name of the entry,
         a reference to the first object,
         a reference to the second object,
         a reserved area reserved for a reference to a snapshot object, and
         an identifier which identifies the data from the first object, and
      forwarding means for forwarding the data transfer request to the snapshot object when the reserved area includes a reference to the snapshot object and for sending the data transfer request to the first object when the reserved area does not include a reference to the snapshot object.

2. A computer system as in claim 1, wherein the computer system includes a display screen and wherein the second object directs the first object to display data on a particular area of the display screen.

3. A computer system comprising:
   a plurality of objects;
   at least oen snapshot object, each of the at least one snapshot object performing a subset of functions performed by an object from the plurality of objects, the subset of functions including transfer of data originating from the object;
   a file management system, the file management system coordinating transfer of data from the plurality of objects to locations in the computer system, the file management system including:
      a link reference file, the link reference file having a plurality of entries, each entry including
         a reference name of the entry,
         a reference to a first object which originates data to be transferred,
         a reference to a second object which requests data transfer from the first object,
         a reference which identifies data to be transferred from the first object, and
         a reserved area reserved for a reference to a snapshot object, and
      forwarding means for sending a data transfer request to a first snapshot object
   when the reserved area includes a reference to the first snapshot object and for sending a data transfer request to the first object when the reserved area does not include a reference to the first snapshot object.

4. In a computer system having a file management system, a memory, a display and a plurality of objects, each object, when operating on the computer system, responding to commands from a user when a cursor is positioned within a display window controlled by the object, a method for coordinating display of data from a first object from the plurality of objects into a first display window in the display controlled by a second object from the plurality of objects, in accordance with a request of the second object, the method comprising the following steps performed by the computer system:
   (a) creating in a link reference file in the memory, by the file management system, a link entry which includes a reference name which identifies the link entry, a reference to the first object, a reference to the second object and a data identifier which identifies the data to be transferred,
   (b) sending from the second object to the file management system a first display request to display data, the first display request including the reference name and a location within the first display window that the data is to be displayed;
   (c) sending from the file management system to the first object a second display request to display data, the second display request including the location where the data is to be displayed and the data identifier; and,
   (d) displaying the data by the first object.

5. A method as in claim 4 wherein step (a) includes the substeps of
   (a1) specifying by a user to the first object the data to be transferred;

(a2) associating by the first object, the data identifier to the data specified by the user;

(a3) sending from the second object to the file management system, the reference name.

6. A method as in claim 4 wherein the first display request does not identify the first object or the data identifier.

7. A method as in cliam 4 wherein the second display request does not include the identity of the second object or the reference name.

8. A method as in claim 4 wherein step (d) includes the substeps of:

(d1) sending a message, from the second object through the file management system to the first object, the message including the coordinates of the location where data is to be displayed; and, (d2) returning a value, from the first object through the file management system to the second object, the value representing the portion of the area described by the coordinates, which will be used by the first object to display the data.

9. A method as in cliam 4 additionally comprising the step of:

(e) starting operation of the first object upon a user positioning a cursor within the location and executing an open command.

10. A method as in claim 9 wherein the user executes the open command by double clicking a button on a mouse.

11. In a computer having a file management system, a memory and a plurality of objects, a method for coordinating display of data from a first object from the plurality of objects, in accordance with the request of a second object in the plurality of objects, the method comprising the following steps performed by the computer:

(a) creating in a link reference file in the memory, by the file management system, a link entry which includes a reference name which identifies the link entry, a reference to the first object, a reference to the second object, a data identifier which identifies the data to be transferred, and a reserved area reserved for a reference to a snapshot object, the snapshot object being for the performance of a subset of functions performed by the first object, the snapshot object having access to the data to be transferred;

(b) sending from the second object to the file management system a first display request to display data, the first display request including the reference name and a location that the data is to be displayed;

(c) performing the following substeps when the reserved area includes a reference to the snapshot object;

(c1) sending from the file management system to the snapshot object a second display request to display data, the second display request including the location where the data is to be displayed and the data identifier, and (c2) displaying the data by the snapshot object in the location; and (d) performing the following substeps when the reserved area does not include a reference to a snapshot;

(d1) sending from the file management system to the first object the second display request, the second display request including the location where the data is to be displayed and the data identifier, and (d2) displaying the data by the first object in the location.

12. A method as in claim 11 wherein step (a) includes the substeps of (a1) specifying by a user to the first object the data to be transferred;

(a2) associating by the first object, the data identifier to the data specified by the user;

(a3) sending from the second object to the file management system, the reference name.

13. In a computer having a file management system, and a plurality of objects, a method for coordinating display of data from a first object from the plurality of ojects, in accordance with the request of a second object in the plurality of objects, the display of data being done on a computer monitor and the method comprising the following steps performed by the computer:

(a) maintaining, by the file management system, a plurality of link reference entries which includes a first link reference entry, the first link reference entry including a reference to the first object and an identifier of data to be displayed;

(b) sending from the second object to the file management system a first display request to display data, the first display request including a location that the data is to be displayed and identification of the first link reference entry but not including the identity of the first object or a specific identifier of the data to be displayed;

(c) accessing, by the file management system, the first link reference entry to obtain the identity of the reference to the first object and the identifier of data to be displayed;

(d) sending from the file management system to the first object a second display request to display data, the second display request including the location where the data is to be displayed and the identifier of the data to be displayed; and, (e) displaying the data by the first object.

14. In a computing system having a file management system which manages objects existing within the computing system, a method which allows a first object to efficiently respond to requests from other objects to perform tasks, the method comprising the following steps performed by the computer:

(a) creating, by the first object, a snapshot object which is equipped to perform a first task, the first task being in a set of tasks which the first object performs;

(b) recording by the file management system in a link reference file a reference to the snapshot object; and, (c) upon a second object sending a first request for the first object to perform the first task, performing the following substeps:

(c1) receiving, by the file management system, the first request, (c2) sending, by the file management system, the first request to the snapshot object, and (c3) performing, by the snapshot object, the first task.

15. A method as in claim 14 wherein the first task is displaying data on a data screen.

* * * * *

UNITED STATES PATENT AND TRADEMARK OFFICE
CERTIFICATE OF CORRECTION

PATENT NO.    : 5,079,695
DATED         : January 7, 1992
INVENTOR(S)   : John A. Dysart et al.

It is certified that error appears in the above-identified patent and that said Letters Patent is hereby corrected as shown below:

<u>Column 24,</u>
Lines 11-12, after "(a3)" delete "sending from the second object to the file management system, the reference name." and insert therefor -- specifying by the first object to the file management system the identity of the snapshot object. --

Signed and Sealed this

Eighth Day of March, 2005

JON W. DUDAS
*Director of the United States Patent and Trademark Office*